(12) United States Patent
Chalekson et al.

(10) Patent No.: US 12,496,057 B2
(45) Date of Patent: Dec. 16, 2025

(54) SUTURE MATERIALS, SUTURE PLACEMENT DEVICES AND METHODS OF SUTURE PLACEMENT AND TISSUE APPROXIMATION

(71) Applicant: Tack Surgical, LLC, Solana Beach, CA (US)

(72) Inventors: Charles P. Chalekson, Templeton, CA (US); David G. Matsuura, Solana Beach, CA (US); Philip J. Simpson, Solana Beach, CA (US); Nelson Siu, Encinitas, CA (US)

(73) Assignee: Tack Surgical, LLC, Solona Beach, CA (US)

( * ) Notice: Subject to any disclaimer, the term of this patent is extended or adjusted under 35 U.S.C. 154(b) by 663 days.

(21) Appl. No.: 17/027,008

(22) Filed: Sep. 21, 2020

(65) Prior Publication Data

US 2021/0169465 A1    Jun. 10, 2021

Related U.S. Application Data

(60) Provisional application No. 62/902,469, filed on Sep. 19, 2019.

(51) Int. Cl.
*A61B 17/04* (2006.01)
*A61B 17/00* (2006.01)

(52) U.S. Cl.
CPC .......... *A61B 17/0401* (2013.01); *A61B 2017/00004* (2013.01); *A61B 2017/0409* (2013.01);
(Continued)

(58) Field of Classification Search
CPC ...... A61B 17/0401; A61B 2017/00004; A61B 2017/0409; A61B 2017/0412; A61B 2017/0445; A61B 17/0466; A61B 17/0483; A61B 2017/0406; A61B 2017/0414; A61B 2017/0427; A61B 2017/0464; A61B 2017/06176; A61B 17/11; A61B 2017/1142; A61B 17/08; A61B 2017/0641
(Continued)

(56) References Cited

U.S. PATENT DOCUMENTS 5,037,422 A    8/1991 Hayhurst et al.
5,484,451 A    1/1996 Akopov et al.
(Continued)

FOREIGN PATENT DOCUMENTS

WO    2018069543 A1    4/2018

OTHER PUBLICATIONS

Supplementary European Search Report, European Patent Office, Application No. EP20864519.2, Aug. 25, 2023, 2 pages.

*Primary Examiner* — Kathleen S Holwerda
*Assistant Examiner* — Serenity A Miller
(74) *Attorney, Agent, or Firm* — Ice Miller LLP

(57) ABSTRACT

The present invention includes a suture adapted to be anchored into tissue, the suture comprising a length of an elongate flexible suture material and a plurality of barbed anchor articles slidingly disposed along a length of the suture material. The invention also includes a suture placement device designed to insert the anchors of the suture articles into opposing tissue surfaces and associated methods for approximating and/or affixing opposed tissue surfaces in surgical procedures and the like.

10 Claims, 83 Drawing Sheets

(52) U.S. Cl.
CPC ............... *A61B 2017/0412* (2013.01); *A61B 2017/0445* (2013.01)

(58) Field of Classification Search
USPC .......................... 606/75, 139, 144, 228, 232
See application file for complete search history.

(56) References Cited

U.S. PATENT DOCUMENTS

| | | | |
|---|---|---|---|
| 5,486,197 A | 1/1996 | Le et al. | |
| 9,168,035 B2 * | 10/2015 | Vemuri | ................ A61F 2/0045 |
| 2003/0018358 A1 * | 1/2003 | Saadat | ................... A61B 18/24 |
| | | | 606/232 |
| 2003/0088272 A1 * | 5/2003 | Smith | ............... A61B 17/0401 |
| | | | 606/232 |
| 2003/0105489 A1 | 6/2003 | Eichhorn et al. | |
| 2003/0204195 A1 | 10/2003 | Keane et al. | |
| 2004/0138683 A1 * | 7/2004 | Shelton | ............. A61B 17/0401 |
| | | | 606/232 |
| 2004/0138704 A1 * | 7/2004 | Gambale | ............ A61B 17/1114 |
| | | | 606/213 |
| 2004/0210241 A1 * | 10/2004 | James | ............... A61B 17/0401 |
| | | | 606/139 |
| 2006/0293710 A1 | 12/2006 | Foerster et al. | |
| 2011/0288583 A1 * | 11/2011 | Goraltchouk | .......... A61B 17/08 |
| | | | 606/228 |
| 2013/0267998 A1 | 10/2013 | Vijay et al. | |

* cited by examiner

Anchors
Current Design
- Materials
    - Polylactic acid (PLA)
    - Polypropelene
    - Acrylonitrile butadiene styrene (ABS)
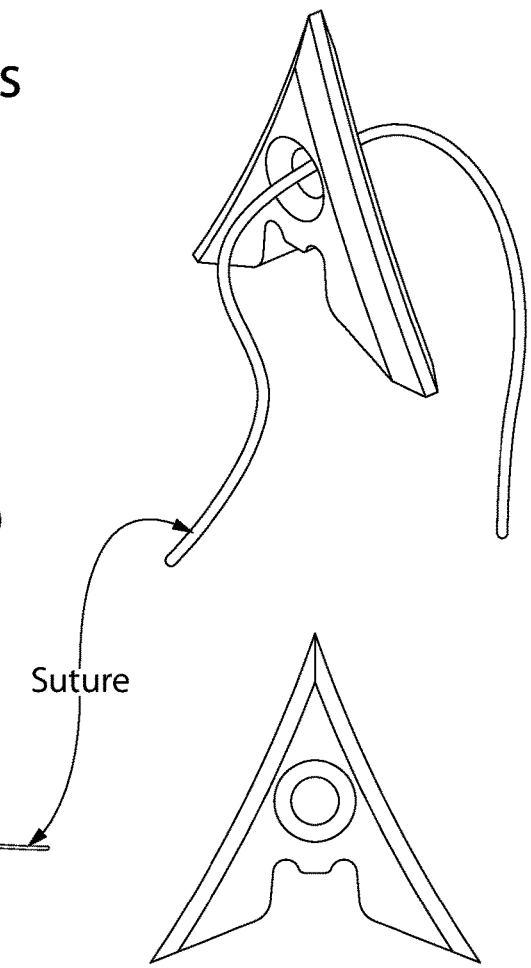
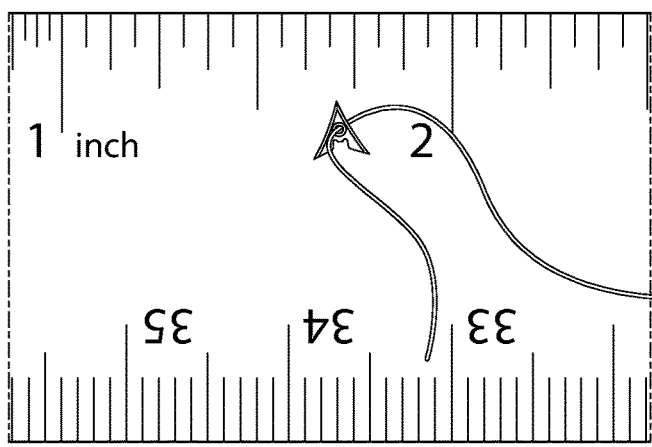
Suture
FIG. 1

Fig. 3
⋏ Insertion Device
- Current device: single pair of anchors
- Future device: multiple pairs of anchors
Anchors
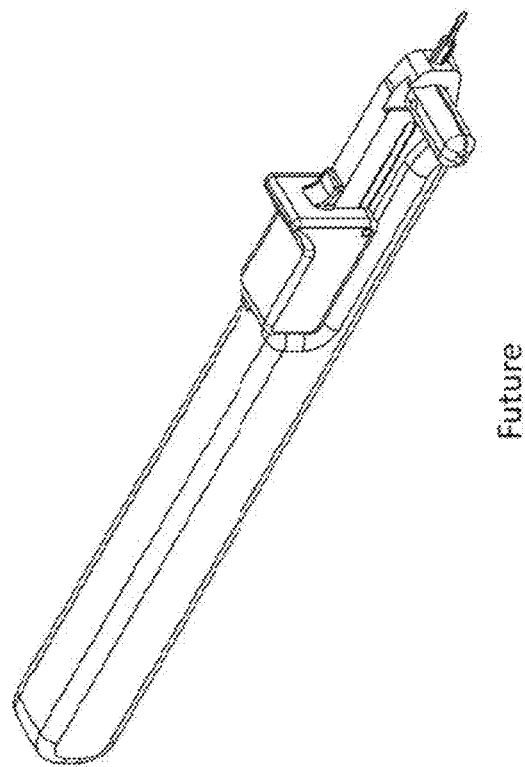
Future
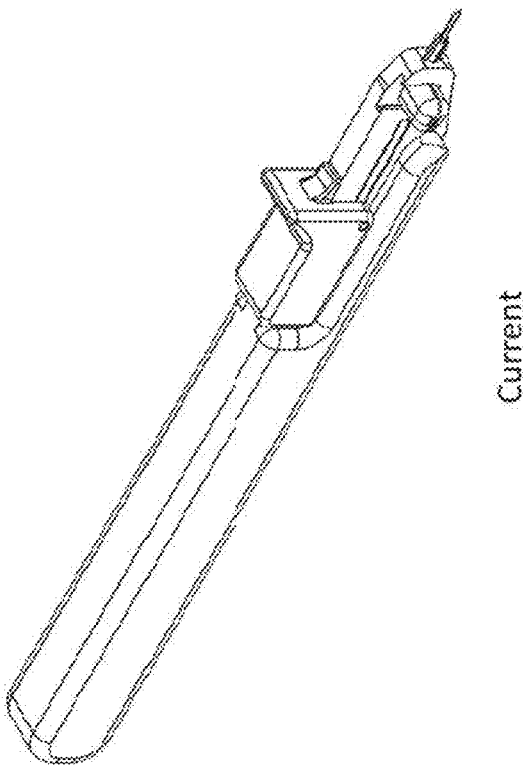
Current

Diamond Barrel Knots
Diamond Barrel Knot, Non-Barbed
- Materials
    - Polylglycolic acid (PGA) structure
    - Vicryl suture
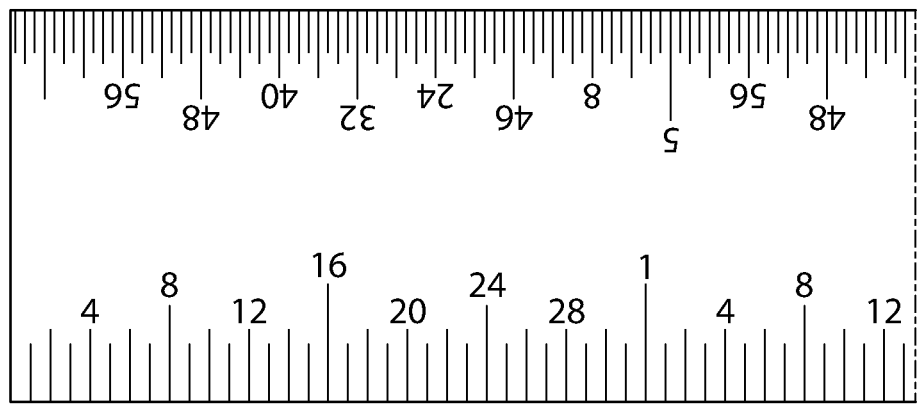
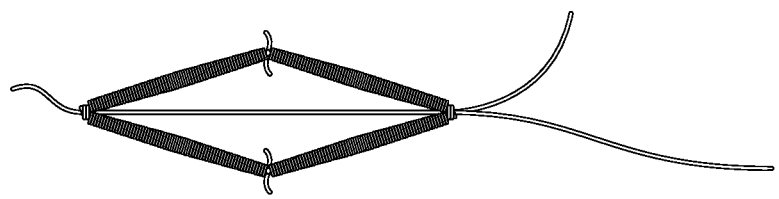
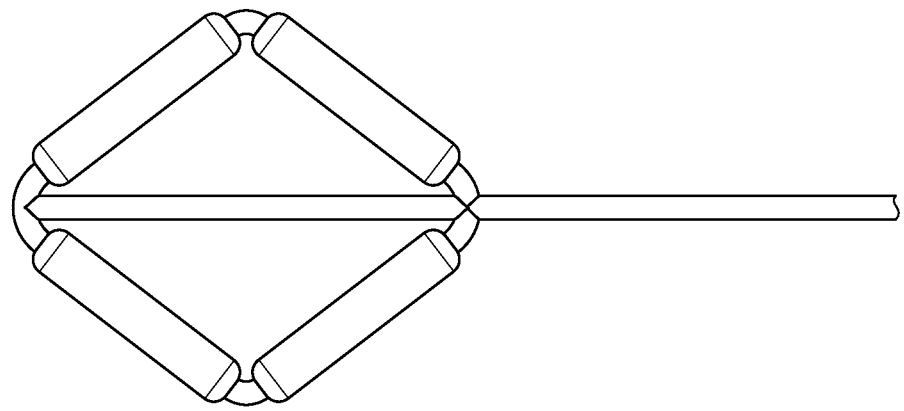
FIG. 4

Diamond Barrel Knots

Diamond Barrel Knot, Barbed
- Materials
    - Polylglycolic acid (PGA) structure
    - Vicryl suture
    - Absorbate, barbed suture
- Concept
    - Barbed suture locks the knot into place

Bowtie Knots

Bowtie Knots
- Materials
    - Polylglycolic acid (PGA) structure
    - Vicryl suture
    - Absorbate, barbed suture
- Concept
    - The knot geometry is designed so there are twice as many loops when pulling out than inserted Blades
- Materials:
  - Stainless Steel
- Concept
  - The blade design creates an opening with the sharpened edge and carries the knot into the tissue by the slot/ shoulder

FIG. 7

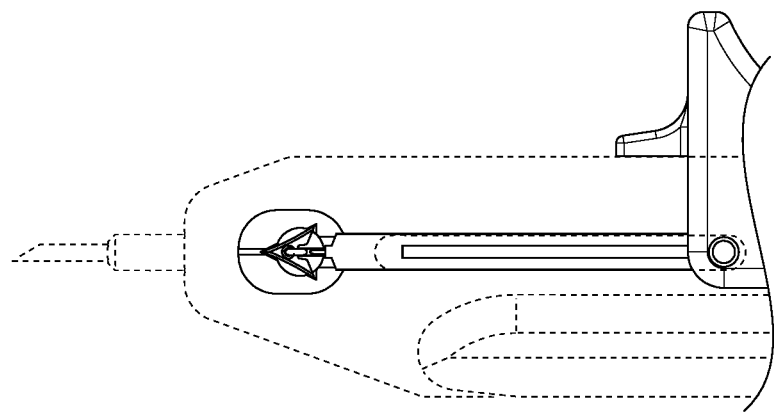
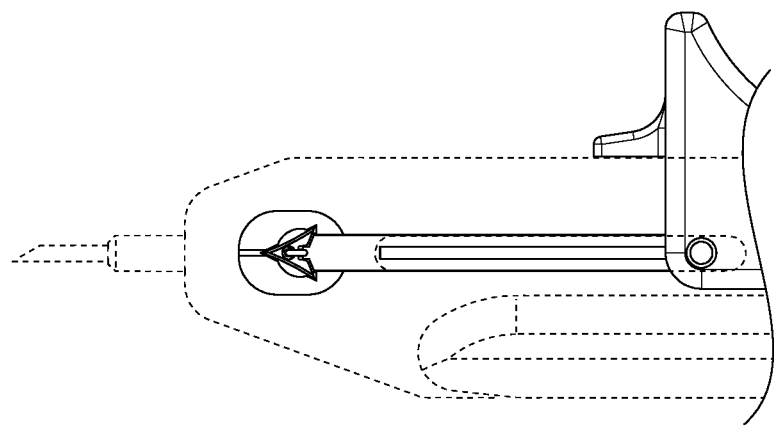
FIG. 11

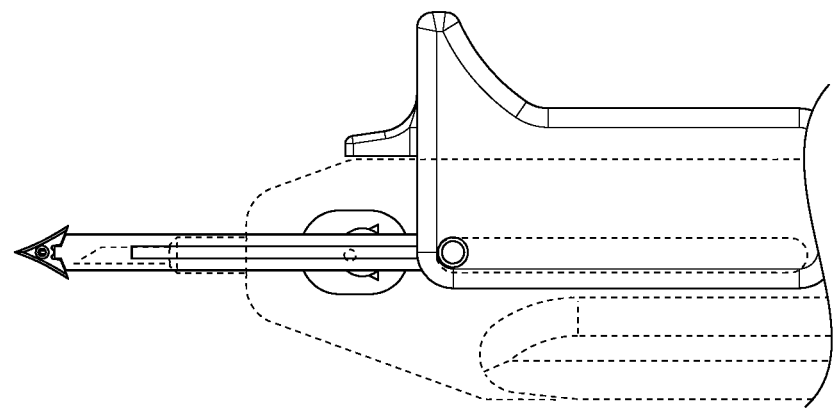
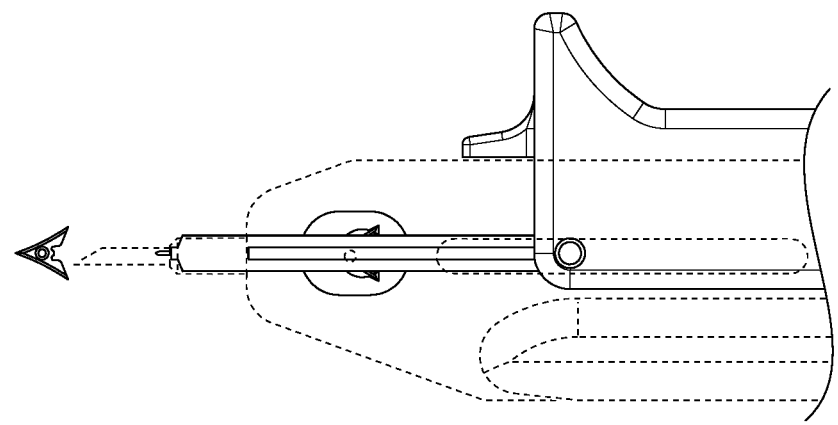
FIG. 12

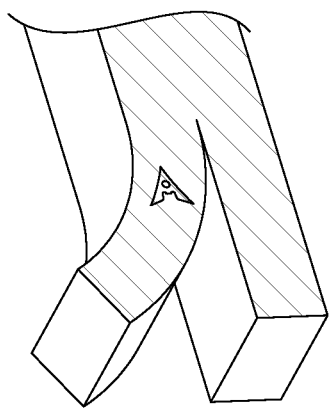
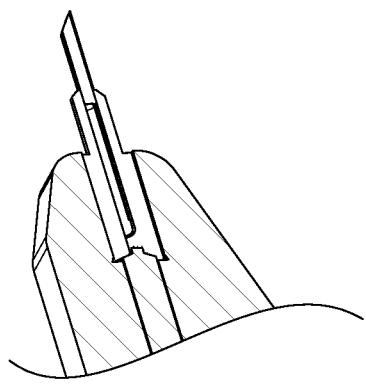
FIG. 37

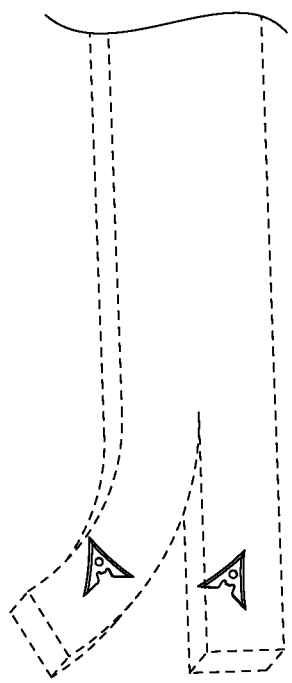
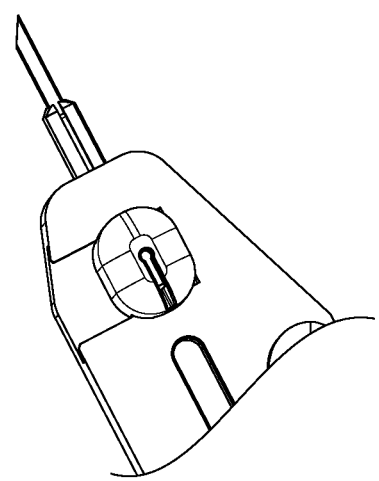
FIG. 44

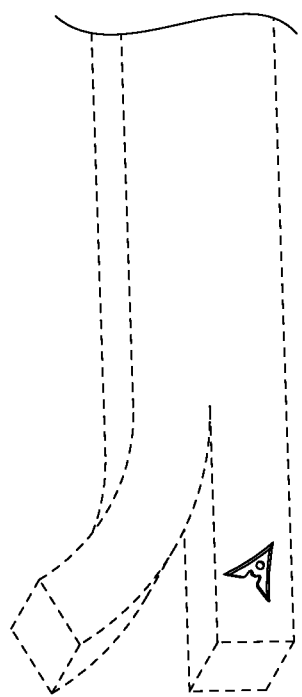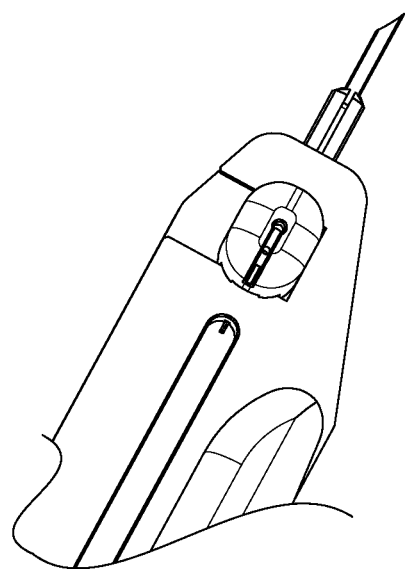
FIG. 46

Solution: Tack Approximator

The Tack Approximator is designed to close dead space with the speed and agility of a surgical glue, complemented by efficacy that surpasses sutures.

- Multilayer Securement
- Controlled Placement
- Rapid Application with Minimal Interruption

The Tack Difference

| | Multi-Layer Tissue Hold | Precise | Rapid |
|---|---|---|---|
| Suture | X | ? | |
| Glue | | X | |
| Staples | ? | | X |
| Mesh | X | X | X |
| Tack | X | X | X |

FIG. 78

Technology

Seamlessly Integrated System
- Pull out force over 2lbs in porcine tissue

Advanced Delivery
- Internal cartridge and exchange
- Ergonomic handle and controls Innovative Securement Devices
- Sutures and device for approximation
- Blind knot

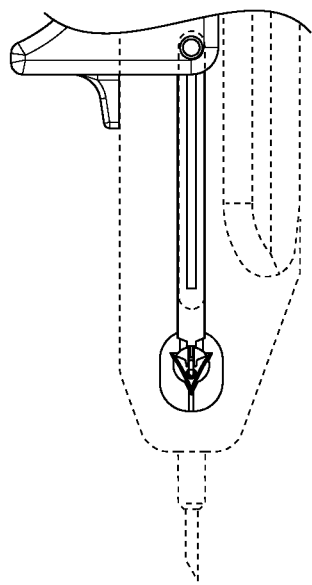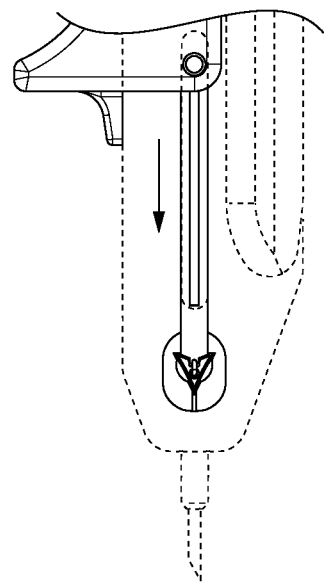
Storyboard
Starting Position
- Fully retracted
Anchor Pick-up
- Advanced pusher to engage the arrowhead anchor
FIG. 81

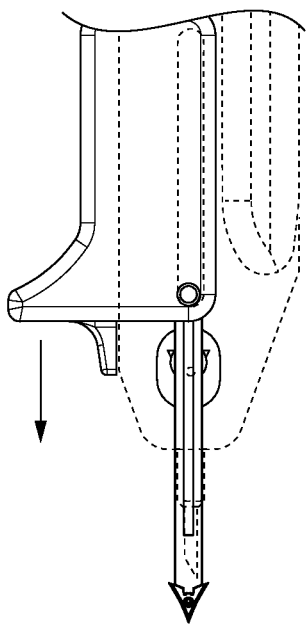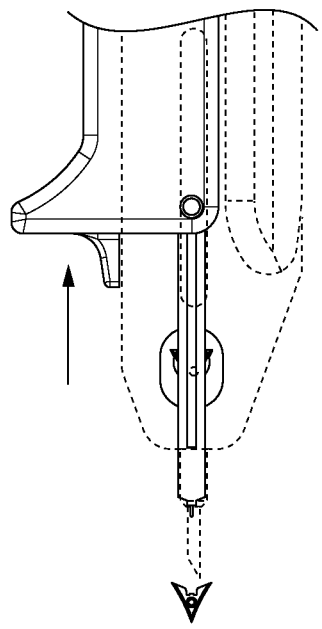
Storyboard
Anchor Insertion
- Advance arrowhead anchor into the target tissue
Retract
- Once the anchor is inserted into the target tissue, retract the pusher
FIG. 82

The Opportunity

Refinement of Multi-Shot Capability
- Optimize design to control tensioning
- Select approach to transition between "shots"

Validation of Clinical Advantage
- Speed and quality of closure
- Lead Indications
  - Abdominoplasty
  - Breast Excisional

US 12,496,057 B2

SUTURE MATERIALS, SUTURE PLACEMENT DEVICES AND METHODS OF SUTURE PLACEMENT AND TISSUE APPROXIMATION

RELATED APPLICATION DATA

This application claims the priority benefit of U.S. Provisional Application Ser. No. 62/902,469, filed Sep. 19, 2019, which is hereby incorporated in its entirety herein by reference.

FIELD OF THE INVENTION

The present invention relates to tissue approximation and fixation, and suture articles and suture placement devices for surgery and the like.

BACKGROUND OF THE INVENTION

Surgical procedures can result in creation of a void around tissues that normally have direct contact and adherence with other tissues. The primary medical concern with respect to this void, also referred to as "dead space" is that fluid, or sometimes gas, can collect within this space. A seroma is the collection of fluid within this potential space. Seromas most often occur at a surgical site where tissue has been intentionally elevated. Friction between these elevated layers, trauma to the tissue or an inflammatory response to foreign bodies [such as implants or mesh] may result in further production of this undesirable fluid.

Seromas can cause discomfort, damage surrounding tissue, compromise normal healing, create a substrate for infection, and cause troublesome aesthetic issues.

On an emotional level, seromas can be taxing for the patient and their care providers, causing anxiety and generating heavy demand for support in the form of office visits and phone calls.

Certain procedures are particularly prone to seroma formation and result in extra precautions to prophylactically address that risk.

One option to decrease the risk is the placement of surgical drains, which may be left in place anywhere from a few days to multiple weeks. They require significant maintenance, are painful, and are mostly, but not completely effective at draining any fluid moving into the space. Drains do not prevent the production of fluid.

One option to close and remove dead space is the placement of internal quilting sutures at the time of surgery. This entails the closure of elevated tissue planes with a large number of meticulously placed sutures to close and obliterate dead space, preventing friction and establishing contact to minimize fluid production. In this spirit, post-surgical compression garments applied to stabilize the tissue to limit edema and fluid production. In addition, the surgeon may frequently place one or more drainage tubes at the site.

Nonetheless, swelling and fluid can collect either immediately or in delayed fashion, even many weeks after surgery. This can result in additional comorbidity, medical cost and procedures for the patient, even jeopardizing the procedure success itself.

Procedures prone to seromas and for which drains are commonly used are numerous but are most frequently seen in both plastic surgery and general surgery. Surgeries that involve elevation and undermining of larger amounts of tissue tend to have higher risks toward seromas.

Some examples include breast surgeries such as lumpectomies, mastectomies, reductions, abdominoplasties, body lift procedures, hernia repairs, lymph node removal, tumor resections, and manipulation of major organs.

There are major costs and complications associated with post-surgical management of dead space and typically involve seromas, infection, and hematomas [bleeding]. Serious or long-term problems related to a seroma are regarded as infrequent but can be costly, time-consuming, and require additional surgery and treatment.

However, there remains a need for efficient and effective tissue approximation in order to best reduce seroma formation, as well as to reduce or eliminate the need for draining.

SUMMARY OF THE INVENTION

The present invention further includes a suture article adapted to be anchored into tissue, the suture comprising: (a) a length of an elongate, flexible suture or suture-like material; and (b) a plurality of barbed anchor articles slidingly disposed along said length of an elongate suture material and shaped so as to resist the withdrawal from tissue once placed into tissue as said length of suture material is moved with respect to said drawn through said plurality of barbed anchor articles once placed into tissue.

In one embodiment, each of said plurality of barbed anchor articles comprise barbs of sufficient number and length so as to resist the withdrawal once placed into a tissue or through at least one tissue surface. For typical surgical procedures involving tissue approximation or attachment, each of said plurality of barbed anchor articles comprise barbs numbering from 2-10.

In some embodiments, the at least two (or a plurality) of barbed anchor articles comprises an aperture adapted to allow said length of an elongate suture to slidingly pass.

In other embodiments, each of said barbed anchor articles comprises barbs numbering at least 3. Non-limiting examples are show in FIG. 2.

In yet other embodiments, each of said barbed anchor articles has a perimeter and a slot extending from said perimeter toward the geometric center thereof, said slot of sufficient width to accommodate the sliding engagement of said length of said elongate suture material passes, once said barbed anchor article is placed into or through the tissue or tissue surface. In some of these embodiments, the barbed anchor articles comprise barbs number at least 2, and, of these variants, each of said barbed anchor articles comprise at least 2 barbs on a first side thereof and said slot on a second side thereof. In some of these embodiments, said plurality of barbed anchor articles number from 2-10 barbed anchor articles.

In some embodiments, any of the at least two (or plurality) of barbed anchor articles of barbed anchor articles comprise a resorbable material, such as those selected from the group consisting of the materials described herein.

Another variant of the invention includes suture articles that represent improvements over those disclosed in United States Patent Application Nos. 20180193014 and 20180132843, which are hereby incorporated herein by reference.

The present invention further includes a suture article adapted to be anchored into tissue, the suture comprising: (a) a length of an elongate, flexible suture material; and (b) a plurality of knots slidingly disposed along a length of an elongate suture material and shaped so as to resist the withdrawal from tissue once placed into tissue as said length of suture material is moved with respect to said drawn through said plurality of knots once placed into tissue.

In some embodiments, the primary or terminal knot is formed so as to expand upon tension being exerted on the suture material, such as a knot having one or more relatively rigid windings that remain dimensionally stable as the knot is inserted in or through the tissue, but which then can be expanded to a shape that better resists withdrawal. An example is a diamond-shaped knots comprising relatively rigid sides or lobes that extend laterally from the suture material. See FIG. 4.

Subsequent knots, such as those shown in FIGS. 4, 5, 6, 9, 14 and 15 may be slidingly attached to the suture material along its length so as to be adapted to act as anchors once inserted into or through a tissue or tissue surface.

The present invention further includes a device for inserting a suture material adapted to be anchored into opposed tissue surfaces, and to approximate said opposed tissue surfaces, said device comprising: (a) a containment portion adapted to contain and dispense a length of an elongate suture material, said length of an elongate suture material having at least two (or a plurality) of barbed anchor articles (as described more fully hereinabove) slidingly disposed along said length of an elongate suture material, and shaped so as to resist the withdrawal from tissue once placed into tissue as said length of suture material is moved with respect to said drawn through said plurality of barbed anchor articles once placed into tissue; and (b) an insertion portion adapted to insert at least one of said plurality of barbed anchors in a series into each of said opposed or otherwise (typically) acutely facing tissue surfaces.

Some embodiments of the device may use a portion of the insertion device (such as the handle) to contain a folded or spooled length of suture material.

Some embodiments of the device may additionally comprise means to draw said suture material so that it is drawn through said plurality of barbed anchor articles once placed into tissue, so as to approximate said opposed tissue surfaces.

The at least two (or a plurality) of barbed anchor articles in some embodiments comprise those having barbs of sufficient number and length so as to resist the withdrawal once placed into or through the tissue or tissue surface.

Some embodiments of the device may feature an insertion portion adapted to insert at least one of said plurality of barbed anchors in a series into each of said opposed tissue surfaces. The insertion portion in some embodiments may take the form of a sharp plastic or metal portion that extends from the device and is shaped so as to releasably engage a barbed anchor article, and to urge it into or through the tissue or tissue surface.

The insertion portion in other variants of the device may feature a handle that supports a reciprocating insertion portion that is adapted to releasably engage barbed anchor articles in a series from a cartridge or similar structure of the device adapted to dispense the barbed anchor articles in series; and in some embodiments, the barbed anchor articles will be threaded or engaged (such as through the aperture or slot as described), in such a way that the barbed anchor carries the slidingly engaged suture material into or through the tissue or tissue surface.

Still further embodiments of the suture placement device include those designed to insert the anchors of the suture articles into opposing tissue surfaces and being comprising: (a) a handle portion, (b) an insertion portion extending from the distal portion of the handle portion and having a distal end comprising an anchor directing portion designed as to releasably engage and guide into position the anchor portions of the suture article, (c) an anchor delivery portion actuatable from the handle to engage with the anchors and to move them from the handle portion to the distal end of the insertion portion to the desired location of release, and (d) a suture article comprising a length of flexible suture and having one or more anchors positioned within its length and/or attached to either or both ends of the suture length. The insertion of the suture articles may be done in a "blind" fashion, such that the anchors are embedded across and among multiple layers of tissue.

The present invention further includes a method for approximating opposed tissue surfaces, said method comprising the steps: (a) inserting below or through a first of said opposed tissues or tissue surfaces at least one first barbed anchor article, (b) inserting below or through a second of said opposed tissues or tissue surfaces at least one second barbed anchor article, said at least one first and at least one second barbed anchor articles slidingly disposed along said length of an elongate suture material, and shaped so as to resist the withdrawal from below said respective tissue surfaces once so inserted, and (c) drawing upon said length of an elongate suture material so as to approximate said opposed tissues or tissue surfaces.

Some variations of the method may include the placement of a first plurality of first barbed anchor articles in first of said opposed tissues or tissue surfaces, and/or the placement of a second plurality of first barbed anchor articles in second of said opposed tissues or tissue surfaces. These variations of the method may include those wherein said at least one first barbed anchor article comprises a plurality of first barbed anchor articles, and wherein said at least one second barbed anchor article comprises a plurality of second barbed anchor articles.

The suture article placement device of the present invention may be described generally as including a suture placement device adapted to insert a length of suture material through a tissue to a space beyond a distal surface of the tissue so as to maintain the length of suture material within the tissue and resist removal thereof, the device comprising (a) a handle portion, (b) an insertion portion extending from the distal portion of the handle portion and having a distal end comprising an anchor directing portion designed as to releasably engage and guide into position the anchor portions of the suture article, (c) an anchor delivery portion (pusher) actuatable from the handle to engage with the anchors and to move them from the handle portion to the distal end of the insertion portion to the desired location of release, and (d) a suture article comprising a length of flexible suture and having one or more anchors positioned within its length and/or attached to either or both ends of the suture length. The anchors will secure the suture to the tissue or allow the suture to move through the body of the anchors such that proper tensioning and resulting tissue approximation may be achieved.

The suture article placement device of the present invention also may be described as including a suture placement device adapted to insert anchors and a length of suture material into the internal mass of or through a tissue to a space beyond a distal surface of the tissue so as to maintain the length of suture material within or against the tissue and resist removal thereof. In another embodiment, the placement device could be configured to hold and sequentially deliver a plurality of suture articles and related anchors thus making it a multi-shot device. It is also possible to configure the device to work with automated or robotic devises as well as visual devices and minimally invasive devices and procedures.

The handle portion of the placement device may be of any shape to allow for the device to be ergonomically held and actuated during its intended use. The handle portion may also have the ability to contain or interface with a magazine which may hold and dispense a plurality of suture articles and their related anchors, and possibly sequentially feed and deploy those suture articles and related anchors making it capable of repeating its suture article placement multiple times. Thus a multi-shot suture article placement device.

The insertion portion of the placement device may be attached rigidly to the handle and will preferably have a pointed or sharp distal end suitable to pierce the tissue to the depth and location desired for the preferred anchor deployment. It may have features or clearance at the proximal end and/or within the handle portion to allow for engagement with the anchor(s) to be delivered. The cross section of the insertion portion may be formed from a cylindrical cannula such a hypodermic needle stock and may have a slot or a cutaway section to allow clearance for the anchor to pass within or alongside the insertion portion when the delivery portion is actuated to translate the anchor toward the distal end of the insertion portion. It may also contain features to allow clearances for the suture article and free ends of the suture.

The anchor delivery (pusher) portion of suture placement device may be operable from the handle portion, to help contain and urge the anchor(s) along the insertion portion to a position and finally distal to the insertion portion to the desired location of release. It can have a distal shape which allows it to interface, engage, or possibly capture the anchor to be delivered, The anchor delivery portion of the suture placement device may be controlled by any number of mechanisms which can result in the linear motion required to urge and deliver the anchor(s) along the Insertion portion.

The suture article is comprising a length of flexible suture and having one or more anchors positioned within its length and/or attached to either or both ends of the suture length. The anchors will secure the suture to the tissue or allow the suture to move through the body of the anchors such that proper tensioning and resulting tissue approximation may be achieved. The anchors may be of any number of 2 dimensional or 3 dimensional shapes and configurations designed specifically to optimize the delivery and/or the fixation ability of the anchors based on the tissue type, the intended procedure, or specific application.

For purposes of discussion, the suture article described in this disclosure consists of a length of suture with both ends free and two (2) anchors disposed along its length with holes to allow the suture portion to freely move within the holes located in the body of the anchors.

It can be conceived that in other configurations of the suture article, alternately shaped anchors attached, assembled, or fixed to the suture article or to either or both ends of the suture article.

Other

Other embodiments, shapes, and configurations of the suture article placement device and suture article with related arrows as described above can be conceived using the basics of the handle portion, the insertion portion, the delivery portion (pusher), the suture portion, and its related anchors while still retaining the basic concept of development, fixation, approximation, and tensioning. It can also be conceived that in other configurations of the suture article, alternately shaped anchors attached, assembled, or fixed to the suture article or to either or both ends of the suture article.

Method of Inserting a Suture Article with Anchors

The method of tissue approximation or attachment that may be carried out for example by using the handle portion of the described device and anchor delivery portion (pusher) to place the first anchor portion of the suture article (the suture article comprising the following portions: (i) a principal length of flexible suture material portion having a flexible structure; (ii) at least two anchors (and preferably a plurality of 2 to about 10 or more) disposed within the length of the suture at least two and preferably each in the series able to move freely and independently along the length of the suture), through a first tissue surface to a space beyond the proximal surface and in some embodiments beyond a distal surface of the tissue so as to maintain the length of suture material within the tissue and resist removal thereof.

This may be carried out such as may be described generally as (a) using the handle portion with its sharp insertion portion for obtaining access to a tissue through its facing surface and through the distal surface, the distal surface adjacent to free space; (b) using the anchor delivery (pusher) portion to deploy the first anchor (with the flexible suture material trailing) through the facing surface, through the distal surface and into the free space where the anchor will be deposited and released with the tails of the suture portion still trailing to the outside of the facing surface of the tissue. The second anchor of the suture article is still resident in the handle portion of the placement device with one tail of the suture still free to pass through a hole within its body. The pusher is then retracted into the handle portion, and the insertion portion and handle portion are extracted from the tissue leaving the suture article imbedded within the tissue and the suture tails. As the delivery portion (pusher) is retracted into the handle where it will engage with the second anchor and position it ready to be deployed as the first.

As with the first anchor deployment and again using the handle portion of the device and anchor delivery portion (pusher) to place the second anchor portion of the suture article (the suture article comprising the following portions: (i) a principal length of flexible suture material portion having a flexible structure; (ii) two anchors disposed within the length of the suture and each able to move freely and independently along the length of the suture, through a second and opposing tissue surface (to be approximated to the first tissue surface) to a space beyond a distal surface of the tissue so as to maintain the length of suture material within the tissue and resist removal thereof may be described generally as (a) using the handle portion with its sharp insertion portion for obtaining access to the second opposing tissue through its facing surface and through the distal surface, the distal surface adjacent to free space; (b) using the anchor delivery (pusher) portion to deploy the second anchor (with the flexible suture material trailing and with one of the free ends still passing through the body of the first deployed anchor in the first tissue) through the second tissue facing surface, through the distal surface and into the free space where the anchor will be deposited and released with the tails of the suture portion still trailing to the outside of the facing surface of the tissue and with one of the free ends still passing through the body of the first deployed anchor in the first tissue. The pusher is then retracted into the handle portion, and the insertion portion and handle portion are extracted from the tissue leaving the suture article imbedded within the tissue and the suture tails still with free ends and with the center section of the suture between the first and second deployed anchors in the first and second opposing tissues.

Multi-Shot Suture Article Placement Device

As the delivery portion (pusher) is retracted into the handle portion, it may conceivably engage with another suture article and position it ready to be deployed as described above. This would allow device to repeat the operation as described above a plurality of times, thus becoming a "multi-shot" suture article placement device.

Tensioning:

The Operator may now address the two free ends of the suture article. As the two free ends of the suture are pulled, the suture freely moves through the two anchor bodies which are anchored in the two opposing tissues, and as the segment of the suture between the anchors shortens, the two opposing surfaces of the first and second tissues will be drawn together thus advantageously approximating the surfaces. The operator will have control of the tensioning of the sutures to establish optimum approximation contact, minimize puckering or looseness, optimize blood flow and healing, minimize possibilities of seromas, etc. At this point the operator may attach the free ends of the suture article using conventional knotting techniques, any of a variety of cinches as described in previous disclosures, thermally weld using a heating element possibly attached to the handle or insertion portion, or other fixation method.

Materials

A partial list of materials frequently used in medical equipment and devices of this type (other than metals, many are available as USP Class VI) may include:
  a. Metals:
  b. 300 Series Stainless Steel
  c. Titanium
  d. Nickel Titanium Alloys
  e. Aluminum
  f. Polymers:
  g. Polycarbonate (PC)
  h. Acrylonitrile butadiene styrene (ABS)
  i. ABS/PC Copolymers
  j. Acetyl (Delrin®, Celcon®)
  k. Modified Acrylics
  l. Polyether Ether Ketone (PEEK)
  m. Polypropylene (PP)
  n. Polyethylene (PE)
  o. Poly Vinyl Chloride (PVC)
  p. Polytetrafluoroethylene (PTFE)
  q. Elastomers:
  r. Thermoplastic Elastomers (TPE)
  s. Thermoplastic Urethanes (TPU)
  t. Fluoroelastomer (Viton®)
  u. Silicone
  v. Latex
  w. Polyisoprene
  x. Bio-absorbable:
  y. Polydioxanone (PDS)
  z. Polyglycolic Acid PGA
  aa. Polylactic Acid (PLA)
  bb. Poly-L-lactic Acid (PLLA)

BRIEF DESCRIPTION OF THE DRAWINGS

FIG. 1 contains top perspective, plan and lower perspective views of an apertured barbed anchor article that may be used in accordance with one embodiment of the invention.

FIG. 3 contains two perspective views of a device for inserting a suture material, in accordance with one embodiment of the invention.

FIG. 4 contains lateral views of a "diamond barrel" knotted suture material in both expanded and collapsed states, in accordance with one embodiment of the invention.

FIG. 7 contains top perspective views of two different insertion portions of suture insertion device, in accordance with one embodiment of the invention.

FIG. 11 contains two sectioned elevational views of a suture insertion device, in accordance with one embodiment of the invention.

FIG. 12 contains two sectioned elevational views of a suture insertion device, in accordance with one embodiment of the invention.

FIG. 37 is a detailed rear perspective view of a suture insertion device shown in position withdrawn from in between opposed tissue portions having surfaces to be approximated and having inserted a barb, in accordance with one embodiment of the invention.

FIG. 44 is a detailed lateral perspective view of a suture insertion device shown in position withdrawn from in between opposed tissue portions having surfaces to be approximated and having inserted two barbs, in accordance with one embodiment of the invention.

FIG. 46 is a detailed lateral perspective view of a suture insertion device shown in position withdrawn from in between opposed tissue portions having surfaces to be approximated and having inserted a first of two barbs, in accordance with one embodiment of the invention.

FIG. 78 is a table summarizing the characteristics of several tissue approximation methods.

FIG. 81 contains two lateral perspective views of a device shown with a cartridge adapted to insert a suture material with a series of apertured barbs and showing the fully retracted and anchor pick-up position of the reciprocating actuator, in accordance with one embodiment of the invention.

FIG. 82 contains two lateral perspective views of a device shown with a cartridge adapted to insert a suture material with a series of apertured barbs, showing the anchor insertion and retracted position of the reciprocating actuator, in accordance with one embodiment of the invention.

DETAILED DESCRIPTION OF THE PREFERRED EMBODIMENTS

FIG. 1 contains top perspective, plan and lower perspective views of an apertured barbed anchor article that may be used in accordance with one embodiment of the invention, the former show with a length of suture material slidingly engaged in its central aperture; and showing a photograph thereof against a ruler as an indicator of general size (which may be generally on the order of from about 1/16 to 1/4 inch, or greater, depending upon utilitarian application).

Figure 2:
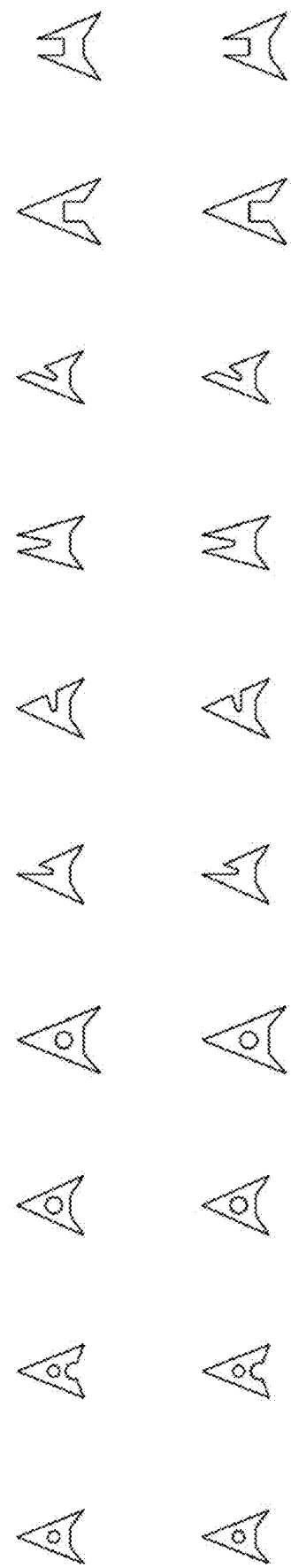
FIG. 2 contains several profile views of non-limiting shape and designs of an apertured or slotted barbed anchor article as an alternative to the barbed anchor article of FIG. 1, in accordance with one embodiment of the invention.

FIG. 2 contains several profile views of non-limiting shape and designs of an apertured or slotted barbed anchor article as an alternative to the barbed anchor article of FIG. 1, and that may be used in accordance with other embodiments of the invention. The slots are typically deep enough to contain the entire diameter of the suture material, though other slot design may be used.

FIG. 3 contains two perspective views of a device for inserting a suture material adapted to be anchored into tissue or through tissue surfaces having a reciprocating slide to insert in a series apertured or slotted barbed anchor articles disposed along the length of a suture material, in accordance with one embodiment of the invention.

FIG. 4 contains lateral views of a "diamond barrel" knotted suture material in both expanded and collapsed states; and showing a photograph thereof against a ruler as an indicator of general size (which may be generally on the order of from about 1/4 inch to 3/4 inch, or greater, depending upon utilitarian application. This view shows that knots featuring relatively rigid windings such as a "diamond barrel" knot may be used to provide a knot that can be expanded by drawing upon the extending suture material to cause the knot to change from a relatively barrel shape to a diamond shape, in accordance with one embodiment of the invention.

Figure 5:
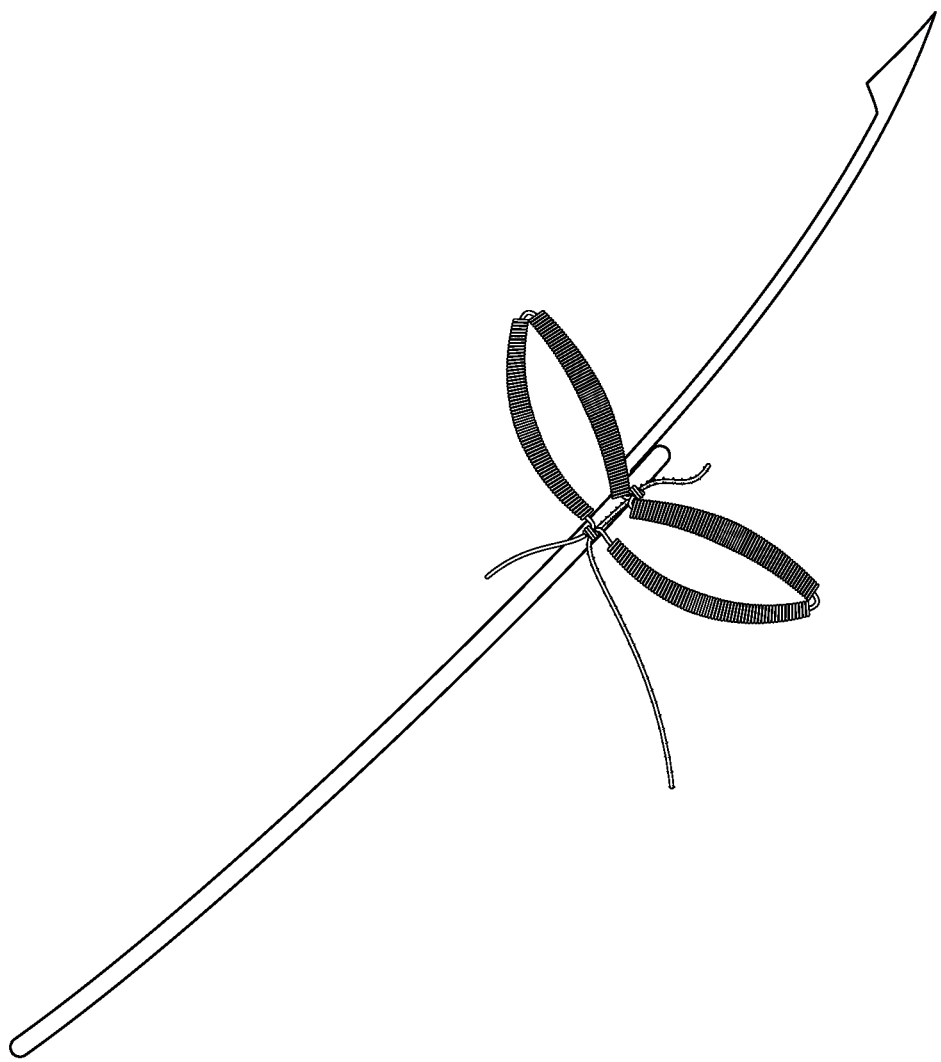
FIG. 5 is a lateral view of a "diamond barrel" knotted suture material in a collapsed state, in accordance with one embodiment of the invention.

FIG. 5 is a lateral view of a "diamond barrel" knotted suture material in a collapsed state and disposed along the length of a suture material that is provided with small barbs that may allow the folded knot to be inserted into or through tissue, while resisting sliding along the length of the suture material to permit the second a subsequent knots to be inserted into tissue while permitting the suture material to be drawn through the inserted knots to cause the engaged tissue or tissue surfaces to be gathered, approximated or attached, in accordance with one embodiment of the invention.

Figure 6:
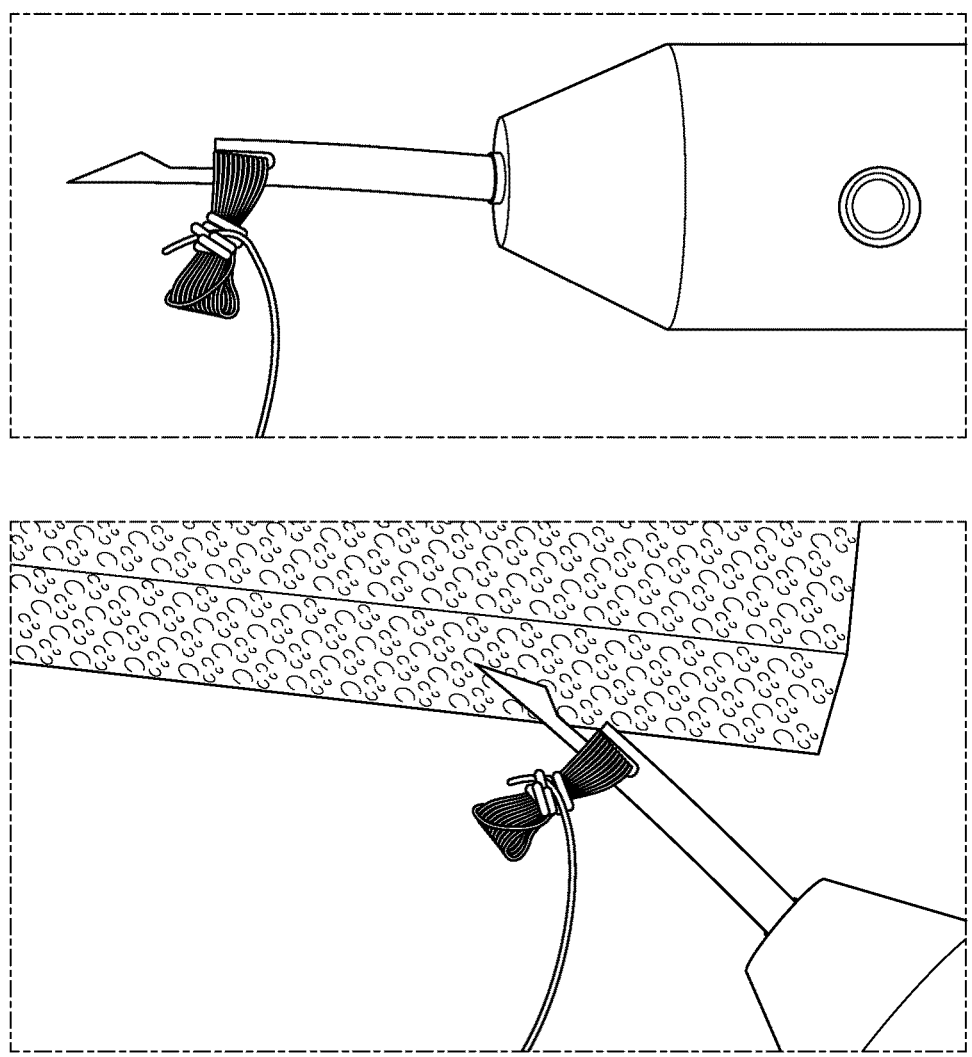
FIG. 6 contains lateral elevation and top perspective views of suture insertion device, in accordance with one embodiment of the invention.

FIG. 6 contains lateral elevation and top perspective views of suture insertion device with an insertion portion releasably engaging a bow-tie-shaped knot in preparation for tissue insertion, in accordance with one embodiment of the invention.

FIG. 7 contains top perspective views of two different insertion portions of suture insertion device adapted to releasably engage a barbed anchor or knot winding as described herein, in preparation for tissue insertion, in accordance with one embodiment of the invention.

Figure 8:
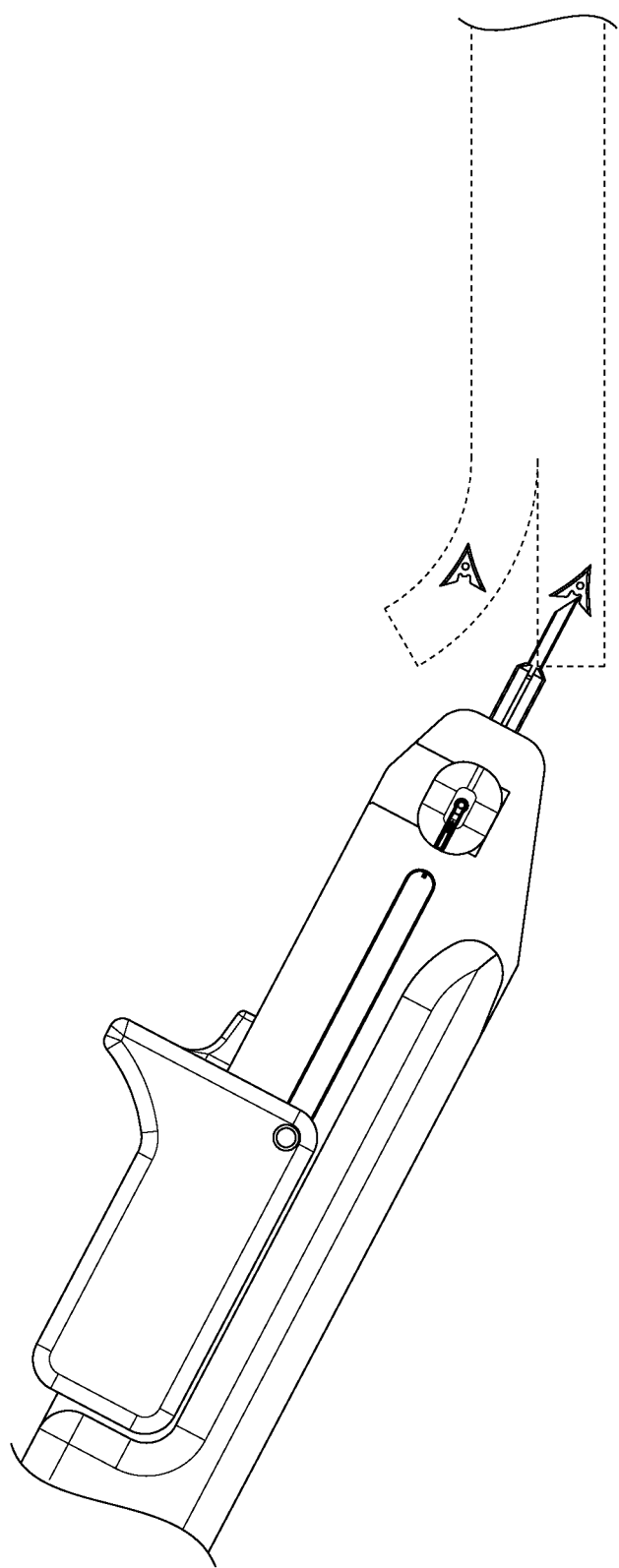
FIG. 8 contains lateral elevation view of a suture insertion device, in accordance with one embodiment of the invention.

FIG. 8 contains lateral elevation view of a suture insertion device with an insertion portion having released inserted barbed anchors into tissue.

Figure 9:
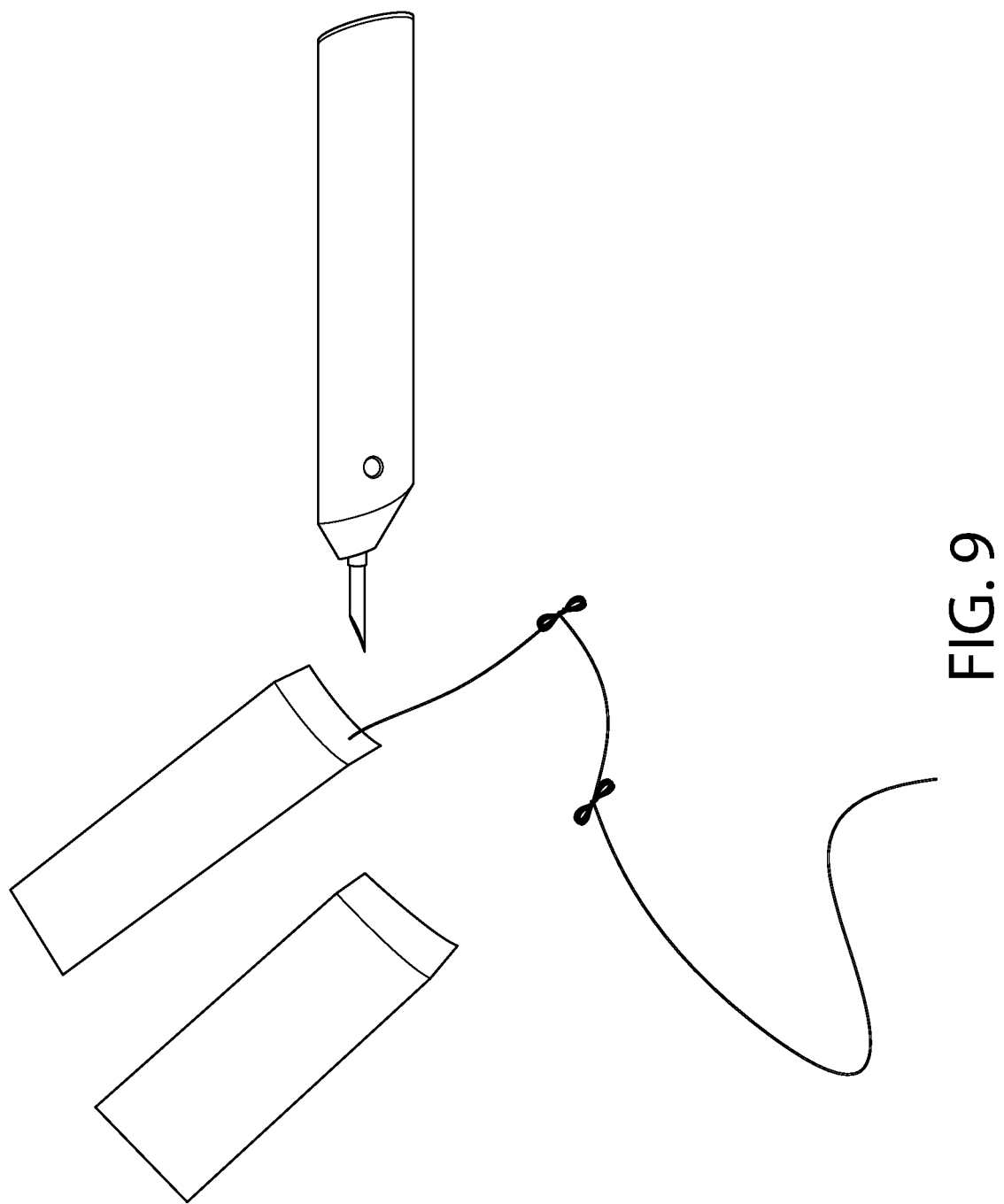
FIG. 9 is a photograph of a suture insertion device and two test blocks shown beside a length of suture material, in accordance with one embodiment of the invention.

FIG. 9 is a photograph of a suture insertion device and two test blocks shown beside a length of suture material bearing two bow-tie-shaped knots, showing generally the scale of same, in accordance with one embodiment of the invention.

Figure 10:
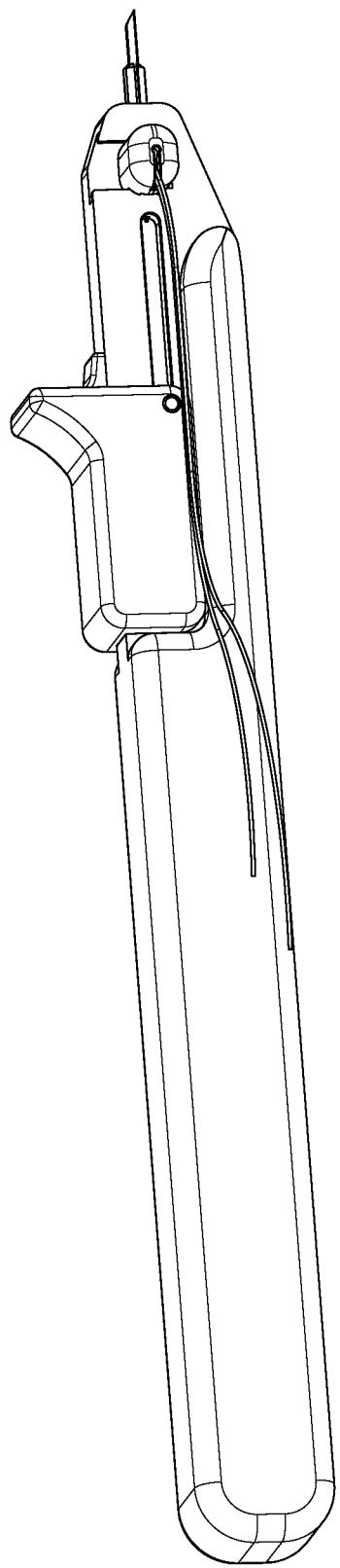
FIG. 10 contains lateral rear perspective view of a suture insertion device, in accordance with one embodiment of the invention.

FIG. 10 contains lateral rear perspective view of a suture insertion device with a retracted insertion portion controlled by a slide button, and showing the position of a magazine of barbed anchors with a trailing length of suture material, in accordance with one embodiment of the invention.

FIG. 11 contains two sectioned elevational views of a suture insertion device with a retracted insertion portion controlled by a slide button, and showing the position of a barbed anchor dispensed from a magazine of barbed anchors, and showing the direction of deployment by the insertion portion in the second figure in the series, in accordance with one embodiment of the invention.

FIG. 12 contains two sectioned elevational views of a suture insertion device with an extended insertion portion being controlled by the slide button, and showing the position of a barbed anchor as it is being deployed in series from a magazine of barbed anchors, and showing the direction of deployment by the insertion portion in the second figure in the series, with the trailing length of suture material implied, in accordance with one embodiment of the invention.

Figure 13:
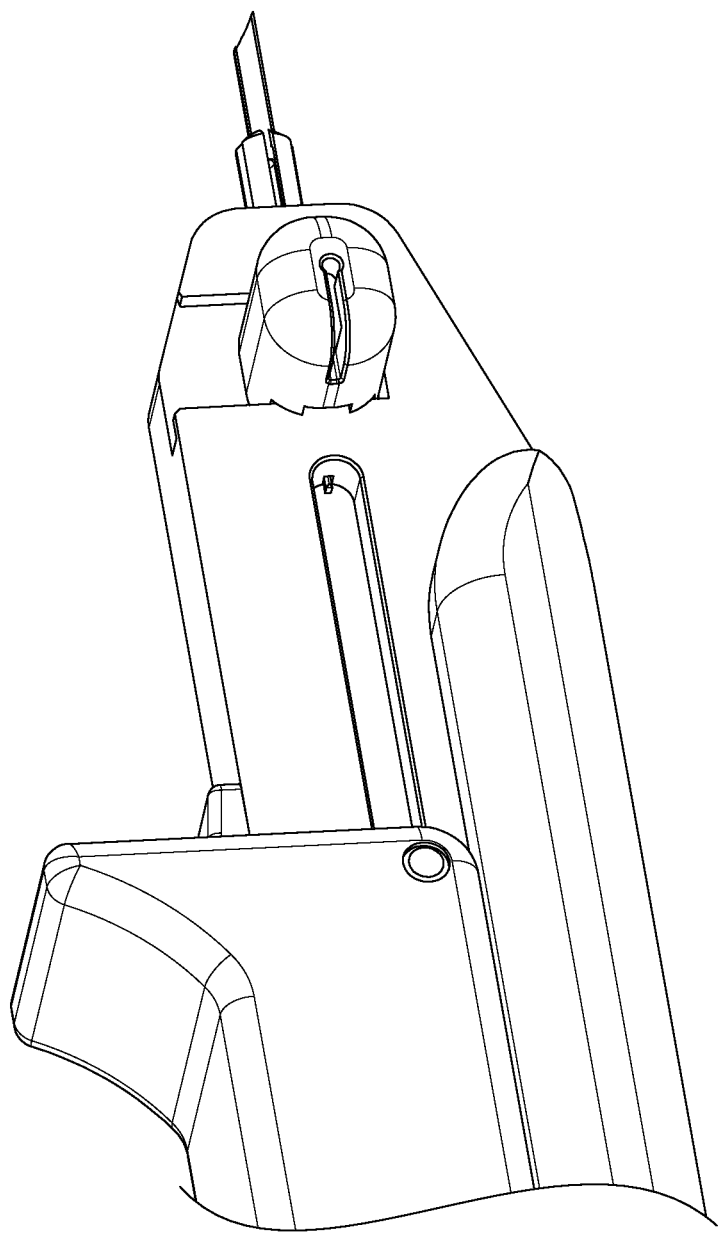
FIG. 13 is a detailed rear perspective view of a suture insertion device, in accordance with one embodiment of the invention.

FIG. 13 is a detailed rear perspective view of a suture insertion device with an extended insertion portion being controlled by the slide button in the retracted position, and showing the position of a barbed anchors and spool of suture material contained within a magazine, ready for sequential deployment by the insertion portion, in accordance with one embodiment of the invention.

Figure 14:
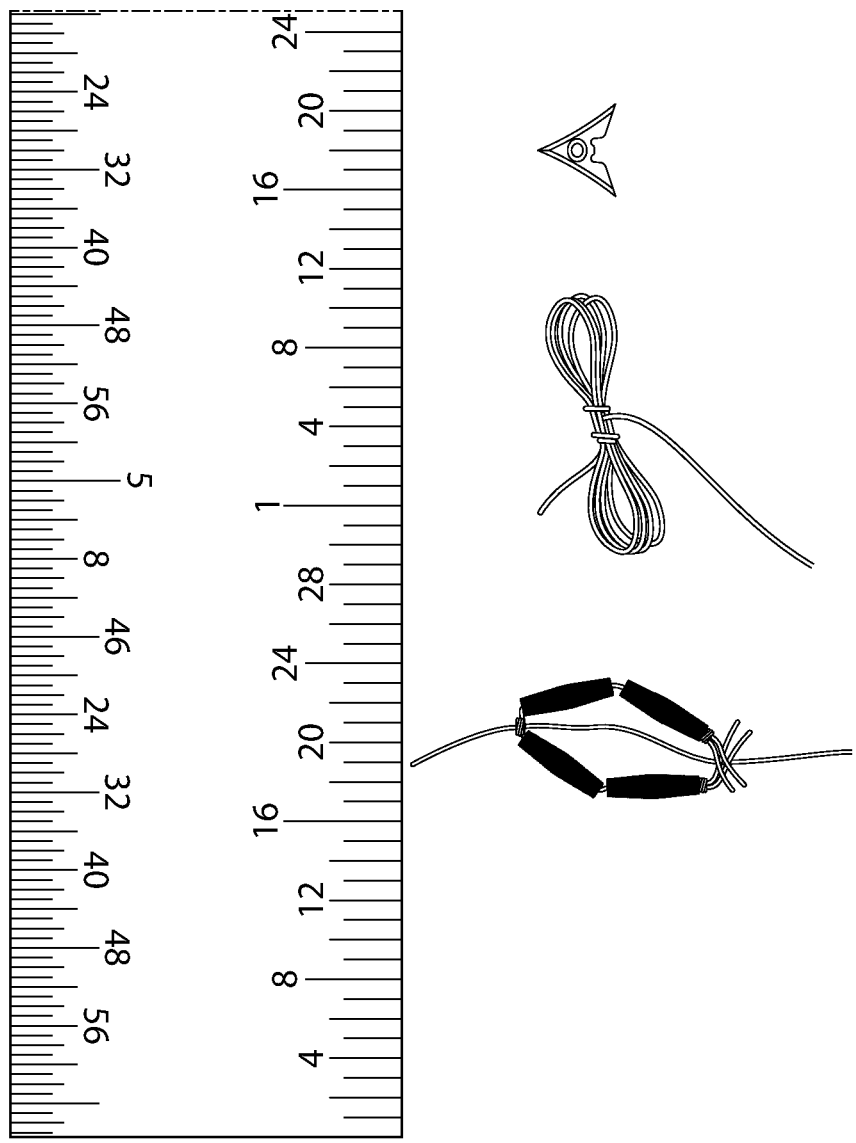
FIG. 14 is a lateral view of a "diamond barrel" knotted suture material in a collapsed state and a bow-tie-shaped knot, in accordance with one embodiment of the invention.

FIG. 14 is a lateral view of a "diamond barrel" knotted suture material in a collapsed state and a bow-tie-shaped knot, each at the end of a length of a suture material; and showing a photograph thereof against a ruler as an indicator of general size (which may be generally on the order of from about 1/4 inch to 3/4 inch, or greater, depending upon utilitarian application), in accordance with one embodiment of the invention.

Figure 15:
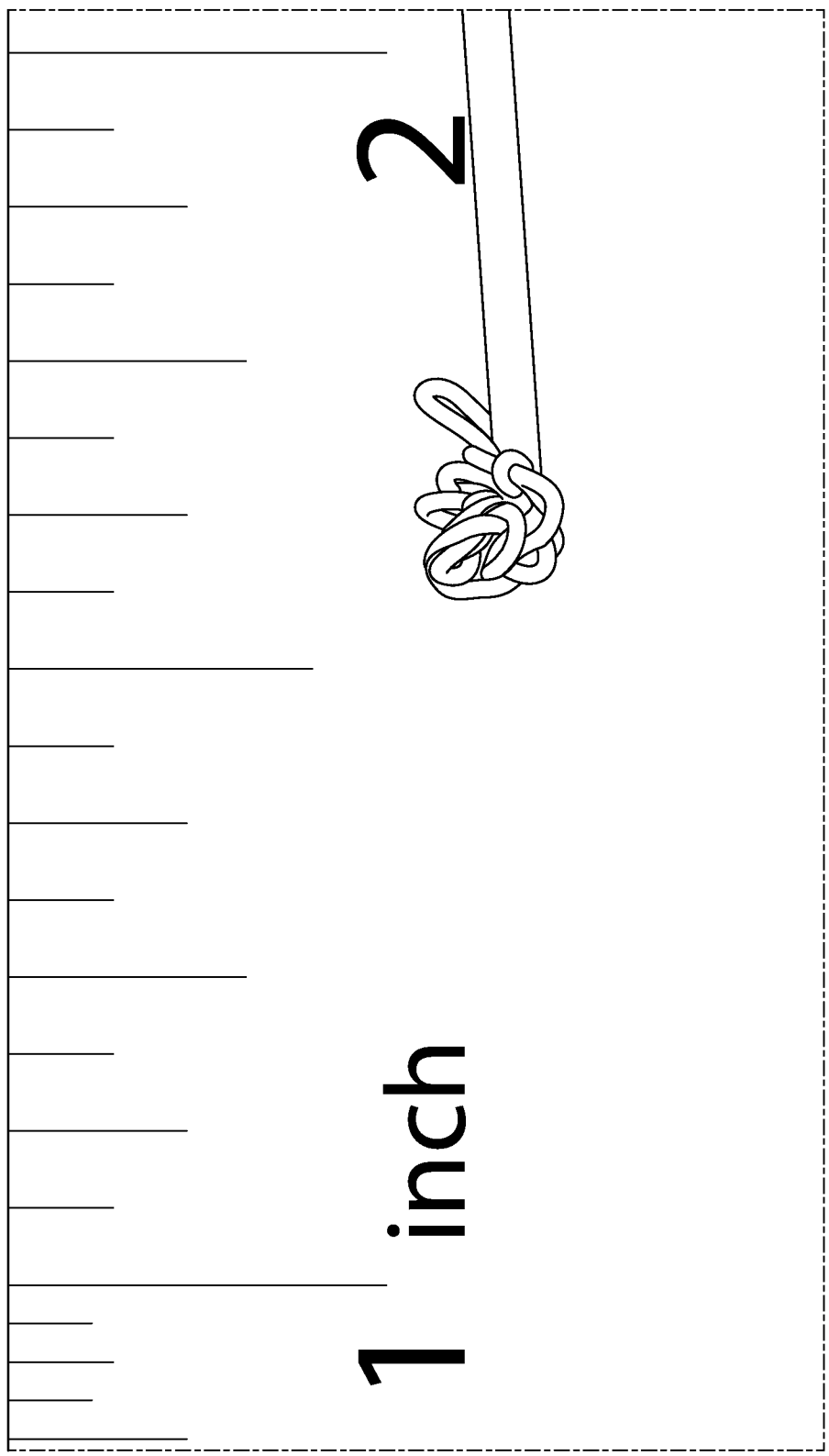
FIG. 15 is a photograph showing a lateral view of a rounded knotted suture material, in accordance with one embodiment of the invention.

FIG. 15 is a photograph showing a lateral view of a rounded knotted suture material and engaged with a suture device insertion portion, in accordance with one embodiment of the invention.

Figure 16:
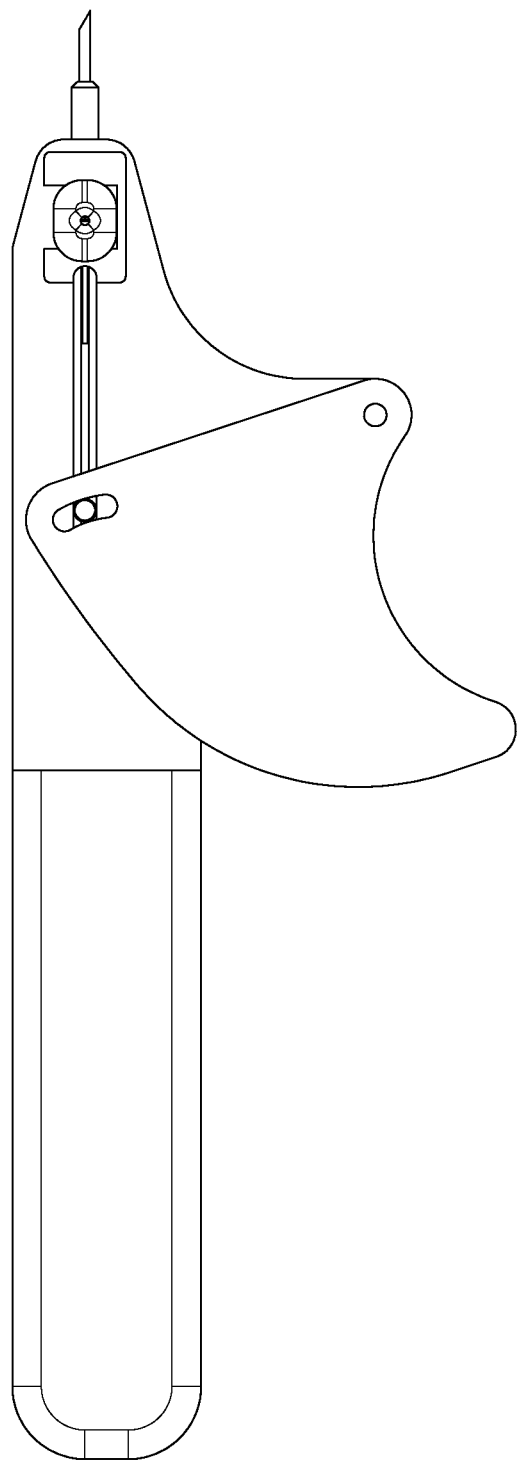
FIG. 16 is a lateral view of a suture insertion device, in accordance with one embodiment of the invention.

FIG. 16 is a lateral view of a suture insertion device, in accordance with one embodiment of the invention.

Figure 17:
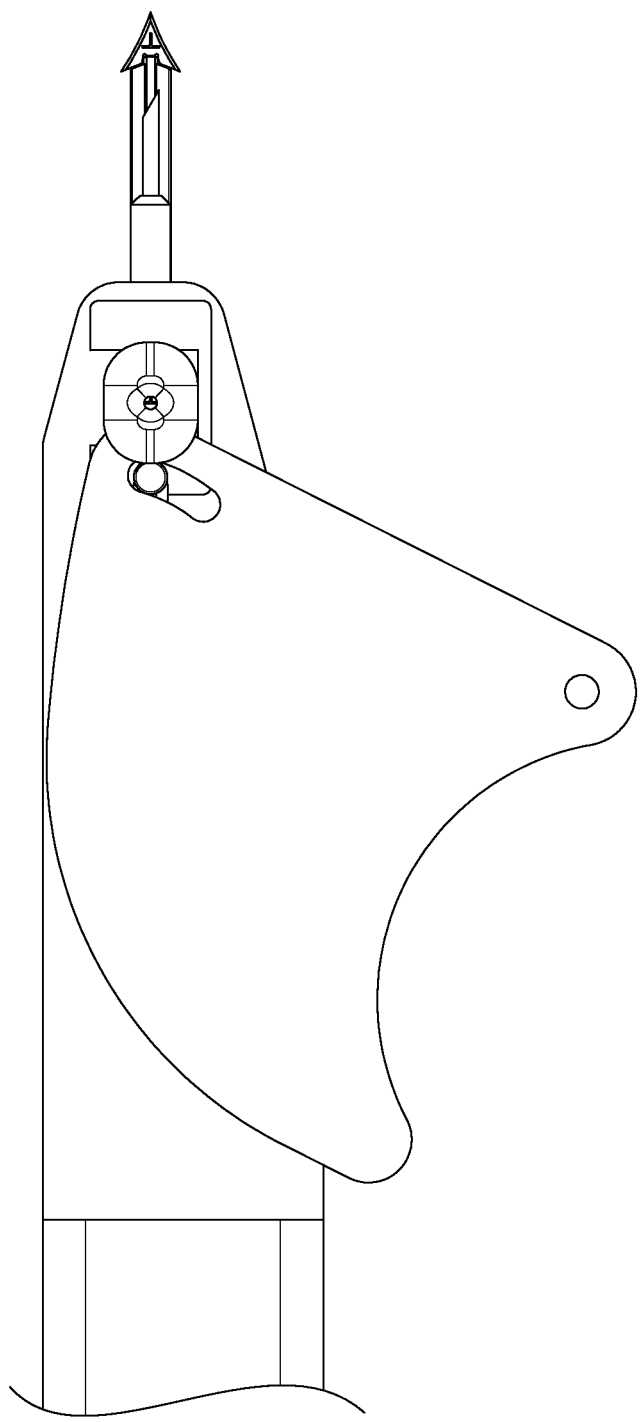
FIG. 17 is a detailed lateral view of a suture insertion device, in accordance with one embodiment of the invention.

FIG. 17 is a detailed lateral view of a suture insertion device, in accordance with one embodiment of the invention.

Figure 18:
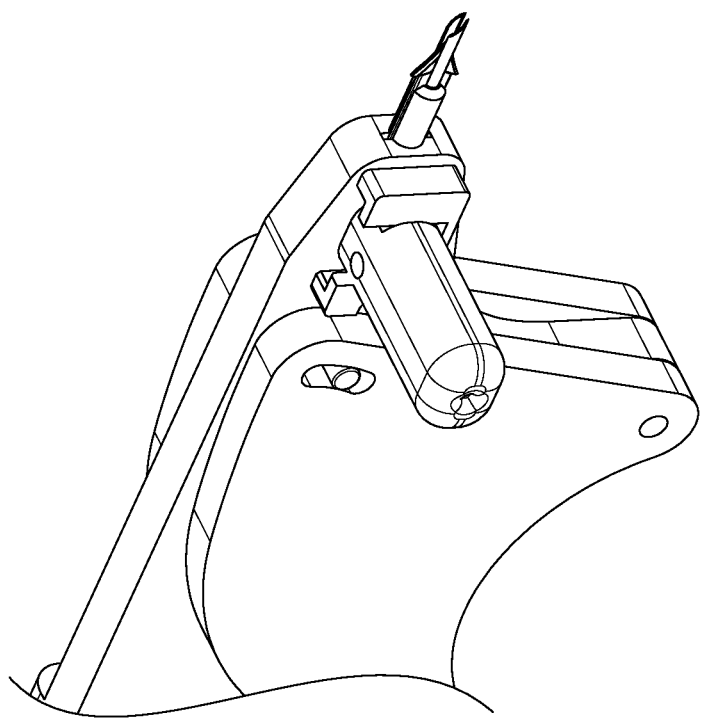
FIG. 18 is a detailed front perspective view of a suture insertion device, in accordance with one embodiment of the invention.

FIG. 18 is a detailed front perspective view of a suture insertion device, in accordance with one embodiment of the invention.

Figure 19:
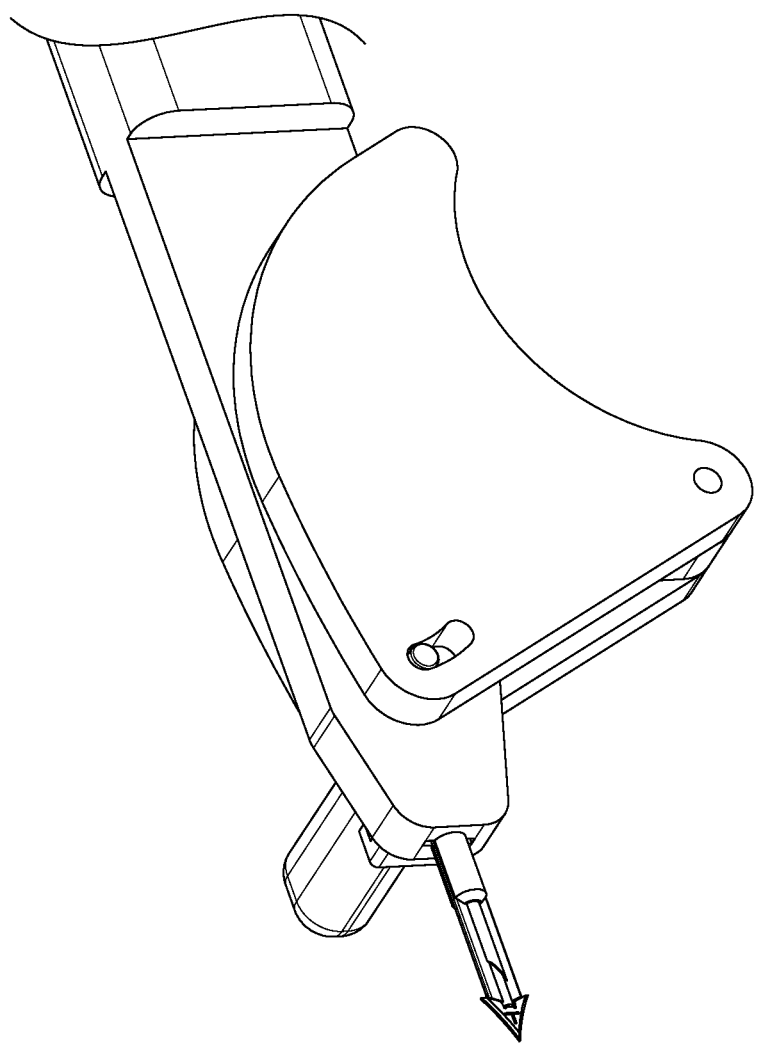
FIG. 19 is a second detailed front perspective view of a suture insertion device, in accordance with one embodiment of the invention.

FIG. 19 is a second detailed front perspective view of a suture insertion device, in accordance with one embodiment of the invention.

Figure 20:
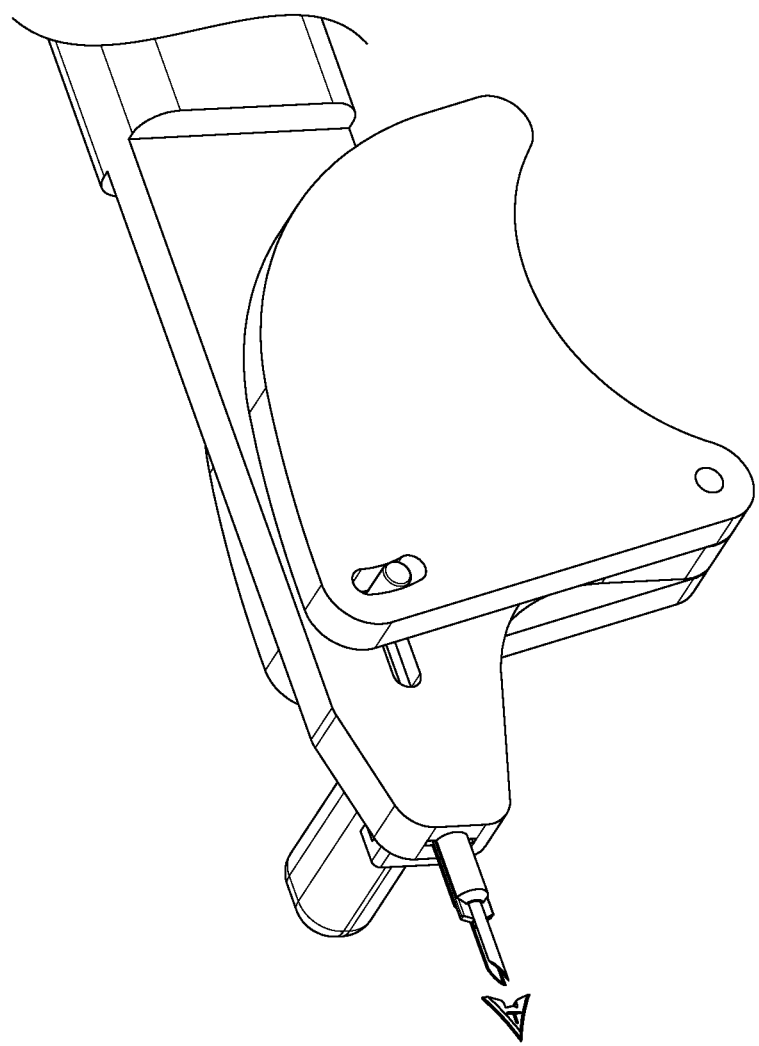
FIG. 20 is another detailed front perspective view of a suture insertion device, in accordance with one embodiment of the invention.

FIG. 20 is another detailed front perspective view of a suture insertion device, in accordance with one embodiment of the invention.

Figure 21:
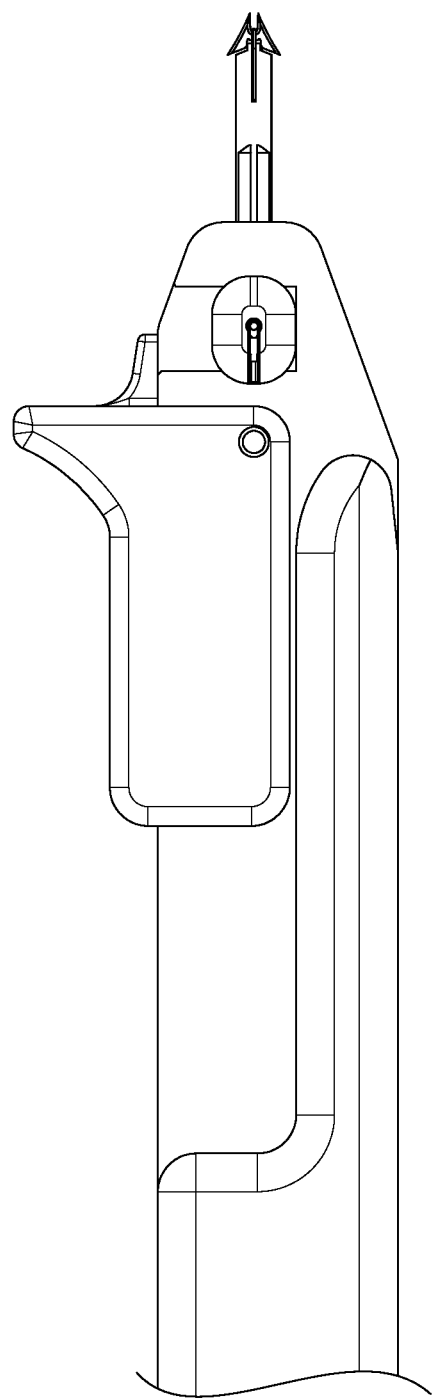
FIG. 21 is a partial lateral view of a suture insertion device, in accordance with one embodiment of the invention.

FIG. 21 is a partial lateral view of a suture insertion device, in accordance with one embodiment of the invention.

Figure 22:
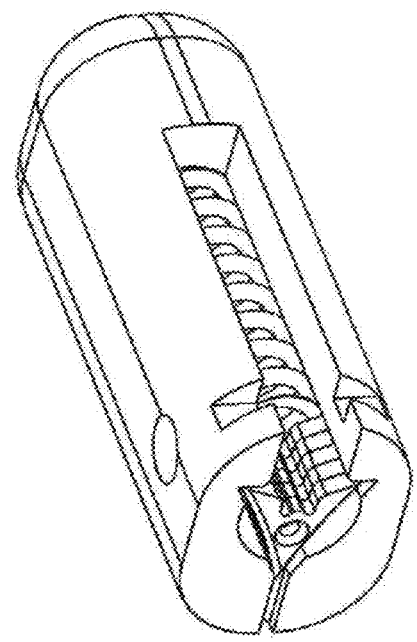
FIG. 22 is a perspective view of a magazine for a suture insertion device, in accordance with one embodiment of the invention.

FIG. 22 is a perspective view of a magazine for a suture insertion device, in accordance with one embodiment of the invention.

Figure 23:
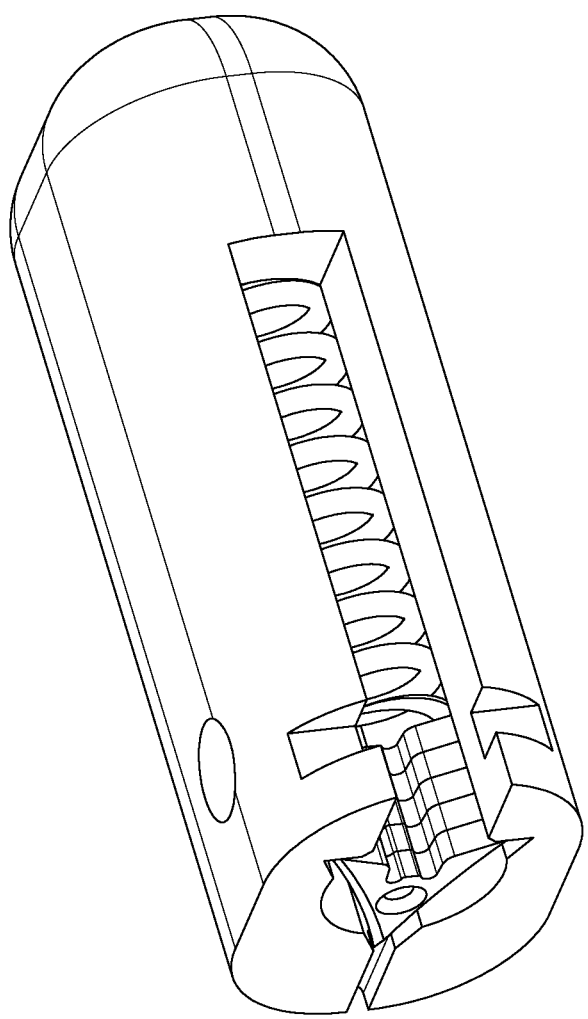
FIG. 23 is a perspective view of a magazine for a suture insertion device, in accordance with one embodiment of the invention.

FIG. 23 is a perspective view of a magazine for a suture insertion device, in accordance with one embodiment of the invention.

Figure 24:
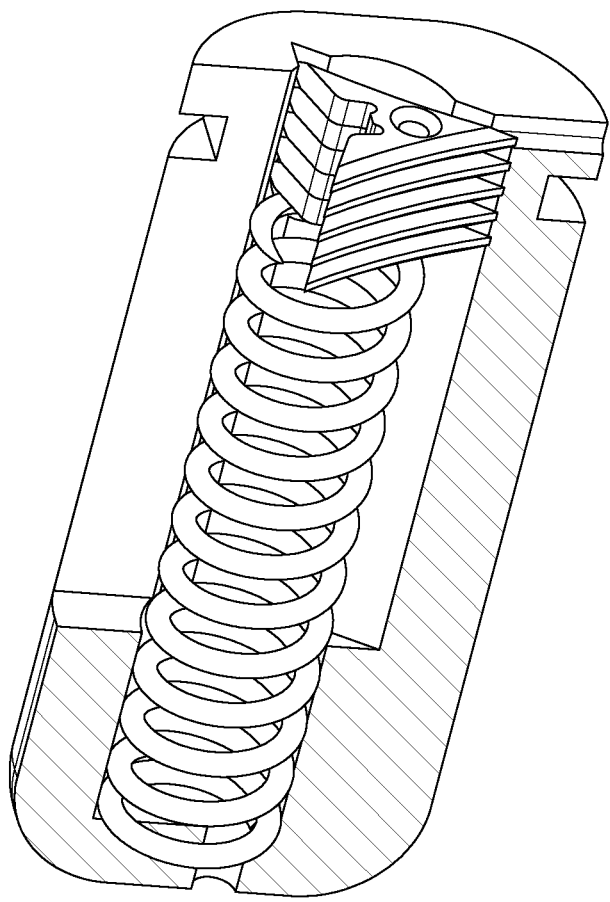
FIG. 24 is a sectioned perspective view of a magazine for a suture insertion device, in accordance with one embodiment of the invention.

FIG. 24 is a sectioned perspective view of a magazine for a suture insertion device, in accordance with one embodiment of the invention.

Figure 25:
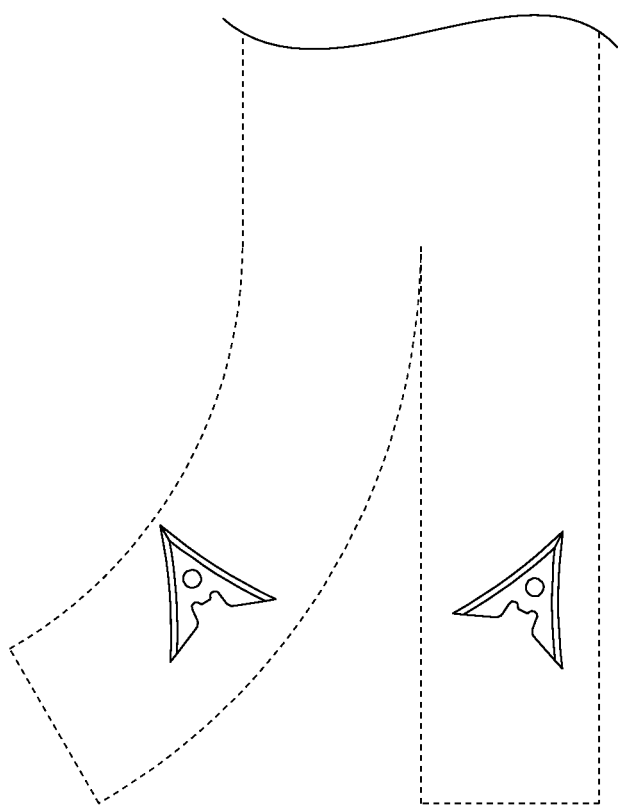
FIG. 25 is a sectioned lateral view of a schematic tissue having opposed tissue portions having surfaces to be approximated, and showing two barbs placed within the respective tissue portions, in accordance with one embodiment of the invention.
Figure 26:
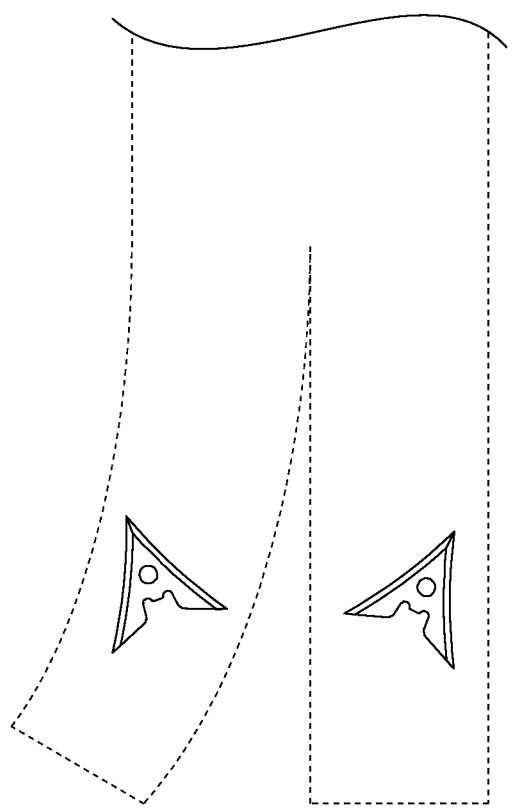
FIG. 26 is a sectioned lateral view of a schematic tissue having opposed tissue portions having surface relatively approximated, and showing two barbs placed within the respective tissue portions, in accordance with one embodiment of the invention.
Figure 27:
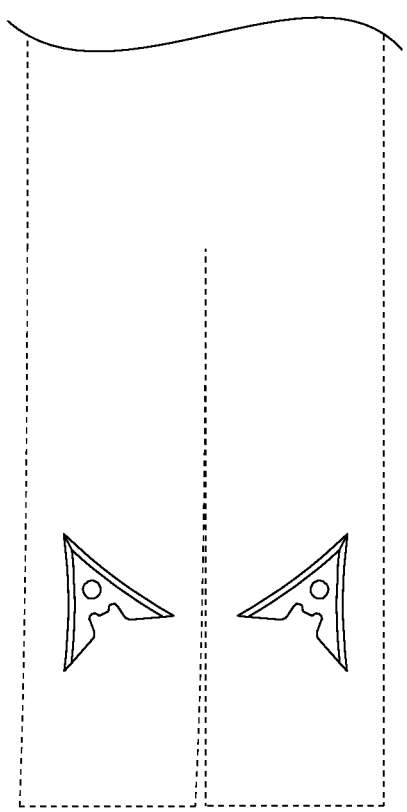
FIG. 27 is a sectioned lateral view of a schematic tissue having opposed tissue portions having surface further approximated, and showing two barbs placed within the respective tissue portions, in accordance with one embodiment of the invention.

FIG. 25 is a sectioned lateral view of a schematic tissue having opposed tissue portions having surfaces to be approximated, and showing two barbs placed within the respective tissue portions, in accordance with one embodiment of the invention, FIG. 26 is a sectioned lateral view of a schematic tissue having opposed tissue portions having surface relatively approximated, and showing two barbs placed within the respective tissue portions, in accordance with one embodiment of the invention, FIG. 27 is a sectioned lateral view of a schematic tissue having opposed tissue portions having surface further approximated, and showing two barbs placed within the respective tissue portions, in accordance with one embodiment of the invention.

Figure 28:
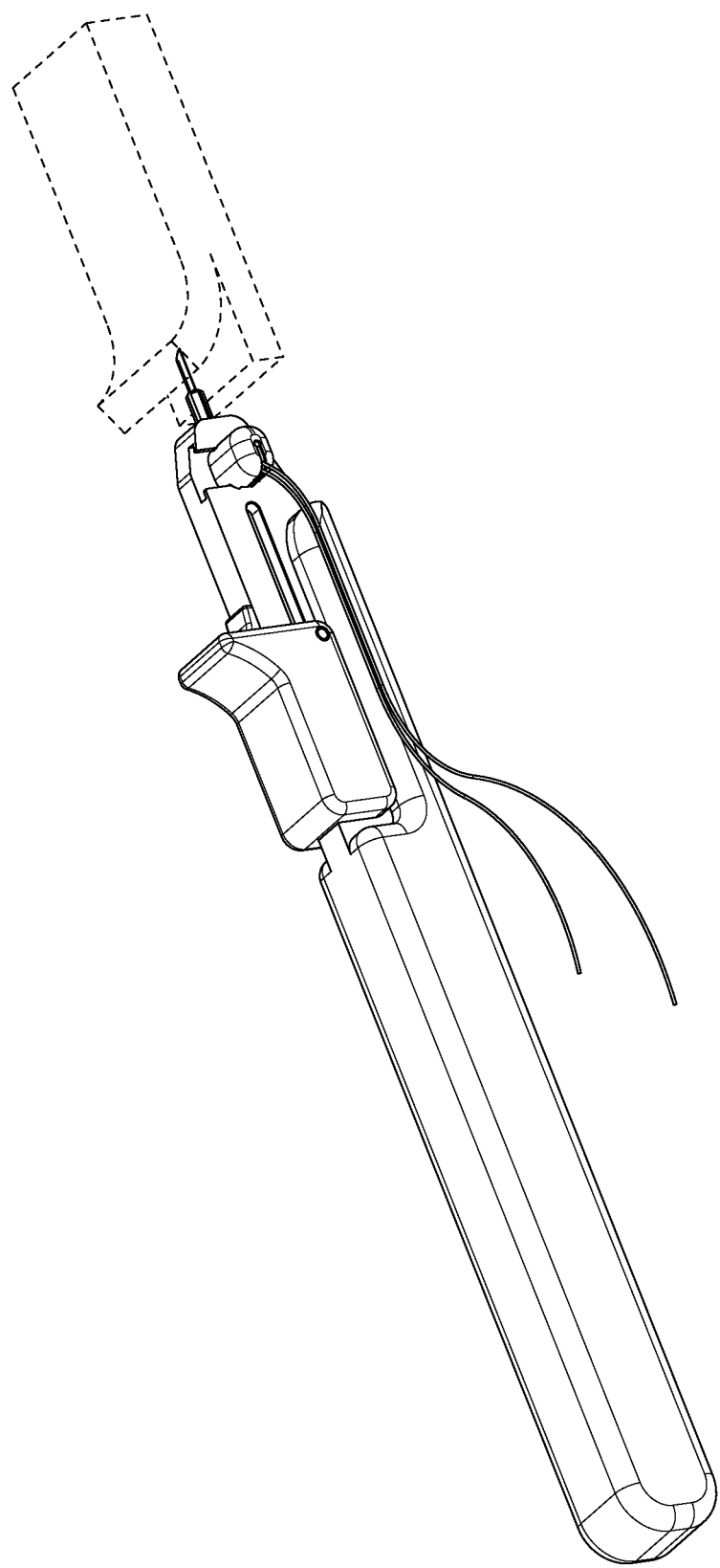
FIG. 28 is a rear perspective view of a suture insertion device shown in position inserted in between opposed tissue portions having surfaces to be approximated, in accordance with one embodiment of the invention.

FIG. 28 is a rear perspective view of a suture insertion device shown in position inserted in between opposed tissue portions having surfaces to be approximated, in accordance with one embodiment of the invention.

Figure 29:
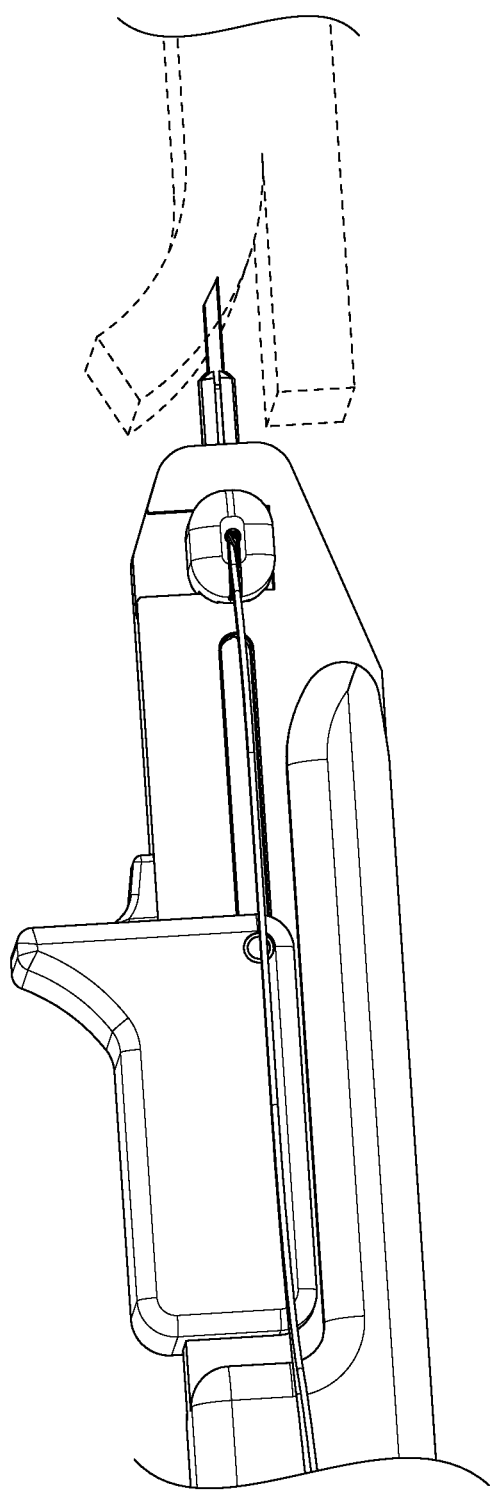
FIG. 29 is a detailed lateral view of a suture insertion device shown in position inserted in between opposed tissue portions having surfaces to be approximated, in accordance with one embodiment of the invention.

FIG. 29 is a detailed lateral view of a suture insertion device shown in position inserted in between opposed tissue portions having surfaces to be approximated, in accordance with one embodiment of the invention.

Figure 30:
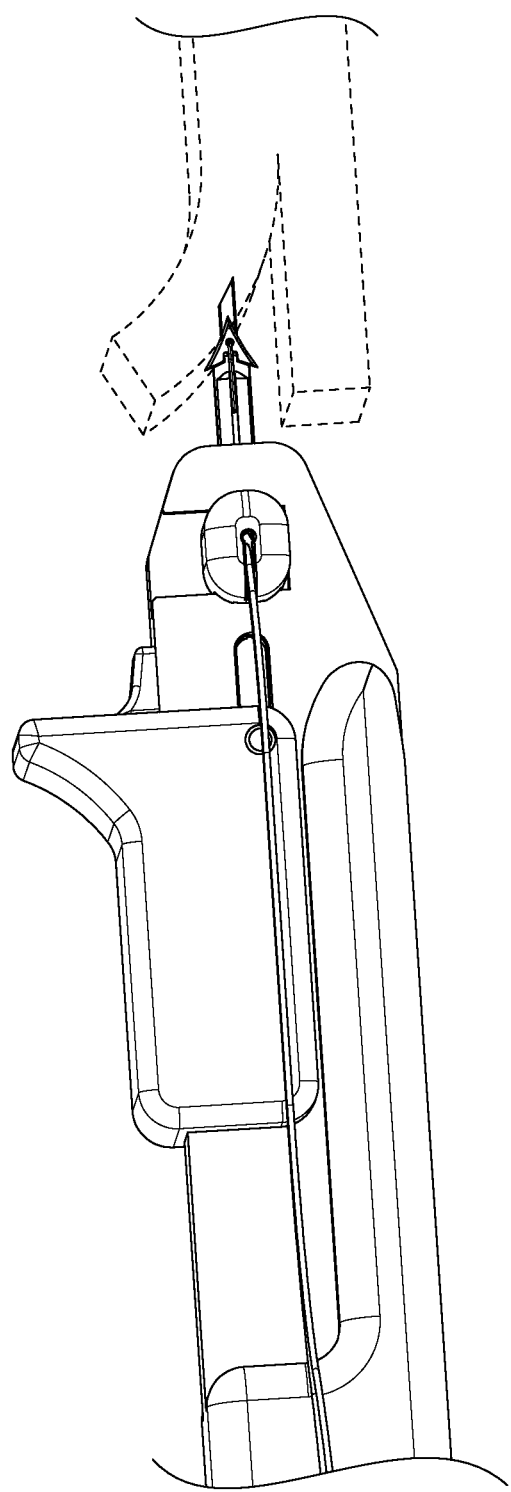
FIG. 30 is a detailed lateral view of a suture insertion device shown in position inserted in between opposed tissue portions having surfaces to be approximated and inserting a barb, in accordance with one embodiment of the invention.

FIG. 30 is a detailed lateral view of a suture insertion device shown in position inserted in between opposed tissue portions having surfaces to be approximated and inserting a barb, in accordance with one embodiment of the invention.

Figure 31:
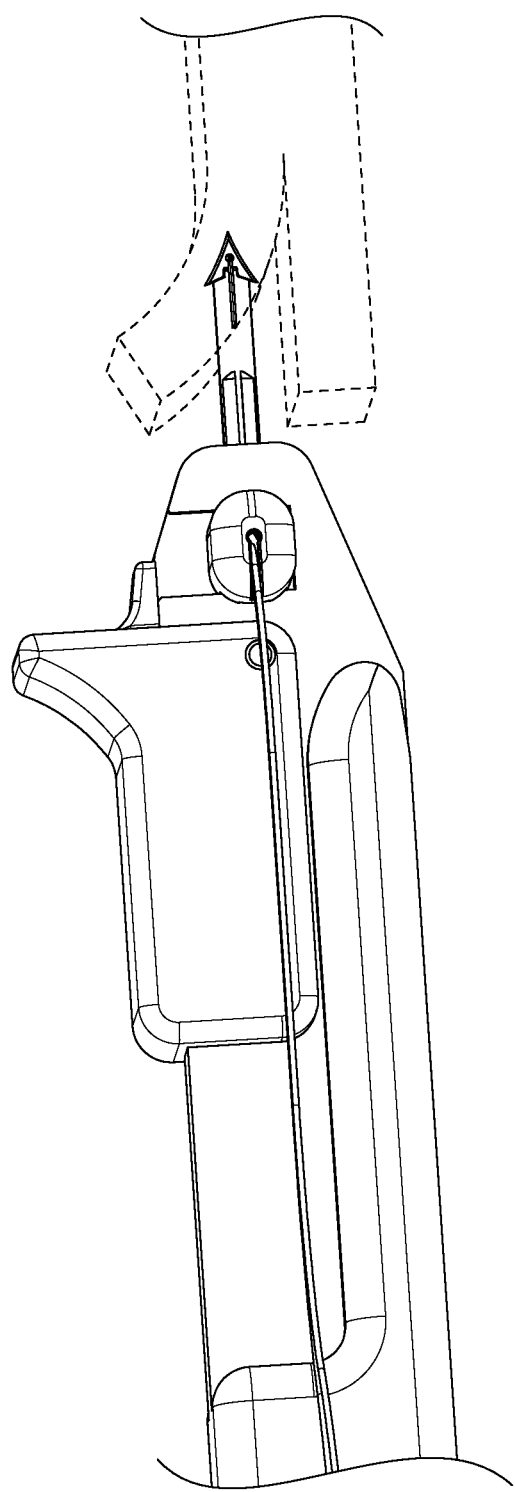
FIG. 31 is a detailed lateral view of a suture insertion device shown in position inserted in between opposed tissue portions having surfaces to be approximated and further inserting a barb, in accordance with one embodiment of the invention.

FIG. 31 is a detailed lateral view of a suture insertion device shown in position inserted in between opposed tissue portions having surfaces to be approximated and further inserting a barb, in accordance with one embodiment of the invention.

Figure 32:
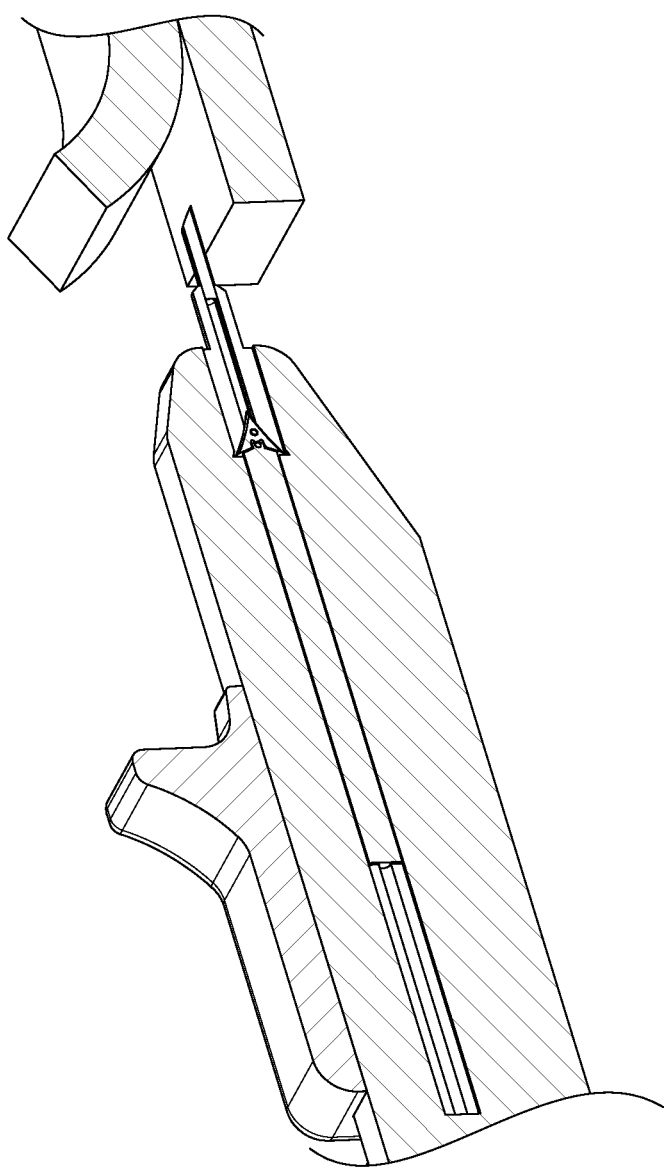
FIG. 32 is a detailed rear perspective view of a suture insertion device shown in position inserted in between opposed tissue portions having surfaces to be approximated and inserting a barb, in accordance with one embodiment of the invention.

FIG. 32 is a detailed rear perspective view of a suture insertion device shown in position inserted in between opposed tissue portions having surfaces to be approximated and inserting a barb, in accordance with one embodiment of the invention.

Figure 33:
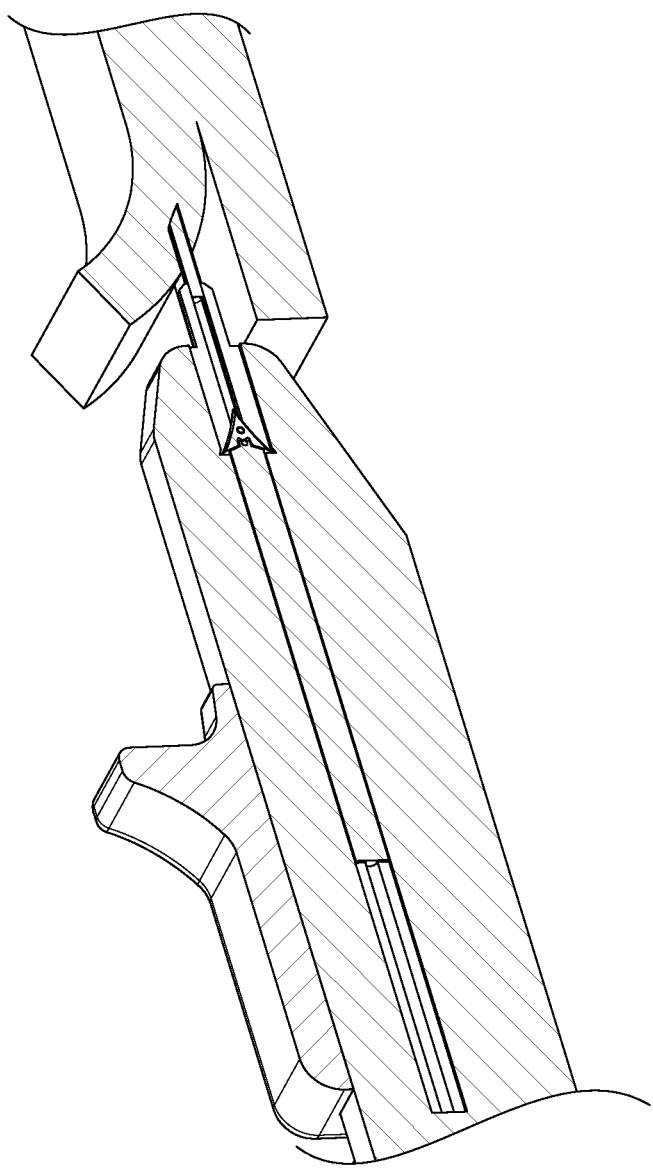
FIG. 33 is a detailed rear perspective view of a suture insertion device shown in position inserted in between opposed tissue portions having surfaces to be approximated and inserting a barb, in accordance with one embodiment of the invention.

FIG. 33 is a detailed rear perspective view of a suture insertion device shown in position inserted in between opposed tissue portions having surfaces to be approximated and inserting a barb, in accordance with one embodiment of the invention.

Figure 34:
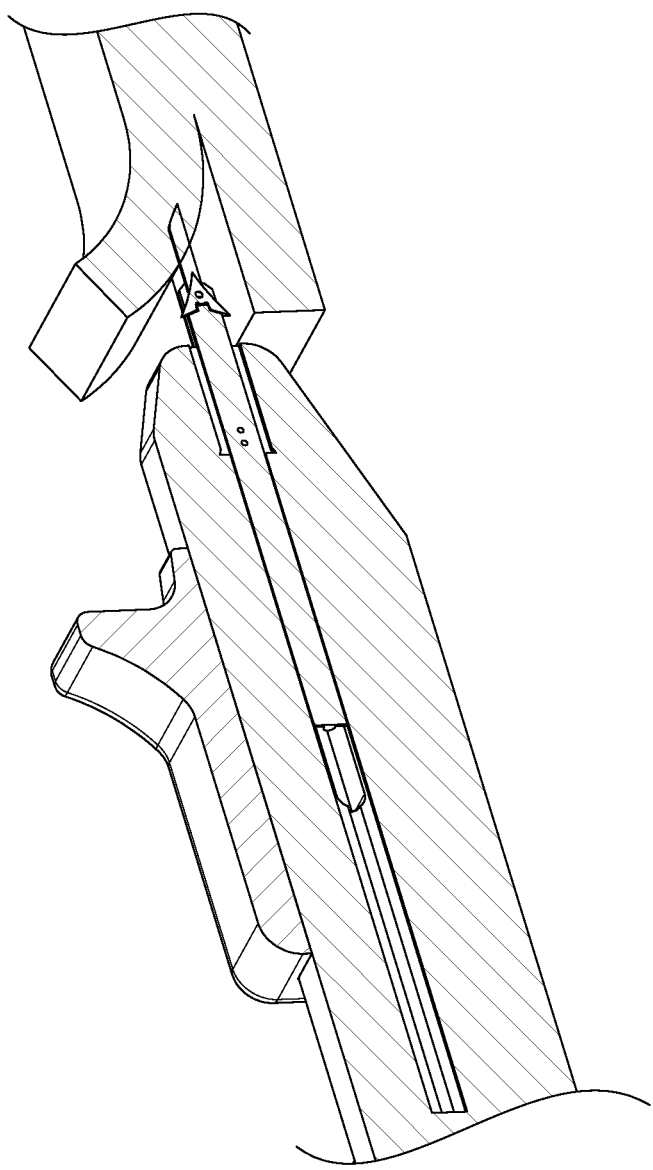
FIG. 34 is a detailed rear perspective view of a suture insertion device shown in position inserted in between opposed tissue portions having surfaces to be approximated and further inserting a barb, in accordance with one embodiment of the invention.

FIG. 34 is a detailed rear perspective view of a suture insertion device shown in position inserted in between opposed tissue portions having surfaces to be approximated and further inserting a barb, in accordance with one embodiment of the invention.

Figure 35:
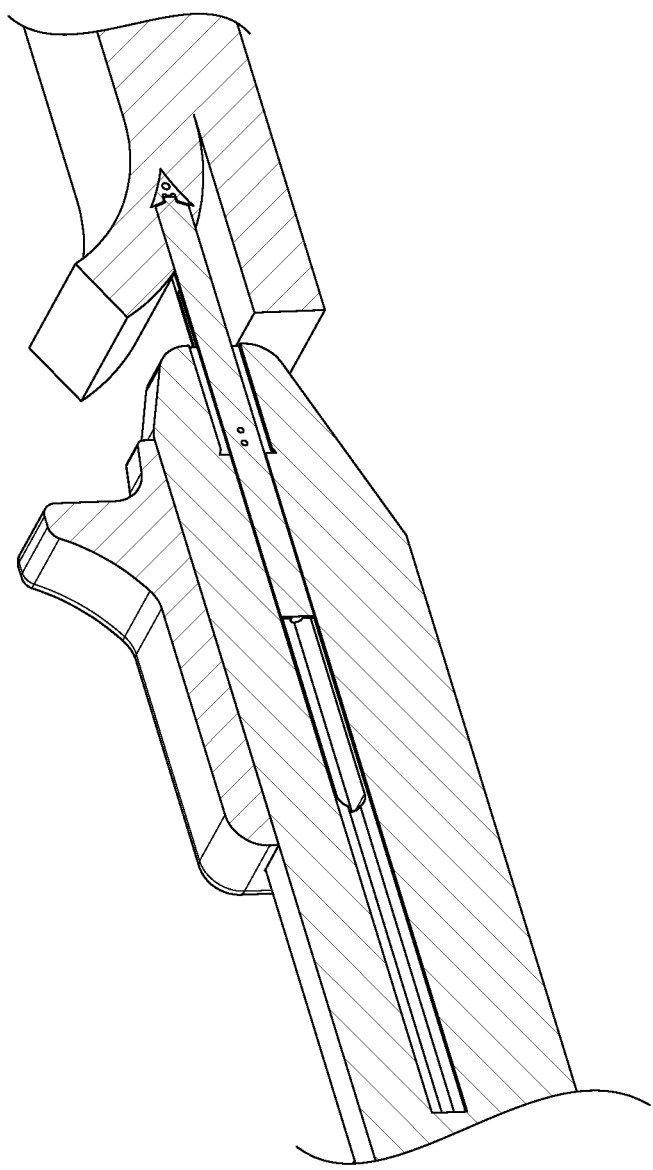
FIG. 35 is a detailed rear perspective view of a suture insertion device shown in position inserted in between opposed tissue portions having surfaces to be approximated and further inserting a barb, in accordance with one embodiment of the invention.

FIG. 35 is a detailed rear perspective view of a suture insertion device shown in position inserted in between opposed tissue portions having surfaces to be approximated and further inserting a barb, in accordance with one embodiment of the invention.

Figure 36:
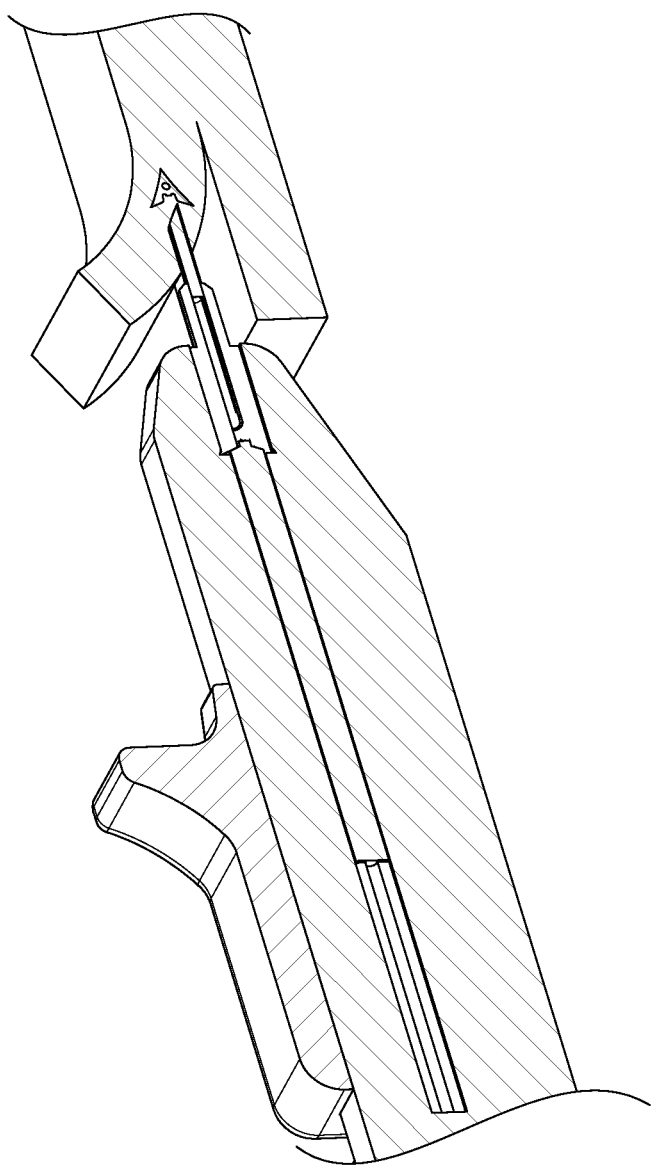
FIG. 36 is a detailed rear perspective view of a suture insertion device shown in position inserted in between opposed tissue portions having surfaces to be approximated and having inserted a barb, in accordance with one embodiment of the invention.

FIG. 36 is a detailed rear perspective view of a suture insertion device shown in position inserted in between opposed tissue portions having surfaces to be approximated and having inserted a barb, in accordance with one embodiment of the invention.

FIG. 37 is a detailed rear perspective view of a suture insertion device shown in position withdrawn from in between opposed tissue portions having surfaces to be approximated and having inserted a barb, in accordance with one embodiment of the invention.

Figure 38:
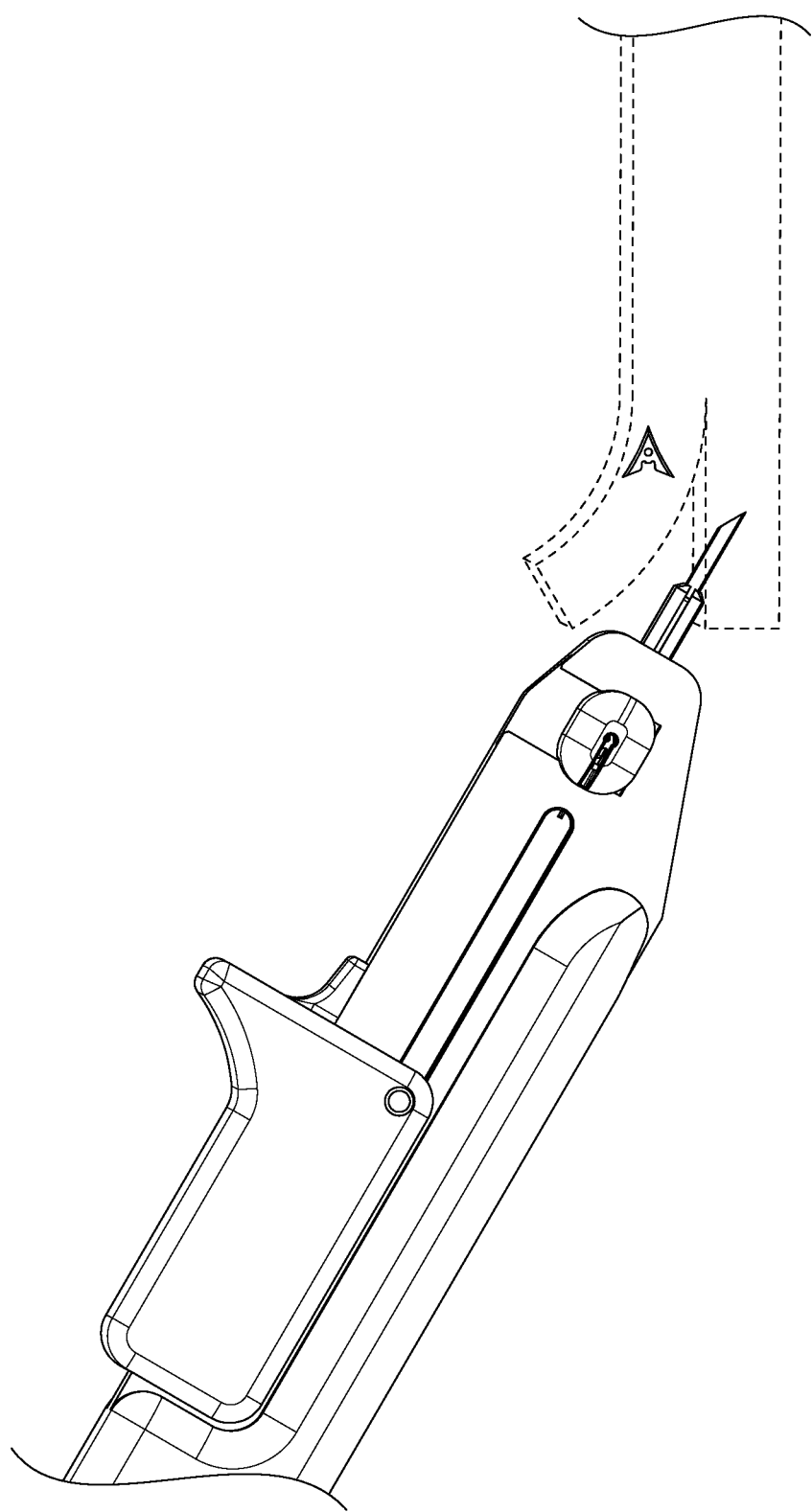
FIG. 38 is a detailed rear perspective view of a suture insertion device shown in position inserted in between opposed tissue portions having surfaces to be approximated and inserting a second a barb, in accordance with one embodiment of the invention.

FIG. 38 is a detailed rear perspective view of a suture insertion device shown in position inserted in between opposed tissue portions having surfaces to be approximated and inserting a second a barb, in accordance with one embodiment of the invention.

Figure 39:
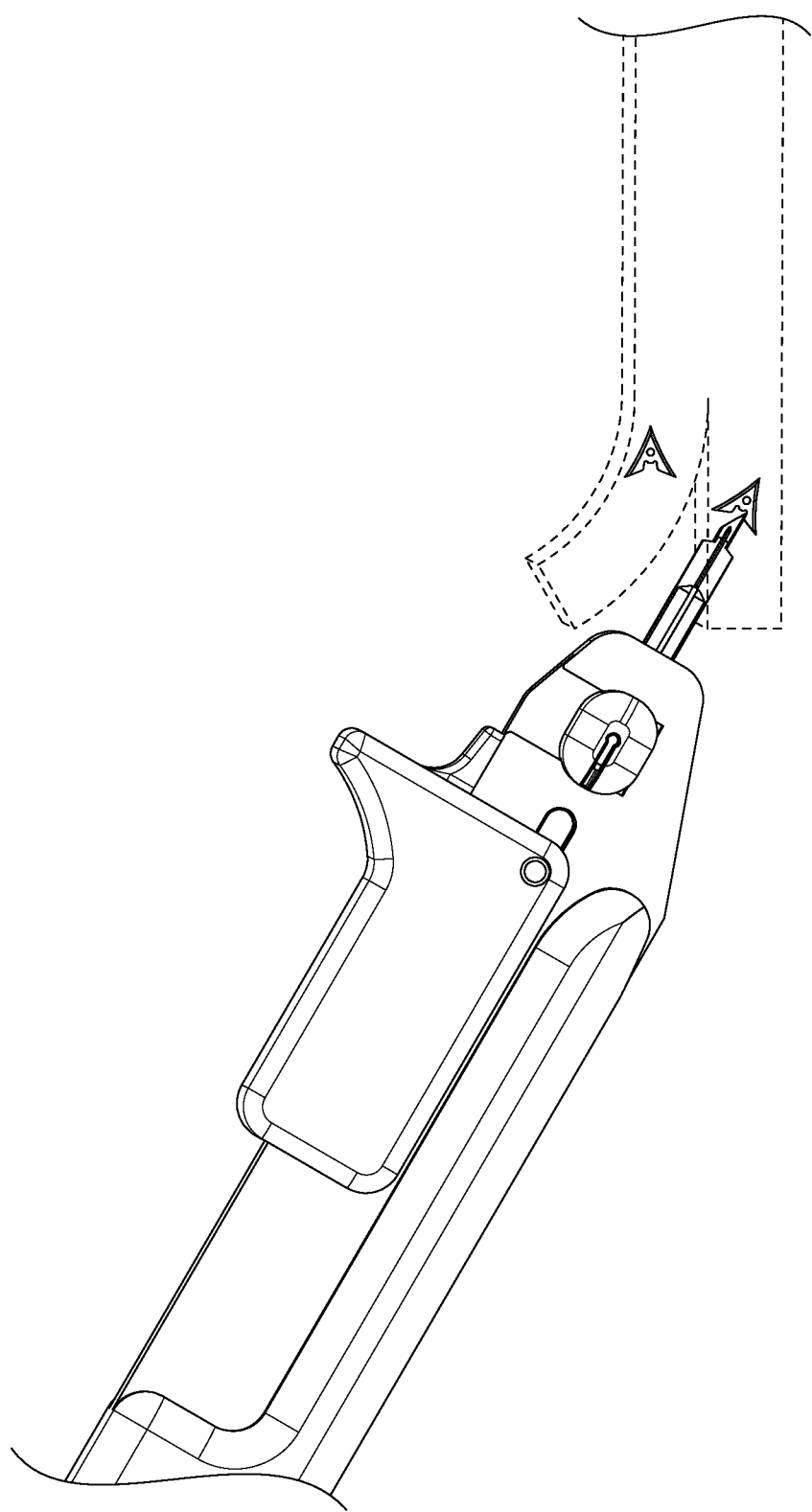
FIG. 39 is a detailed rear perspective view of a suture insertion device shown in position inserted in between opposed tissue portions having surfaces to be approximated and having inserted a second barb, in accordance with one embodiment of the invention.

FIG. 39 is a detailed rear perspective view of a suture insertion device shown in position inserted in between opposed tissue portions having surfaces to be approximated and having inserted a second barb, in accordance with one embodiment of the invention.

Figure 40:
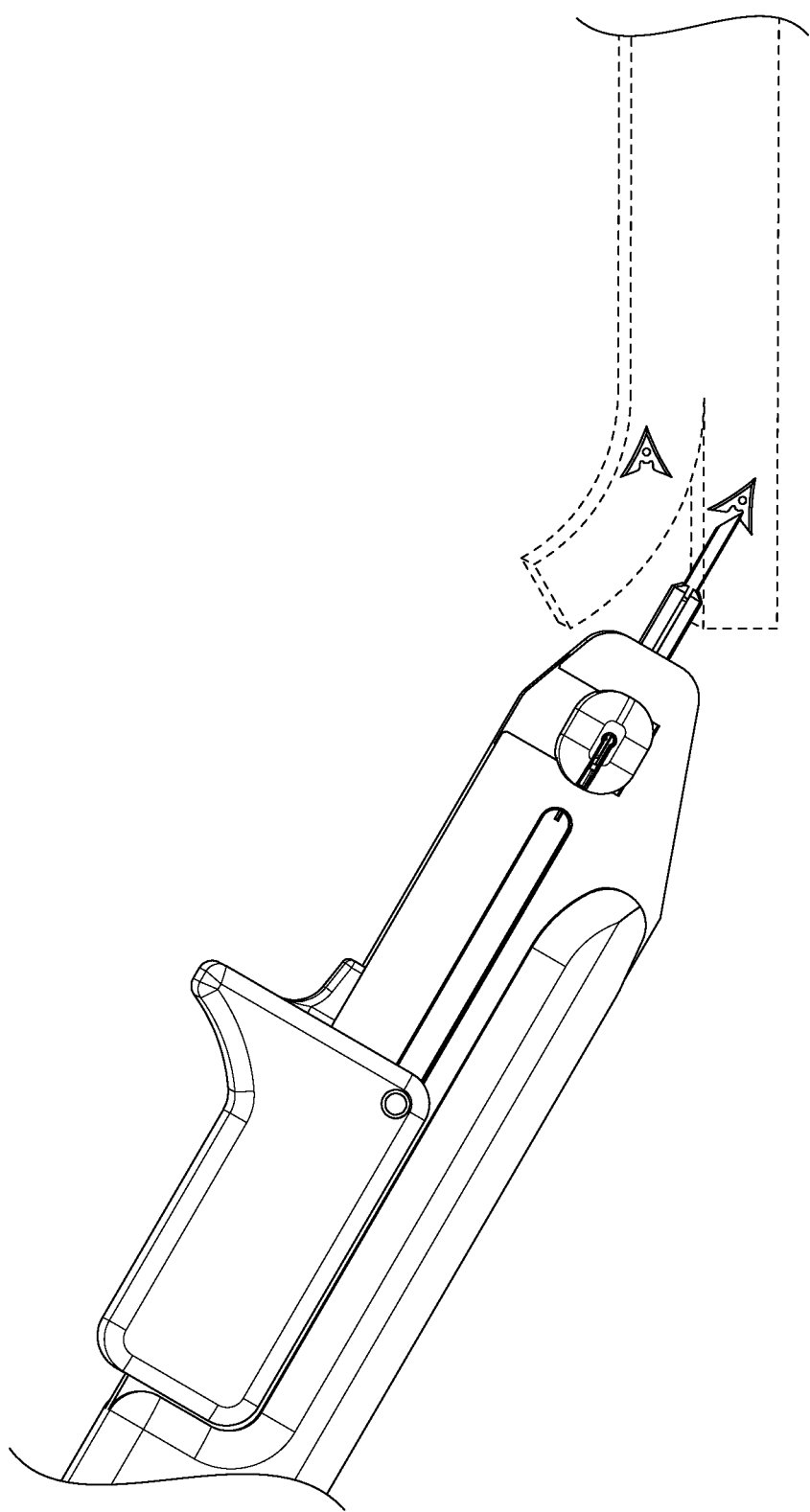
FIG. 40 is a detailed rear perspective view of a suture insertion device shown in position inserted in between opposed tissue portions having surfaces to be approximated and having inserted a second barb, in accordance with one embodiment of the invention.

FIG. 40 is a detailed rear perspective view of a suture insertion device shown in position inserted in between opposed tissue portions having surfaces to be approximated and having inserted a second barb, in accordance with one embodiment of the invention.

Figure 41:
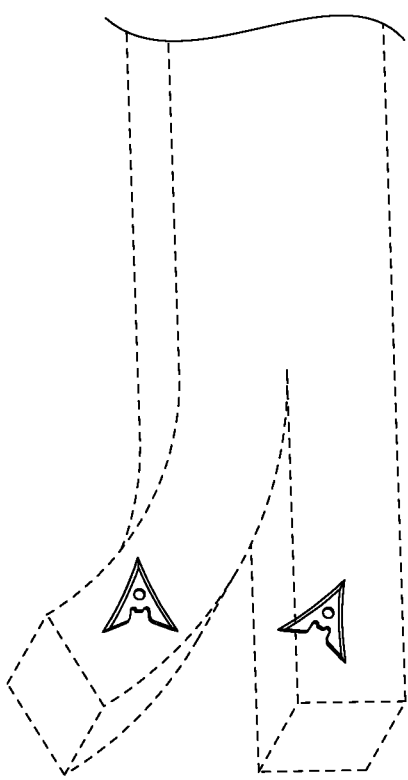
FIG. 41 is a sectioned lateral view of a schematic tissue having opposed tissue portions having surface further approximated, and showing two barbs placed within the respective tissue portions, in accordance with one embodiment of the invention.
Figure 42:
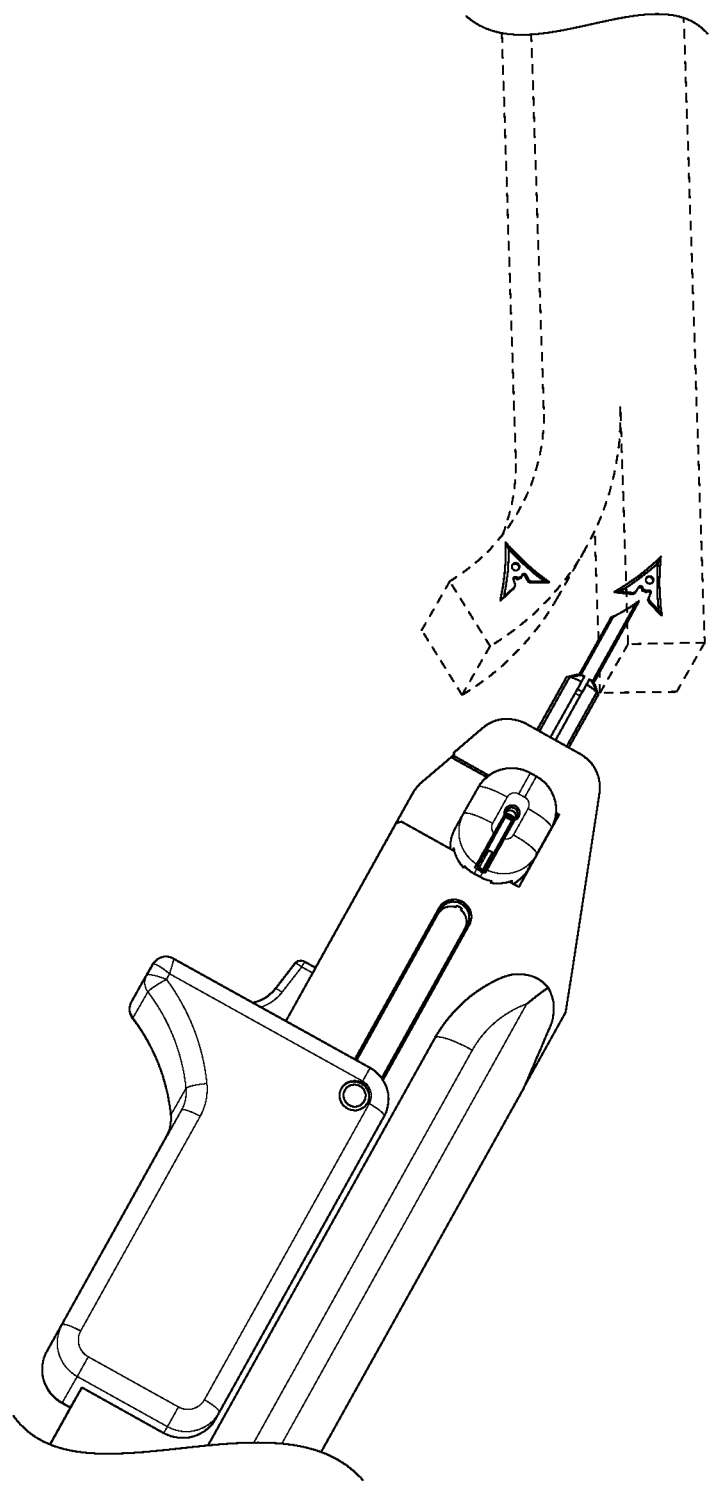
FIG. 42 is a detailed rear perspective view of a suture insertion device shown in position inserted in between opposed tissue portions having surfaces to be approximated and having inserted a second barb, in accordance with one embodiment of the invention.

FIG. 41 is a sectioned lateral view of a schematic tissue having opposed tissue portions having surface further approximated, and showing two barbs placed within the respective tissue portions, in accordance with one embodiment of the invention, FIG. 42 is a detailed rear perspective view of a suture insertion device shown in position inserted in between opposed tissue portions having surfaces to be approximated and having inserted a second barb, in accordance with one embodiment of the invention.

Figure 43:
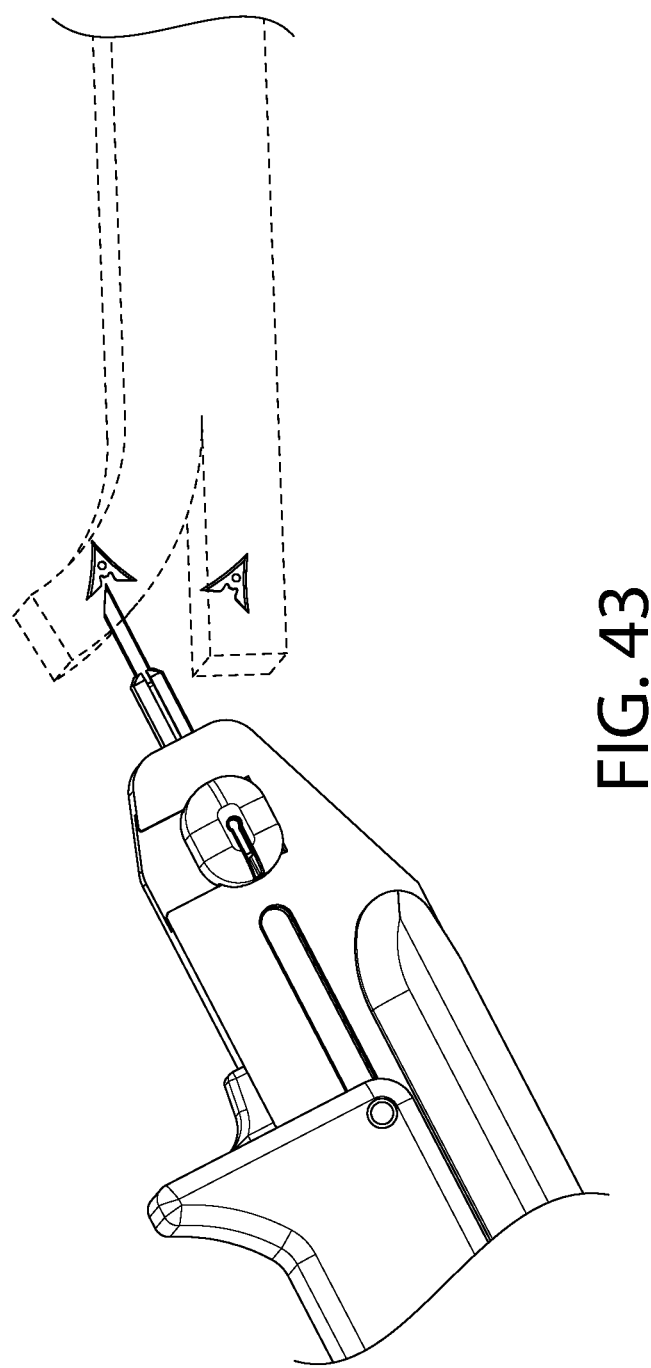
FIG. 43 is a detailed lateral perspective view of a suture insertion device shown in position inserted in between opposed tissue portions having surfaces to be approximated and inserting a second of two barbs, in accordance with one embodiment of the invention.

FIG. 43 is a detailed lateral perspective view of a suture insertion device shown in position inserted in between opposed tissue portions having surfaces to be approximated and inserting a second of two barbs, in accordance with one embodiment of the invention.

FIG. 44 is a detailed lateral perspective view of a suture insertion device shown in position withdrawn from in between opposed tissue portions having surfaces to be approximated and having inserted two barbs, in accordance with one embodiment of the invention.

Figure 45:
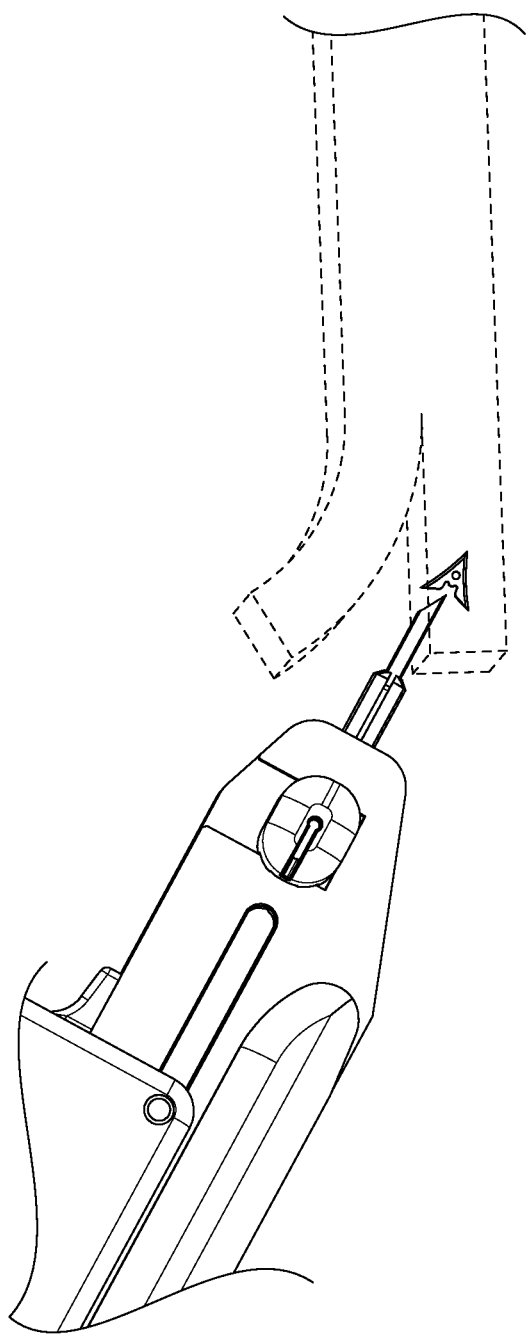
FIG. 45 is a detailed lateral perspective view of a suture insertion device shown in position inserted in between opposed tissue portions having surfaces to be approximated and inserting a first of two barbs, in accordance with one embodiment of the invention.

FIG. 45 is a detailed lateral perspective view of a suture insertion device shown in position inserted in between opposed tissue portions having surfaces to be approximated and inserting a first of two barbs, in accordance with one embodiment of the invention.

FIG. 46 is a detailed lateral perspective view of a suture insertion device shown in position withdrawn from in between opposed tissue portions having surfaces to be approximated and having inserted a first of two barbs, in accordance with one embodiment of the invention.

Figure 47:
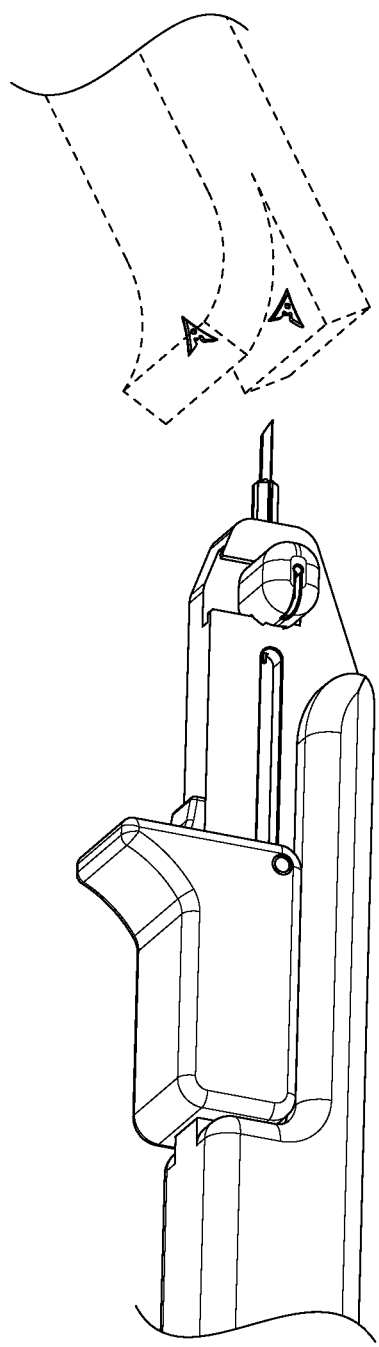
FIG. 47 is a detailed rear perspective view of a suture insertion device shown in position withdrawn from in between opposed tissue portions having surfaces to be approximated and having inserted two barbs, in accordance with one embodiment of the invention.

FIG. 47 is a detailed rear perspective view of a suture insertion device shown in position withdrawn from in between opposed tissue portions having surfaces to be approximated and having inserted two barbs, in accordance with one embodiment of the invention.

Figure 48:
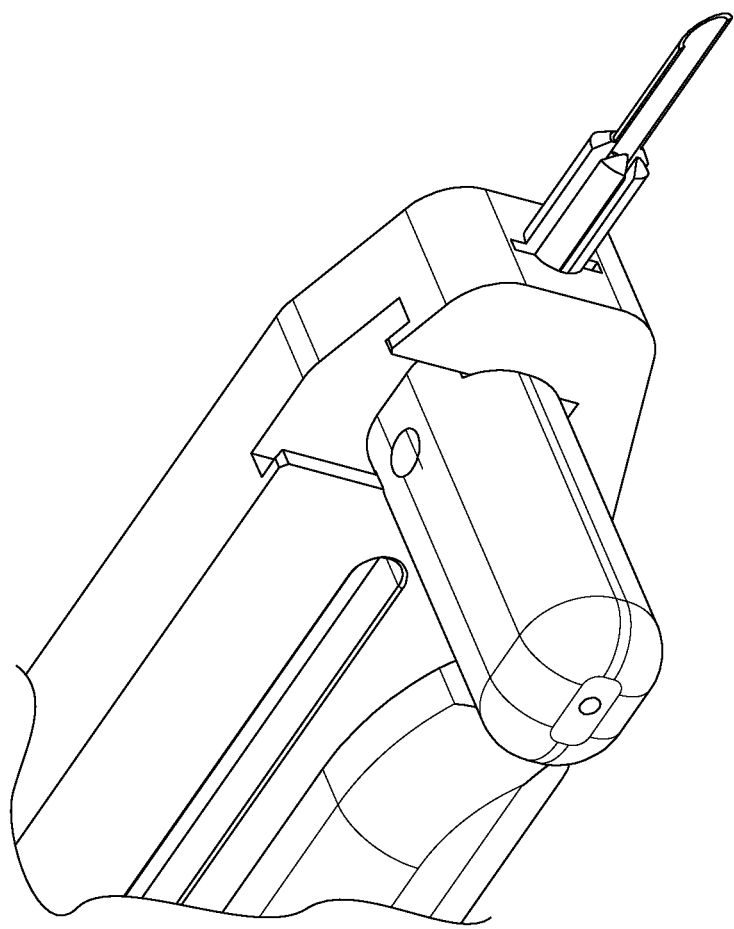
FIG. 48 is a detailed front perspective view of a suture insertion device showing a magazine in place, in accordance with one embodiment of the invention.

FIG. 48 is a detailed front perspective view of a suture insertion device showing a magazine in place, in accordance with one embodiment of the invention.

Figure 49:
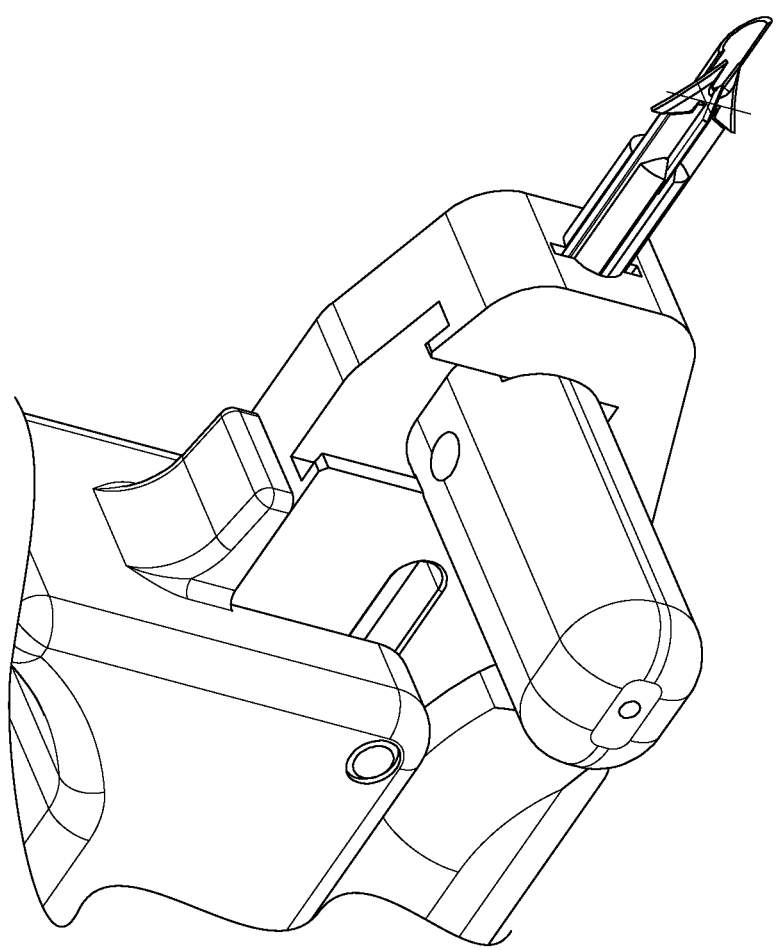
FIG. 49 is a detailed front perspective view of a suture insertion device showing a magazine in place, in accordance with one embodiment of the invention.

FIG. 49 is a detailed front perspective view of a suture insertion device showing a magazine in place, in accordance with one embodiment of the invention.

Figure 50:
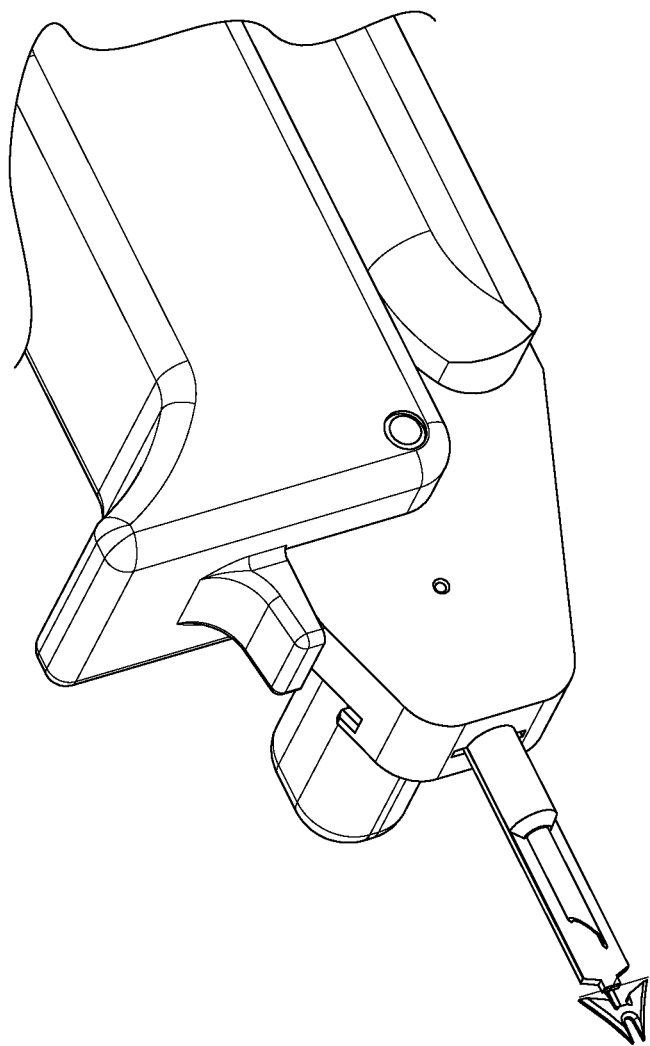
FIG. 50 is a detailed opposite front perspective view of a suture insertion device showing a magazine in place, in accordance with one embodiment of the invention.

FIG. 50 is a detailed opposite front perspective view of a suture insertion device showing a magazine in place, in accordance with one embodiment of the invention.

Figure 51:
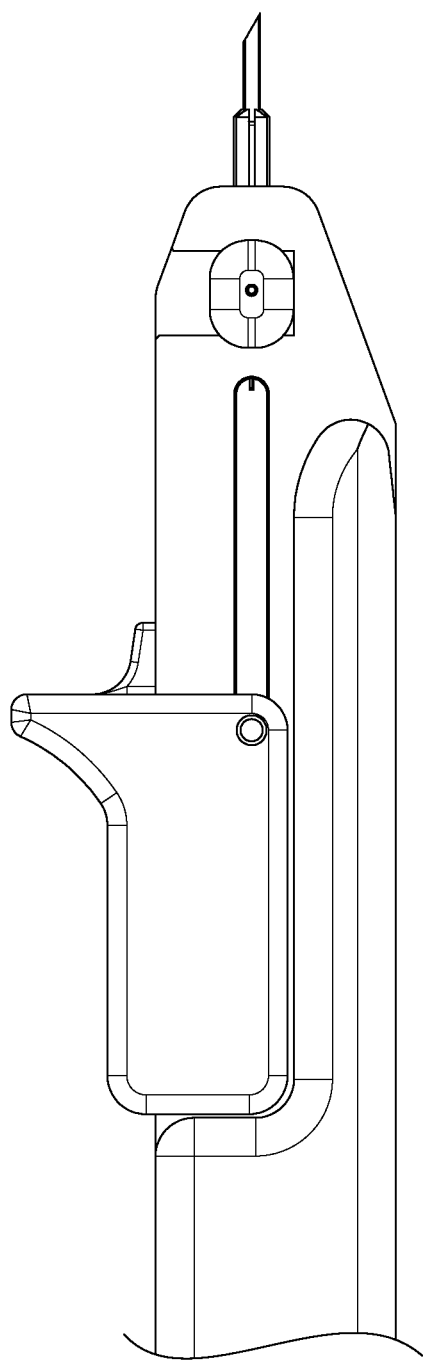
FIG. 51 is a detailed lateral view of a suture insertion device showing a magazine in place, in accordance with one embodiment of the invention.

FIG. 51 is a detailed lateral view of a suture insertion device showing a magazine in place, in accordance with one embodiment of the invention.

Figure 52:
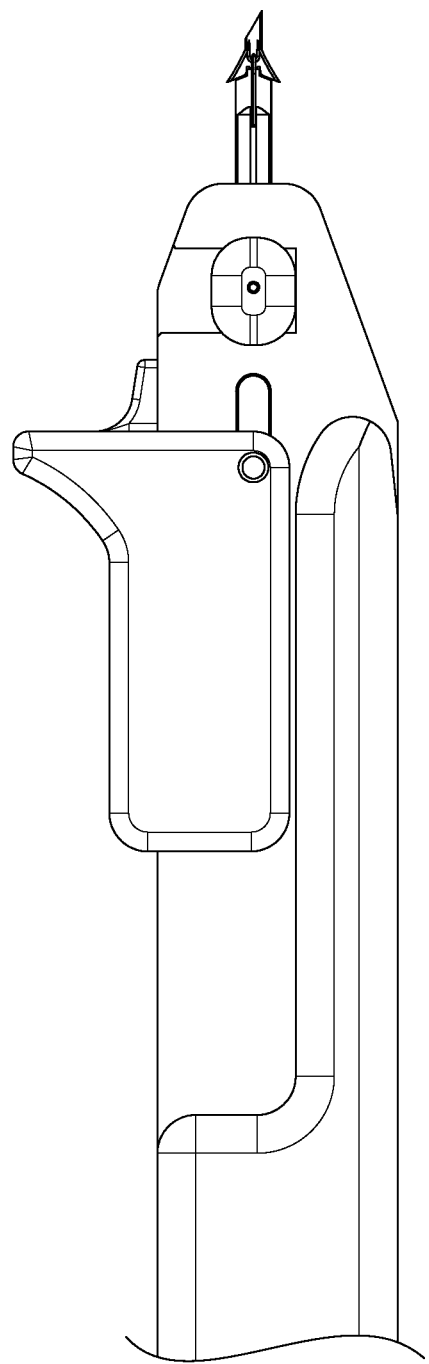
FIG. 52 is a detailed lateral view of a suture insertion device showing a magazine in place, in accordance with one embodiment of the invention.

FIG. 52 is a detailed lateral view of a suture insertion device showing a magazine in place, in accordance with one embodiment of the invention.

Figure 53:
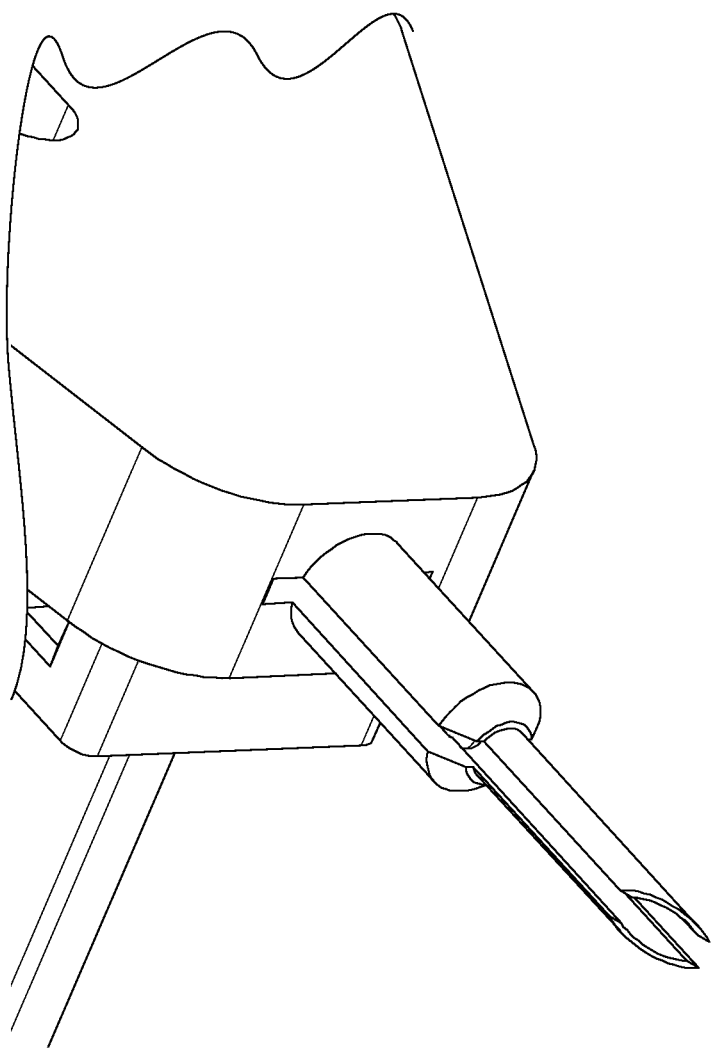
FIG. 53 is a detailed front perspective view of a suture insertion device showing a magazine in place, in accordance with one embodiment of the invention.

FIG. 53 is a detailed front perspective view of a suture insertion device showing a magazine in place, in accordance with one embodiment of the invention.

Figure 54:
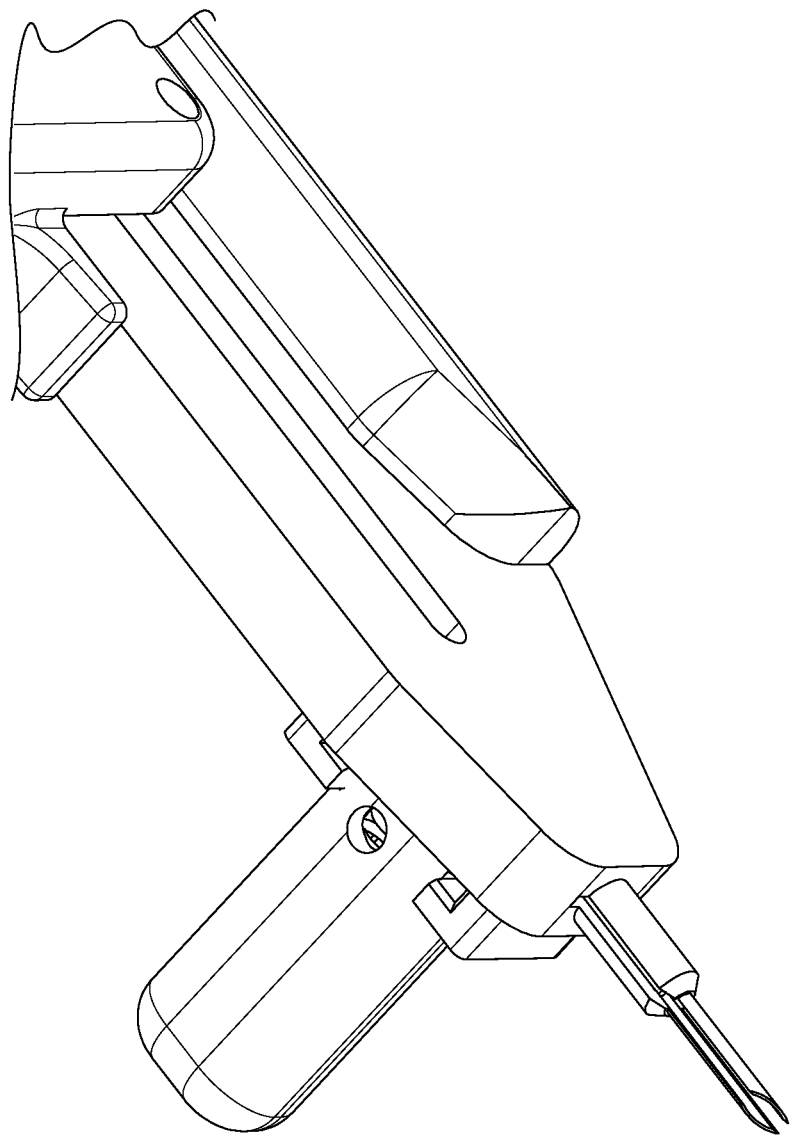
FIG. 54 is a detailed front perspective view of a suture insertion device showing a magazine in place, in accordance with one embodiment of the invention.

FIG. 54 is a detailed front perspective view of a suture insertion device showing a magazine in place, in accordance with one embodiment of the invention.

Figure 55:
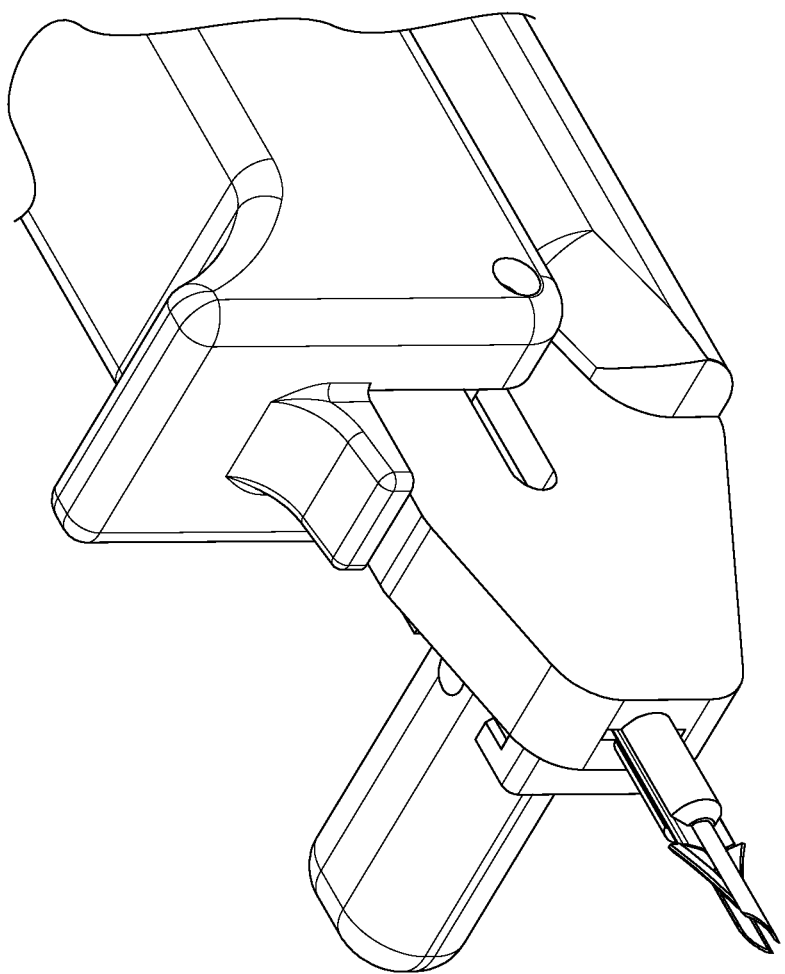
FIG. 55 is a detailed front perspective view of a suture insertion device showing a magazine in place, in accordance with one embodiment of the invention.

FIG. 55 is a detailed front perspective view of a suture insertion device showing a magazine in place, in accordance with one embodiment of the invention.

Figure 56:
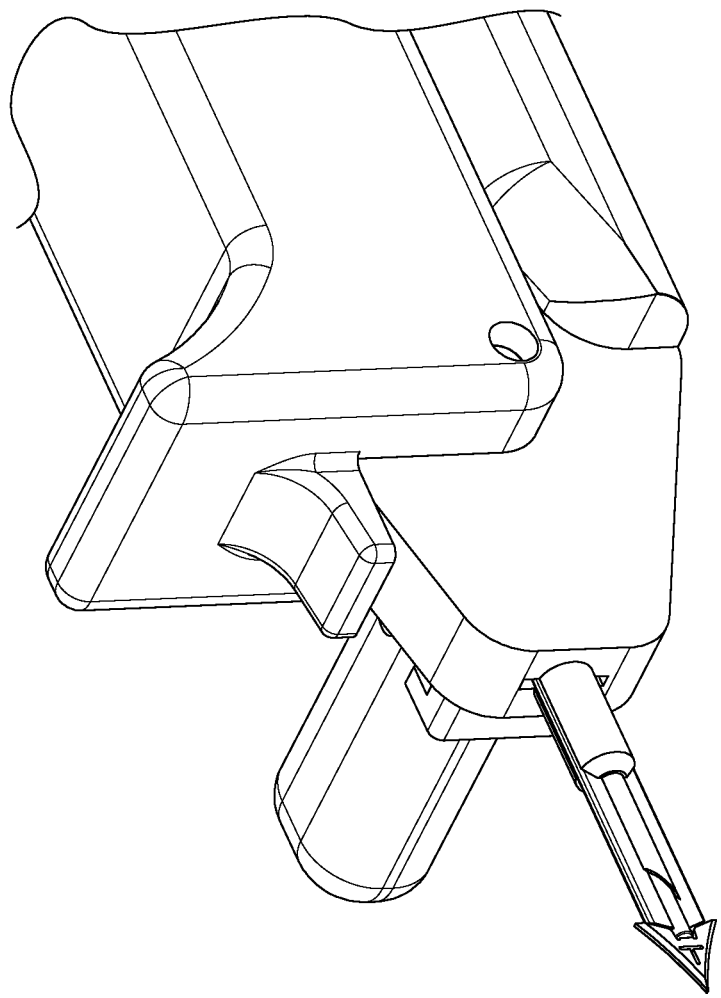
FIG. 56 is a detailed front perspective view of a suture insertion device showing a magazine in place, in accordance with one embodiment of the invention.

FIG. 56 is a detailed front perspective view of a suture insertion device showing a magazine in place, in accordance with one embodiment of the invention.

Figure 57:
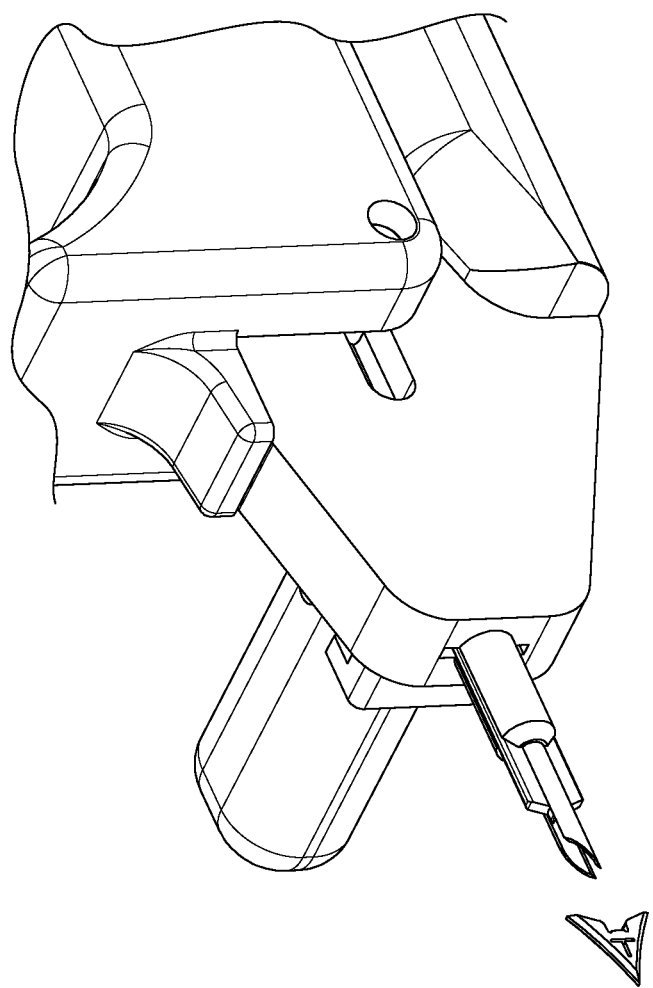
FIG. 57 is a detailed front perspective view of a suture insertion device showing a magazine in place, in accordance with one embodiment of the invention.

FIG. 57 is a detailed front perspective view of a suture insertion device showing a magazine in place, in accordance with one embodiment of the invention.

Figure 58:
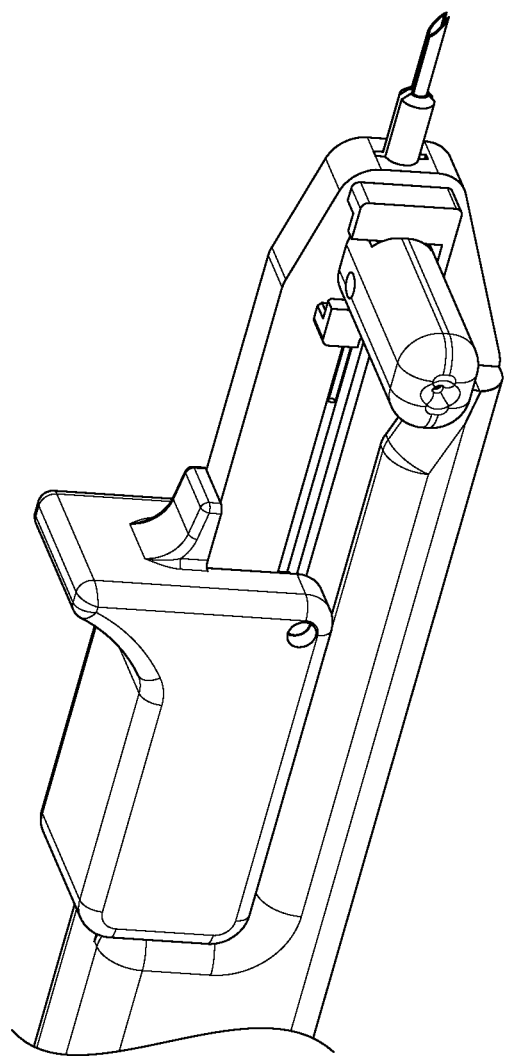
FIG. 58 is a detailed lateral front perspective view of a suture insertion device showing a magazine in place, in accordance with one embodiment of the invention.

FIG. 58 is a detailed lateral front perspective view of a suture insertion device showing a magazine in place, in accordance with one embodiment of the invention.

Figure 59:
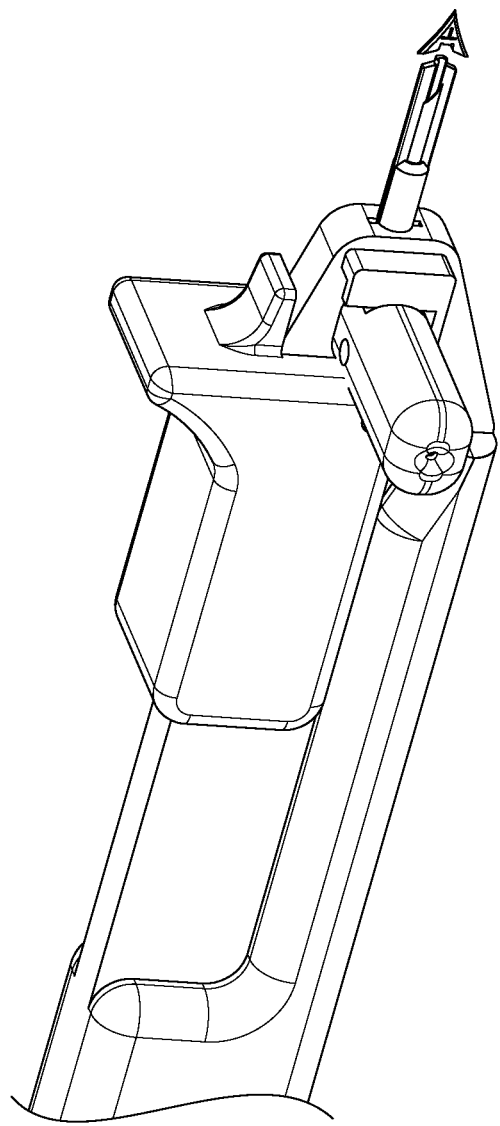
FIG. 59 is a detailed lateral front perspective view of a suture insertion device showing a magazine in place, in accordance with one embodiment of the invention.

FIG. 59 is a detailed lateral front perspective view of a suture insertion device showing a magazine in place, in accordance with one embodiment of the invention.

Figure 60:
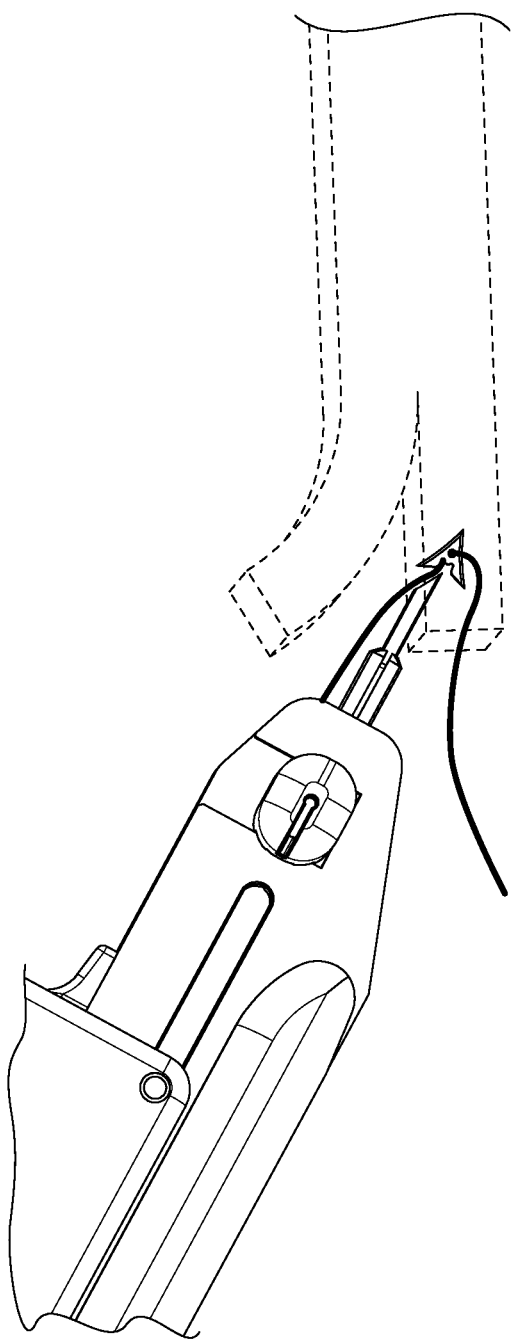
FIG. 60 is a detailed lateral perspective view of a suture insertion device shown in position inserted in between opposed tissue portions having surfaces to be approximated and inserting a first of two barbs, in accordance with one embodiment of the invention.

FIG. 60 is a detailed lateral perspective view of a suture insertion device shown in position inserted in between opposed tissue portions having surfaces to be approximated and inserting a first of two barbs, in accordance with one embodiment of the invention.

Figure 61:
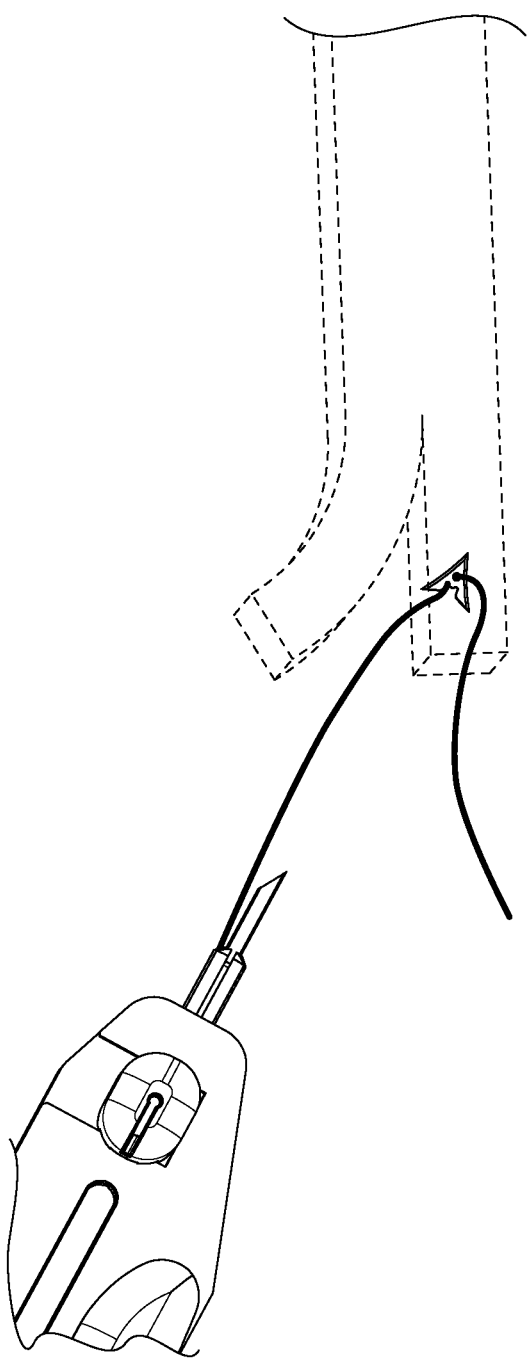
FIG. 61 is a detailed rear perspective view of a suture insertion device shown in position withdrawn from in between opposed tissue portions having surfaces to be approximated and having inserted a barb engaged with a length of suture, in accordance with one embodiment of the invention.

FIG. 61 is a detailed rear perspective view of a suture insertion device shown in position withdrawn from in between opposed tissue portions having surfaces to be approximated and having inserted a barb engaged with a length of suture, in accordance with one embodiment of the invention.

Figure 62:
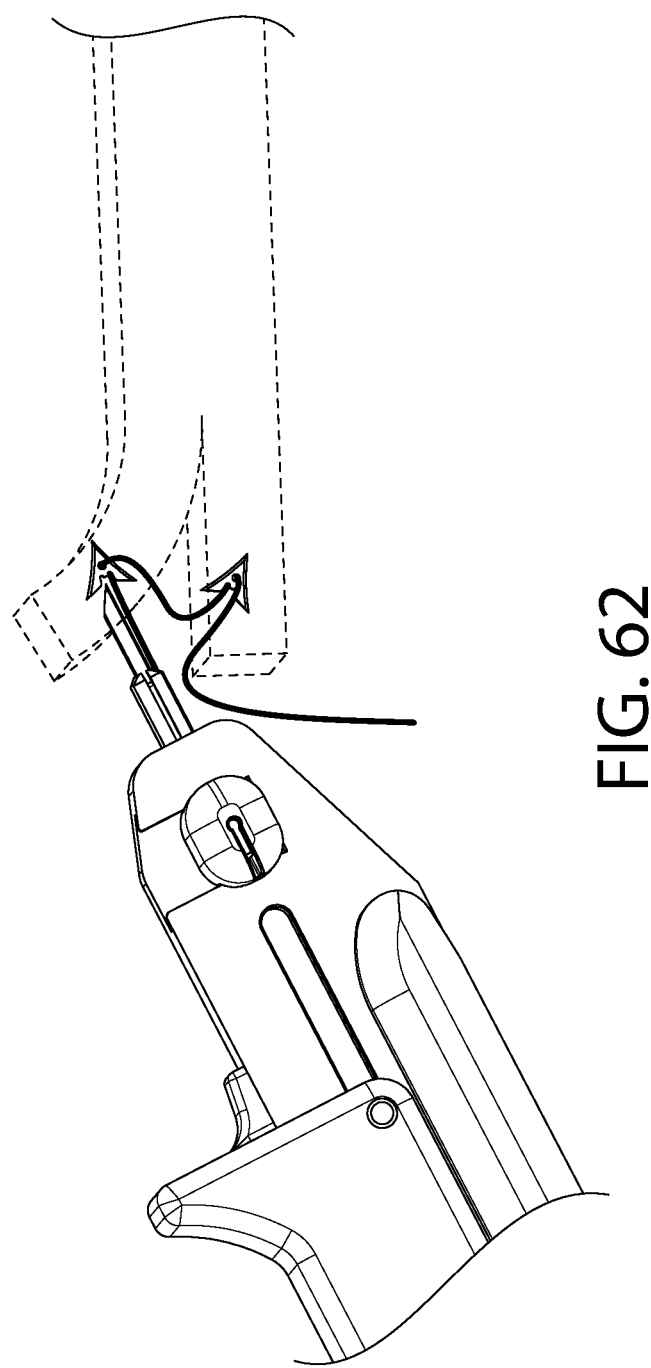
FIG. 62 is a detailed rear perspective view of a suture insertion device shown in position in between opposed tissue portions having surfaces to be approximated and inserting a second barb engaged with a length of suture, in accordance with one embodiment of the invention.

FIG. 62 is a detailed rear perspective view of a suture insertion device shown in position in between opposed tissue portions having surfaces to be approximated and inserting a second barb engaged with a length of suture, in accordance with one embodiment of the invention.

Figure 63:
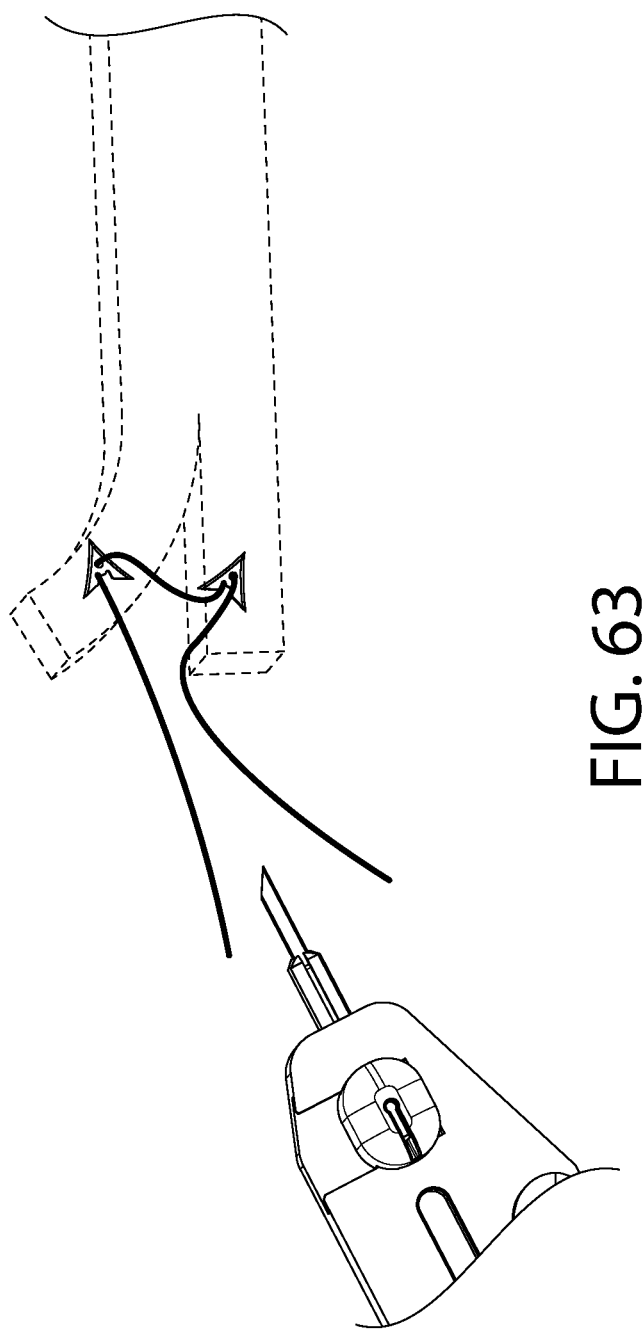
FIG. 63 is a detailed lateral perspective view of a suture insertion device shown in position withdrawn from in between opposed tissue portions having surfaces to be approximated and having inserted a second barb engaged with a length of suture, in accordance with one embodiment of the invention.

FIG. 63 is a detailed lateral perspective view of a suture insertion device shown in position withdrawn from in between opposed tissue portions having surfaces to be approximated and having inserted a second barb engaged with a length of suture, in accordance with one embodiment of the invention.

Figure 64:
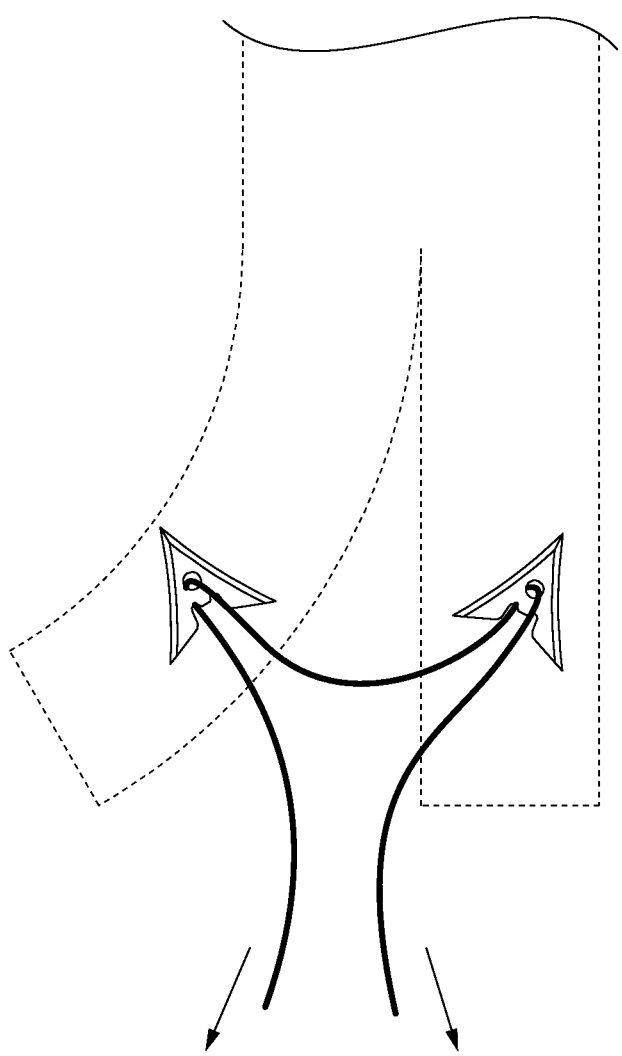
FIG. 64 is a sectioned lateral view of a schematic tissue having opposed tissue portions having surfaces to be approximated, and showing two barbs placed within the respective tissue portions and engaged with a length of suture, in accordance with one embodiment of the invention.

FIG. 64 is a sectioned lateral view of a schematic tissue having opposed tissue portions having surfaces to be approximated and showing two barbs placed within the respective tissue portions and engaged with a length of suture, in accordance with one embodiment of the invention.

Figure 65:
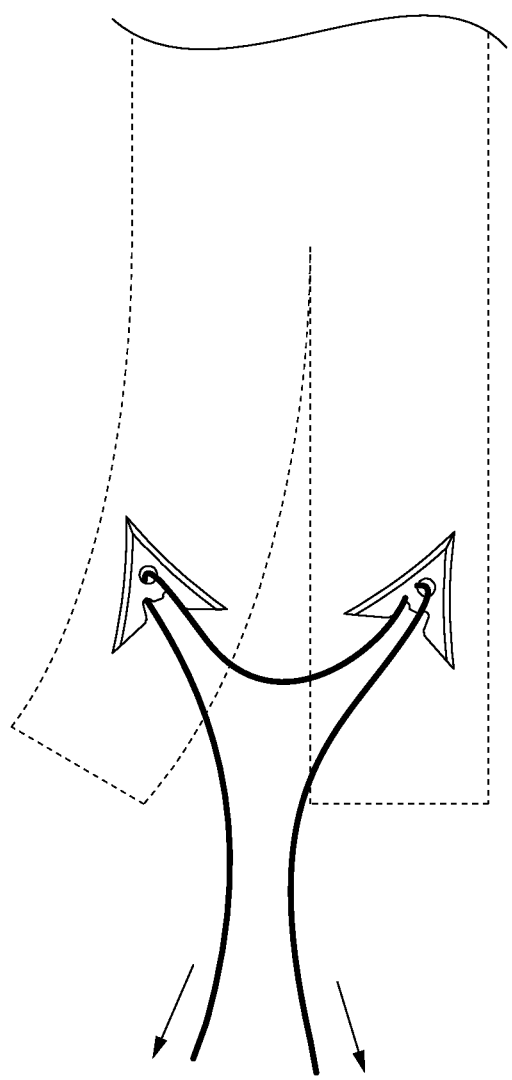
FIG. 65 is a sectioned lateral view of a schematic tissue having opposed tissue portions having surfaces approximated by action of the two barbs placed within the respective tissue portions and engaged with a length of suture, in accordance with one embodiment of the invention.

FIG. 65 is a sectioned lateral view of a schematic tissue having opposed tissue portions having surfaces approximated by action of the two barbs placed within the respective tissue portions and engaged with a length of suture, in accordance with one embodiment of the invention.

Figure 66:
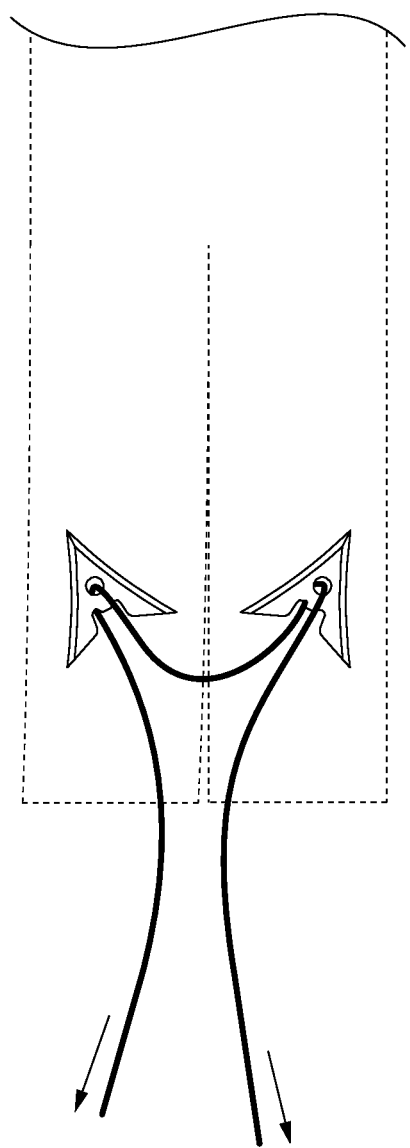
FIG. 66 is a sectioned lateral view of a schematic tissue having opposed tissue portions having surfaces further approximated by action of the two barbs placed within the respective tissue portions and engaged with a length of suture, in accordance with one embodiment of the invention.

FIG. 66 is a sectioned lateral view of a schematic tissue having opposed tissue portions having surfaces further approximated by action of the two barbs placed within the respective tissue portions and engaged with a length of suture, in accordance with one embodiment of the invention.

Figure 67:
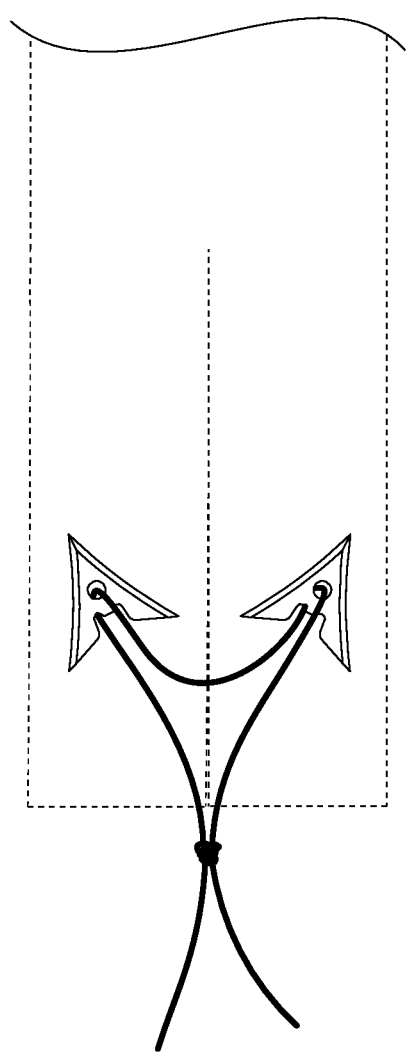
FIG. 67 is a sectioned lateral view of a schematic tissue having opposed tissue portions having surfaces further approximated by action of the two apertured barbs placed within the respective tissue portions and engaged with a length of suture, the suture having been knotted to secure the approximated tissues together, in accordance with one embodiment of the invention.

FIG. 67 is a sectioned lateral view of a schematic tissue having opposed tissue portions having surfaces further approximated by action of the two apertured barbs placed within the respective tissue portions and engaged with a length of suture, the suture having been knotted to secure the approximated tissues together, in accordance with one embodiment of the invention.

Figure 68:
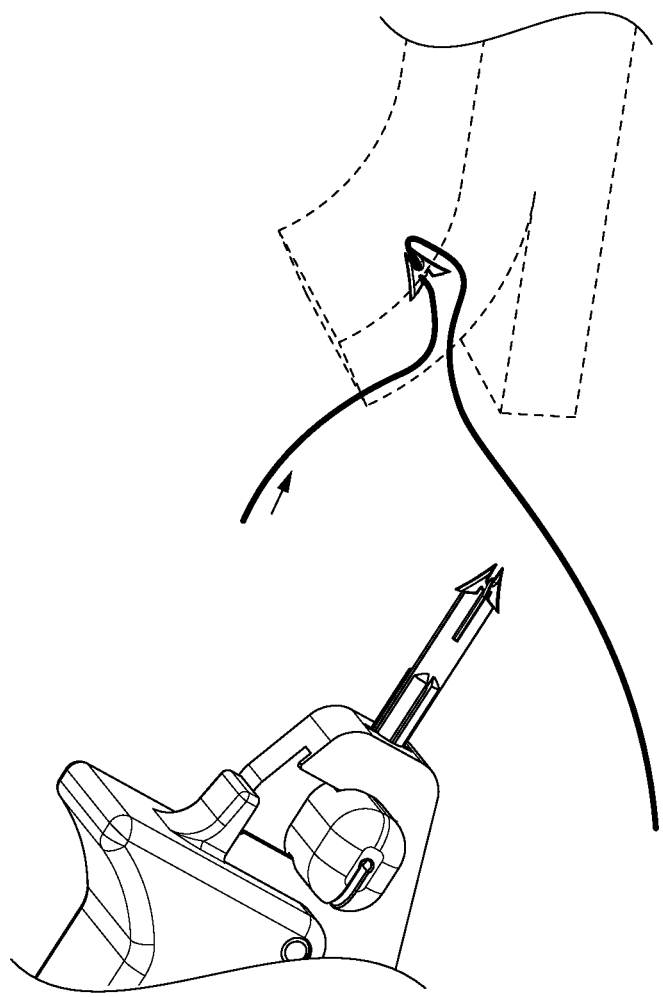
FIG. 68 is a detailed front perspective view of a suture insertion device shown in position approaching opposed tissue portions having surfaces to be approximated and having already inserted a first slotted barb engaged with a length of suture, in accordance with one embodiment of the invention.

FIG. 68 is a detailed front perspective view of a suture insertion device shown in position approaching opposed tissue portions having surfaces to be approximated and having already inserted a first slotted barb engaged with a length of suture, in accordance with one embodiment of the invention.

Figure 69:
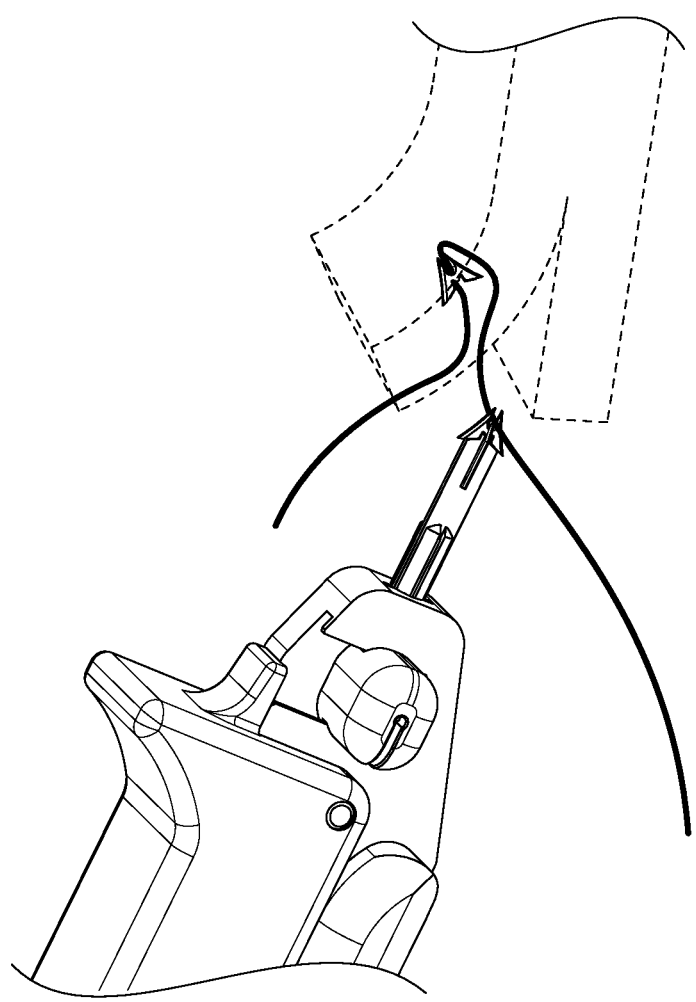
FIG. 69 is a detailed front perspective view of a suture insertion device shown in position approaching opposed tissue portions having surfaces to be approximated with a second slotted barb engaged with the length of suture, in accordance with one embodiment of the invention.

FIG. 69 is a detailed front perspective view of a suture insertion device shown in position approaching opposed tissue portions having surfaces to be approximated with a second slotted barb engaged with the length of suture, in accordance with one embodiment of the invention.

Figure 70:
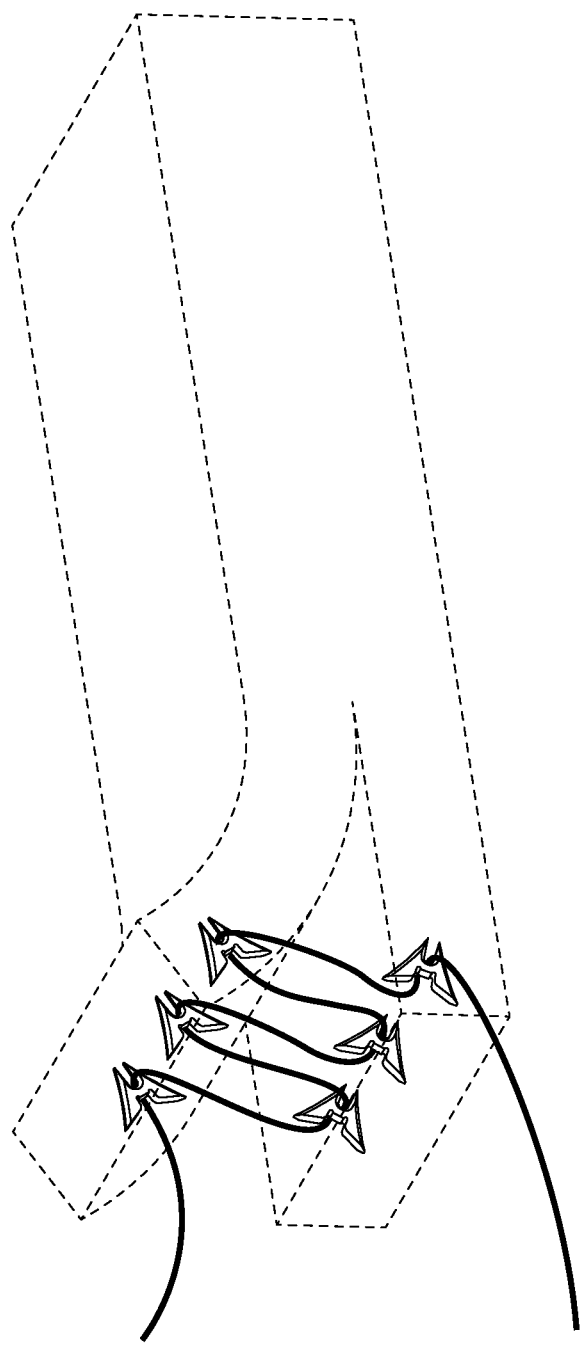
FIG. 70 is a sectioned perspective view of a schematic tissue having opposed tissue portions having surfaces to be approximated by action of a plurality of slotted barbs placed within the respective opposed tissue portions and collectively engaged with a length of suture, in accordance with one embodiment of the invention.

FIG. 70 is a sectioned perspective view of a schematic tissue having opposed tissue portions having surfaces to be approximated by action of a plurality of slotted barbs placed within the respective opposed tissue portions and collectively engaged with a length of suture, in accordance with one embodiment of the invention.

Figure 71:
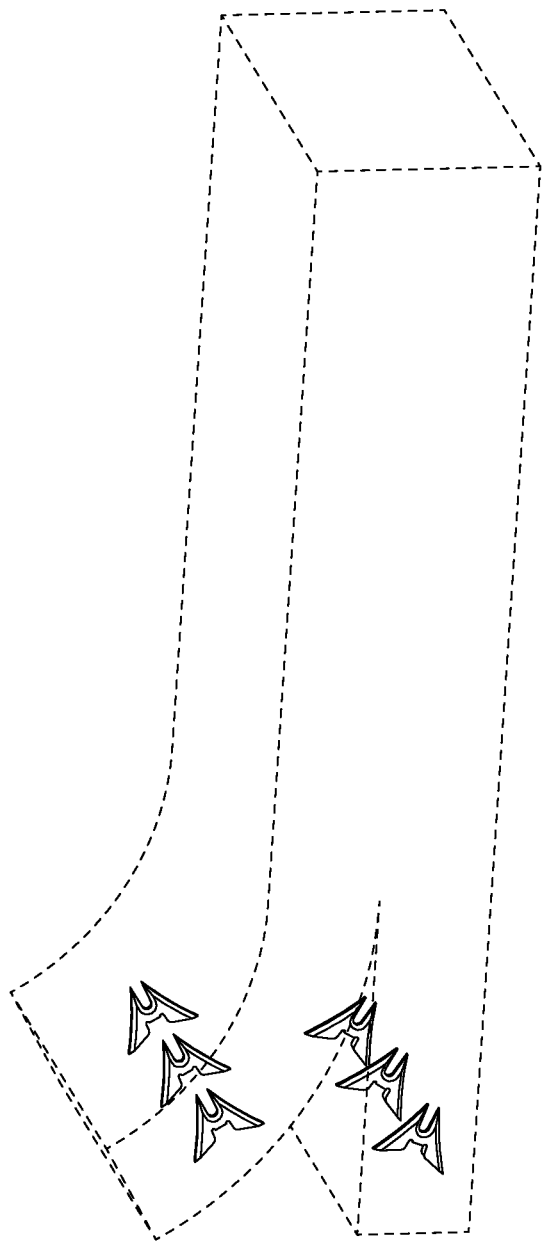
FIG. 71 is a sectioned perspective view of a schematic tissue having opposed tissue portions having surfaces to be approximated by action of a plurality of slotted barbs placed within the respective opposed tissue portions and shown without the engaged length of suture, in accordance with one embodiment of the invention.

FIG. 71 is a sectioned perspective view of a schematic tissue having opposed tissue portions having surfaces to be approximated by action of a plurality of slotted barbs placed within the respective opposed tissue portions and shown without the engaged length of suture, in accordance with one embodiment of the invention.

Figure 72:
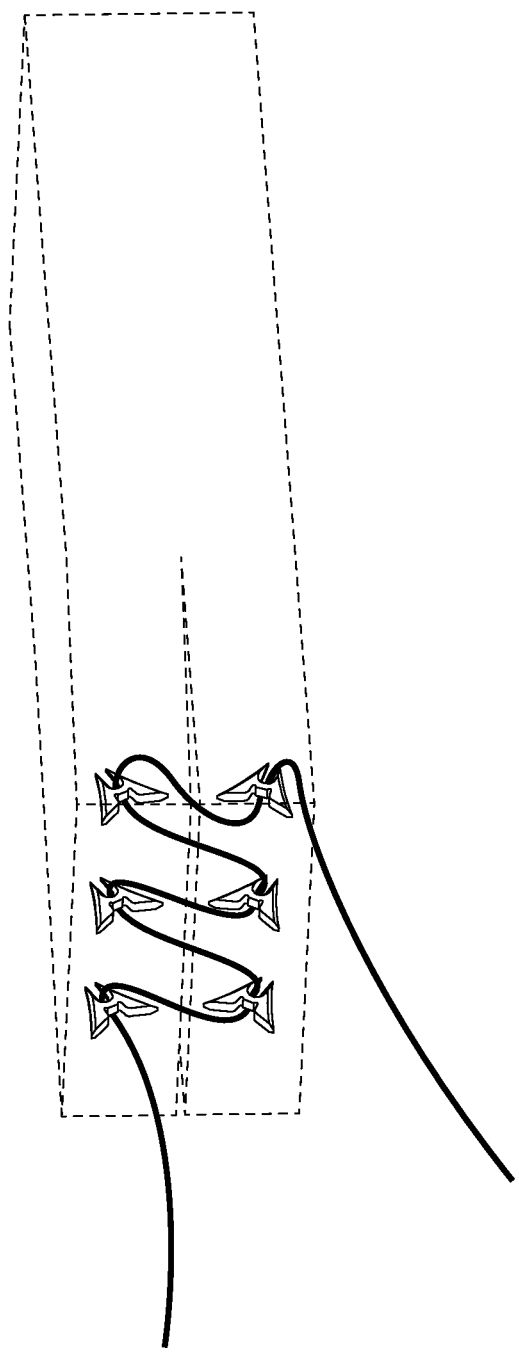
FIG. 72 is a sectioned perspective view of a schematic tissue having opposed tissue portions having surfaces that have been approximated by action of a plurality of slotted barbs placed within the respective opposed tissue portions and collectively engaged with a length of suture that is drawn to bring about the approximation, in accordance with one embodiment of the invention.

FIG. 72 is a sectioned perspective view of a schematic tissue having opposed tissue portions having surfaces that have been approximated by action of a plurality of slotted barbs placed within the respective opposed tissue portions and collectively engaged with a length of suture that is drawn to bring about the approximation, in accordance with one embodiment of the invention.

Figure 73:
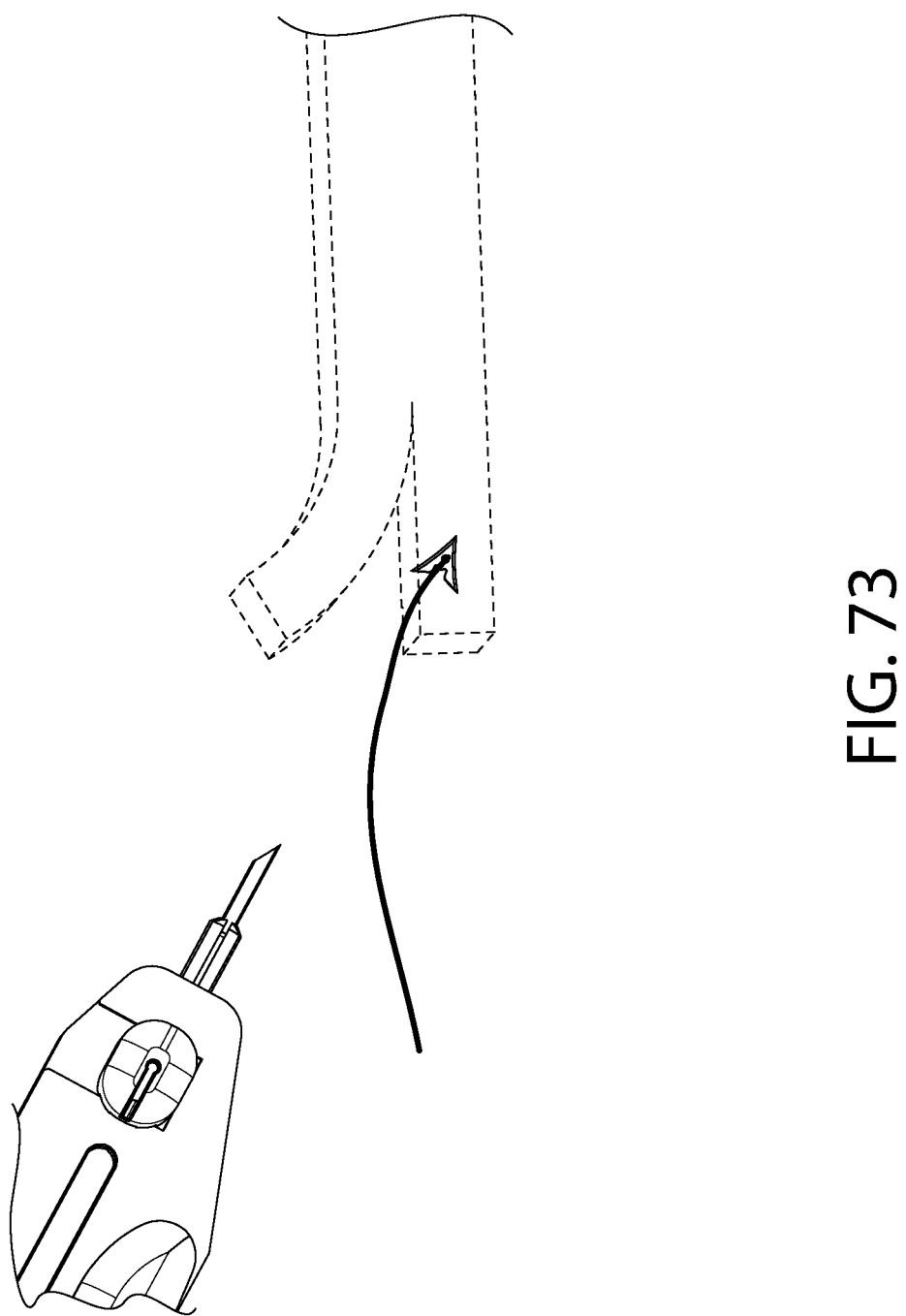
FIG. 73 is a detailed front lateral view of a suture insertion device shown in position approaching opposed tissue portions having surfaces to be approximated and having already inserted a first apertured barb engaged with a length of suture, in accordance with one embodiment of the invention.

FIG. 73 is a detailed front lateral view of a suture insertion device shown in position approaching opposed tissue portions having surfaces to be approximated and having already inserted a first apertured barb engaged with a length of suture, in accordance with one embodiment of the invention.

Figure 74:
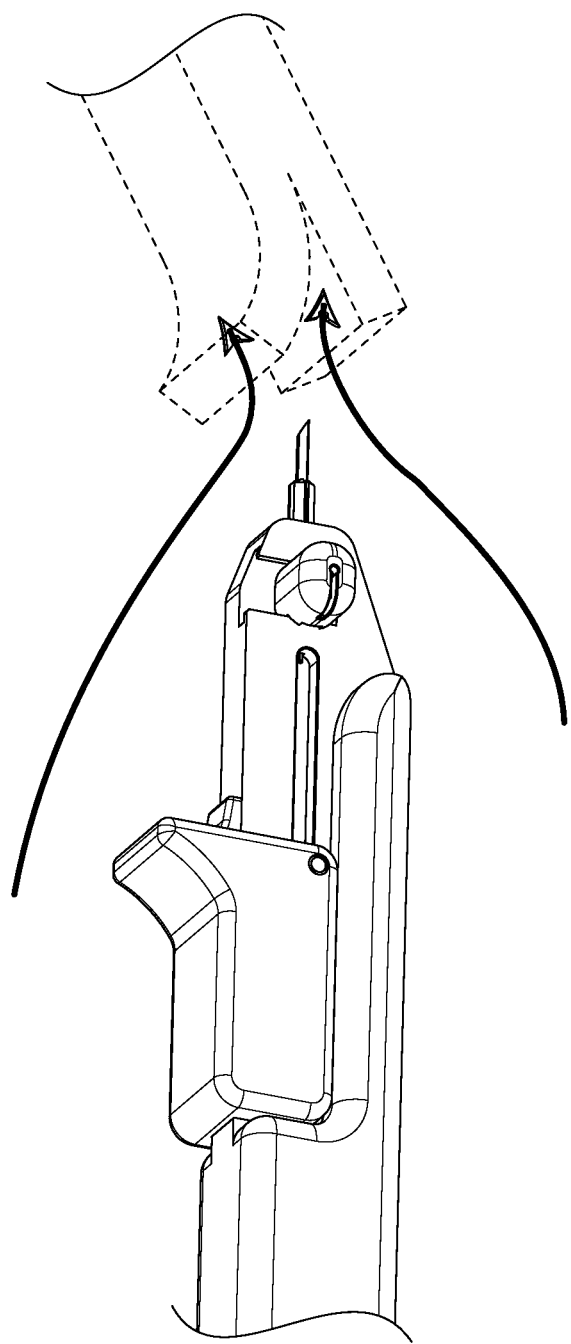
FIG. 74 is a detailed lateral perspective view of a suture insertion device shown in position withdrawn from in between opposed tissue portions having surfaces to be approximated and having inserted a first and second apertured barb engaged with respective lengths of suture, in accordance with another embodiment of the invention.

FIG. 74 is a detailed lateral perspective view of a suture insertion device shown in position withdrawn from in between opposed tissue portions having surfaces to be approximated and having inserted a first and second apertured barb engaged with respective lengths of suture, in accordance with another embodiment of the invention.

Figure 75:
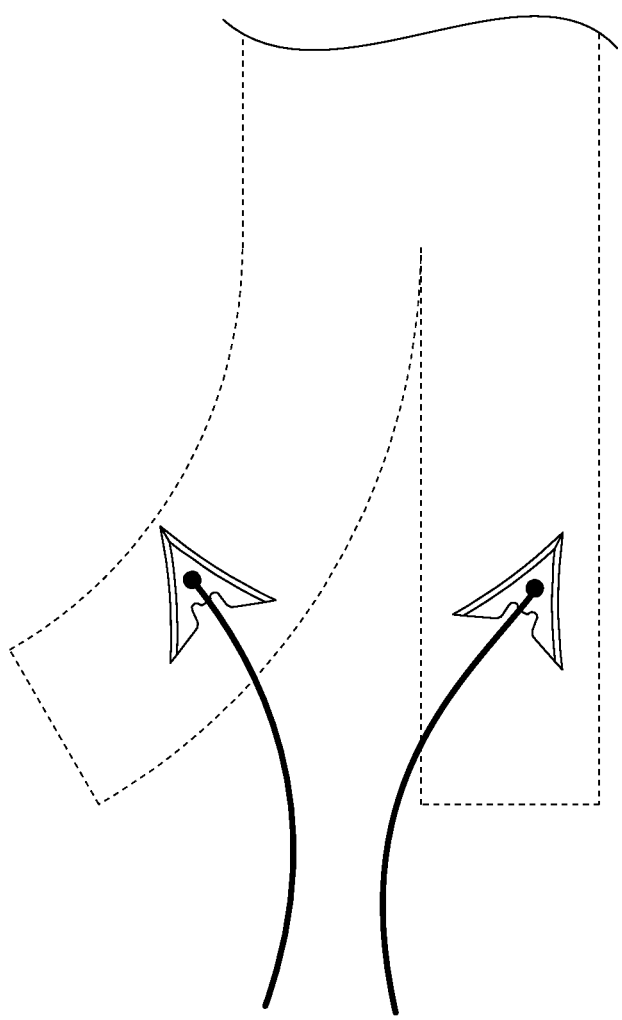
FIG. 75 is a sectioned perspective view of a schematic tissue having opposed tissue portions having surfaces to be approximated by action of a pair of apertured barbs placed within the respective opposed tissue portions and shown engaged with respective lengths of suture, in accordance with one embodiment of the invention.

FIG. 75 is a sectioned perspective view of a schematic tissue having opposed tissue portions having surfaces to be approximated by action of a pair of apertured barbs placed within the respective opposed tissue portions and shown engaged with respective lengths of suture, in accordance with one embodiment of the invention.

Figure 76:
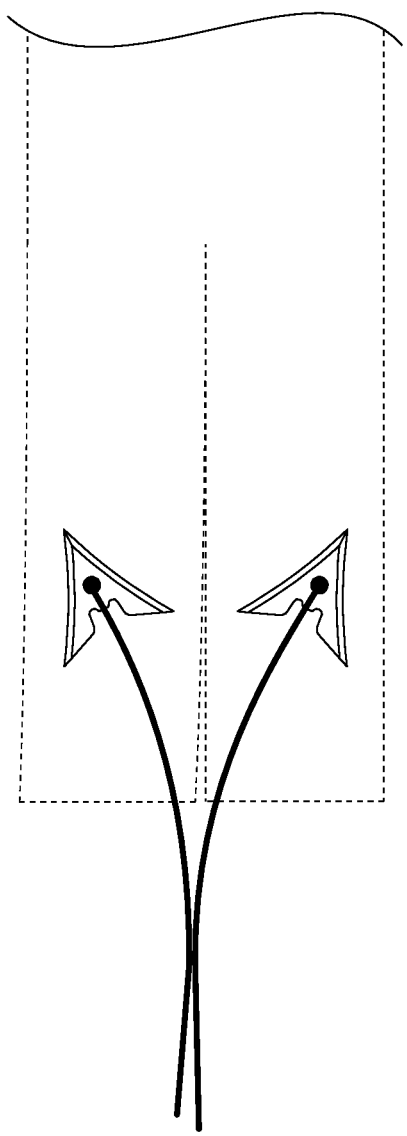
FIG. 76 is a sectioned perspective view of a schematic tissue having opposed tissue portions having surfaces having been approximated by action of a pair of apertured barbs placed within the respective opposed tissue portions and shown engaged with respective lengths of suture drawn together to bring about the approximation, in accordance with one embodiment of the invention.

FIG. 76 is a sectioned perspective view of a schematic tissue having opposed tissue portions having surfaces having been approximated by action of a pair of apertured barbs placed within the respective opposed tissue portions and shown engaged with respective lengths of suture drawn together to bring about the approximation, in accordance with one embodiment of the invention.

Figure 77:
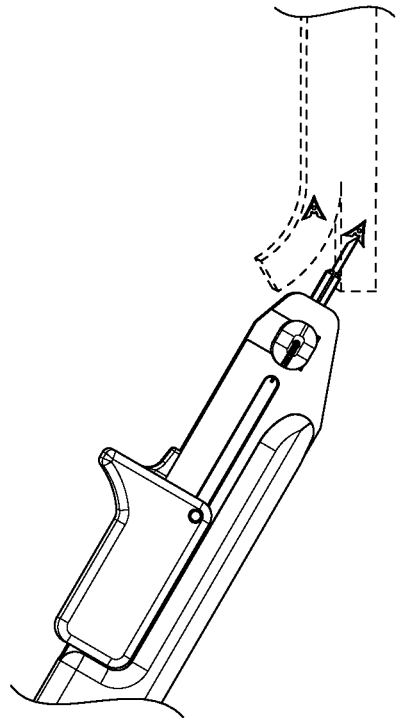
FIG. 77 contains a lateral perspective view of a device shown inserting a suture material with apertured barbs, in accordance with one embodiment of the invention.

FIG. 77 contains a lateral perspective view of a device shown inserting a suture material with apertured barbs, in accordance with one embodiment of the invention.

FIG. 78 is a table summarizing the characteristics of several tissue approximation methods.

Figure 79:
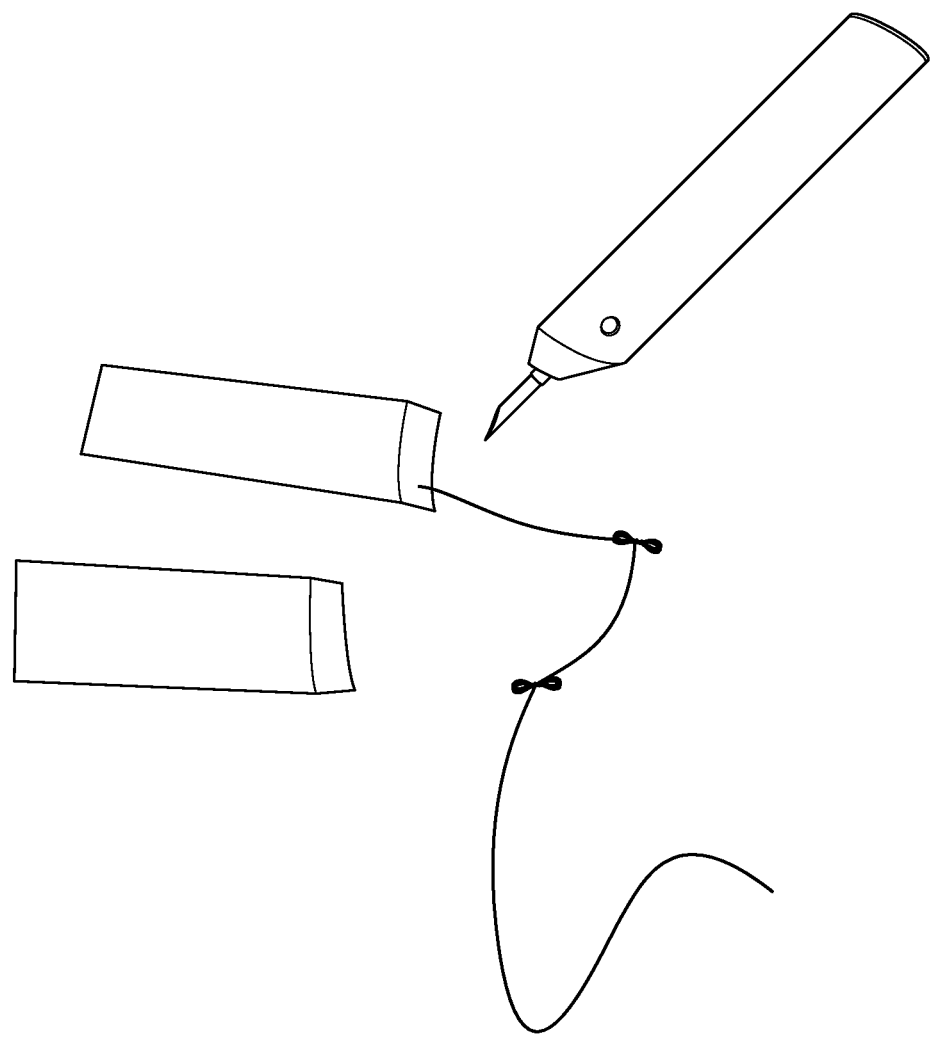
FIG. 79 contains a lateral perspective view of a device shown alongside a suture material with a series of two apertured barbs and showing two foam pieces simulating tissue portions, in accordance with one embodiment of the invention.

FIG. 79 contains a lateral perspective view of a device shown alongside a suture material with a series of two apertured barbs and showing two foam pieces simulating tissue portions, in accordance with one embodiment of the invention.

Figure 80:
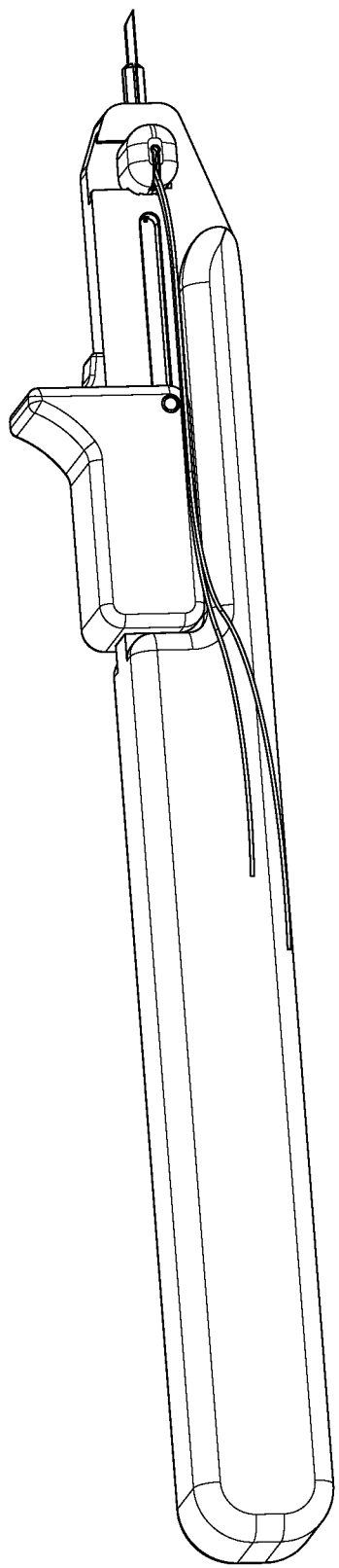
FIG. 80 contains a lateral perspective view of a device shown with a cartridge adapted to insert a suture material with a series of apertured barbs, in accordance with one embodiment of the invention.

FIG. 80 contains a lateral perspective view of a device shown with a cartridge adapted to insert a suture material with a series of apertured barbs, in accordance with one embodiment of the invention.

FIG. 81 contains two lateral perspective views of a device shown with a cartridge adapted to insert a suture material with a series of apertured barbs and showing the fully retracted and anchor pick-up position of the reciprocating actuator, in accordance with one embodiment of the invention.

FIG. 82 contains two lateral perspective views of a device shown with a cartridge adapted to insert a suture material with a series of apertured barbs, showing the anchor insertion and retracted position of the reciprocating actuator, in accordance with one embodiment of the invention.

Figure 83:
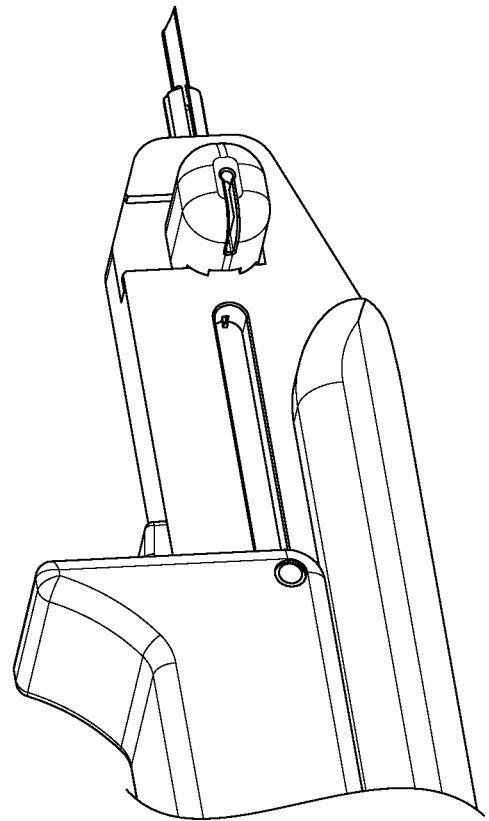
FIG. 83 contains a rear lateral perspective view of a device shown with a cartridge adapted to insert a suture material with a series of apertured barbs, in accordance with one embodiment of the invention.

FIG. 83 contains a rear lateral perspective view of a device shown with a cartridge adapted to insert a suture material with a series of apertured barbs, in accordance with one embodiment of the invention.

It will be appreciated that the handle, insertion portion, the anchor delivery portion, and the anchors may be produced from any material appropriate to the intended use whether sterile or non-sterile (i.e., for uses other than surgery or treatment, such as taxidermy or post-mortem use), and with due regard to disposability where desired. For instance, the handle, insertion portion, and the anchor delivery portion may be produced from metal, such as medical grade aluminum, while the handle portion may be produced from metal or plastics commonly used in medical devices, typically disposable ones.

The suture articles, suture placement devices and suture placement and tissue approximation methods of the present invention may be applied to any surgical procedure that may include, benefit from or require tissue approximation or securance, including without limitation procedures prone to seromas including various forms of plastic surgery, large tumor resections, and procedures involving repositioning of major organs. The most common types of surgery that result in seromas include breast procedures, abdominoplasty, body contouring and hernia repair. Other procedures where the present inventions may be advantageously applied include those where tissue approximation is required following the use of a trocar, such as procedures involving trocar placement through the abdomen during laparoscopic surgery. Still other procedures may be those involving tissue approximation associated with securing grafts and implants. In addition to the closure of dead space internally, there also exists a need for rapid and accurate closure of skin and dermis more superficially. The ability to prevent dehiscence of surgical incisions frequently relies upon meticulous repair of the dermal and subcuticular layer, which are the source of strength in surgical closure sites. Running dermal sutures are quicker in their application, but as failure can occur through either suture rupture or knot failure, the entire suture can ultimately fail as a result of an issue at a single point, resulting in dehiscence of the incision and operative site. Interrupted sutures are more accurate, stronger, and allow for independent control of tension at each individual suture location. This is however much more time consuming, which is amplified as the surgical incision length increases. There exists a need to be able to apply independent and accurate suture placement in rapid fashion within the dermis and/or subcuticular plane to facilitate quicker and more reliable wound closure.

The tissues that may be approximated through use of the subject suture articles, suture placement devices, and suture placement and tissue approximation methods may include tissues of any type having two or more generally opposed or adjacent portions that may be advantageously drawn together to a desired position.

It will be appreciated that the present invention may be applied to other fields for the tissue approximation, adjoining and fixture, such as in veterinary medicine, or providing embalming or taxidermy services, and the like.

FIGS. 16-21: Actuators
 a. Possible mechanisms to actuate the anchor delivery (pusher) may include but are not limited to:
  i. Finger Trigger (FIGS. 16-20)
  ii. Slider (FIG. 21)

FIGS. 22-24: Magazine
 a. Dispenses multiple anchors in sequence
 b. Intended to enable the multi-shot variation of the device that delivers separate suture articles in sequence
 c. May also enable a chain of multiple anchors on a single suture line FIGS. 25-47: Approach Angles
 a. Anchor positions in the tissue (FIGS. 25-27)
 b. Angles of approach for the insertion device and anchor placement in the tissue
  i. Oblique (FIGS. 28-37)
  ii. Direct (FIGS. 38-47)

FIGS. 48-59: Insertion Needle Configurations
 a. Possible insertion needle configurations may include but are not limited to:
  i. Sectioned Half Cannula (FIGS. 48-52)
  ii. Slotted Needle (FIGS. 53-59)

FIGS. 60-67: Workflow: Arrows with Hole
 a. Workflow for a suture article comprising two arrows with holes in their centers, through which the suture is threaded.
 b. Sequence of anchor delivery
 c. Tissue approximation resulting from managing tension of the suture tails
 d. Final securing of the suture tails by knotting or cinching, or other means FIGS. 68-72: Workflow: Arrows with Slot
 a. Workflow for a suture article comprising two arrows with slots in their bodies, through which the suture is threaded.
 b. The images go on to show tissue approximation resulting from managing tension of the suture tails as well as final securement of the suture tails by knotting or cinching, or other.
 c. Note that the anchor devices can pick up the suture during the actual insertion into the tissue from some sort of continuous suture feed device, referred to above as a spool. This may involve a single arrow catching the suture with tail being cut after placement. The proximal portion of the suture remaining in the device could then be used with the next arrow dispensed from the magazine, and so on. Similarly, two arrows may catch section of the suture in succession, or a chain of many arrows configured as a continuous chain stitch may be run on a single suture with tails being cut as desired. Thus is there great flexibility regarding the number of anchors to be strung on each successive length of suture, with minimal disruption to the operator.

FIGS. 73-76: Workflow: Single Arrow with Hole
 a. Shows one end of the suture attached directly to the anchor so that each tail come independently from an anchor.
 b. Similarly, a single knot can be placed with a single tail, as a "blind knot"

What is claimed is:

1. A suture adapted to be anchored into opposing tissue surfaces and to approximate those tissue surfaces, the suture comprising:
   a. a length of suture having a suture diameter; and
   b. a plurality of rigid and substantially planar barbed anchor articles slidingly disposed along said length of suture and shaped so as to resist withdrawal from tissue once placed into tissue as said length of suture is moved with respect to and drawn through said plurality of barbed anchor articles, wherein each of said barbed anchor articles comprises (a) a central circular aperture having a circumference of a diameter sufficiently greater than said suture diameter to permit said barbed anchor articles to freely rotate about said suture, and (b) an array of pointed barbs radially spaced about said circumference, said array of pointed barbs comprising (i) a first pointed barb defining an insertion direction line vector, wherein said first pointed barb is distal of said central aperture and (ii) a second and third pointed barb extending respectively on either side of said insertion direction line vector and at an obtuse angle to said insertion direction line vector, wherein said second and third pointed barbs are proximal of said central aperture, whereby, once respective sets of said plurality of barbed anchor articles are placed into respective opposing tissue surfaces, said suture may be drawn unrestrictedly therethrough so as to approximate said opposing tissue surfaces.

2. A suture according to claim 1 wherein each of said barbed anchor articles has a perimeter and a geometric center, and a slot extending from said perimeter toward said geometric center thereof, said slot of sufficient width to accommodate the sliding engagement of said length of said suture passing therethrough, once said barbed anchor article is placed into tissue.

3. A suture according to claim 2 wherein each of said barbed anchor articles comprises at least 2 barbs on a first side thereof and said slot on a second side thereof.

4. A suture according to claim 1 wherein said plurality of barbed anchor articles comprises a resorbable material.

5. A suture according to claim 1 wherein said barbed anchor articles are of a size in the range of from about ¹⁄₁₆ to ¼ inch.

6. A suture adapted to be anchored into opposing tissue surfaces and to approximate those tissue surfaces, the suture comprising:
   a. a length of suture; and
   b. a plurality of rigid and substantially planar barbed anchor articles slidingly disposed along said length of suture and shaped so as to resist withdrawal from tissue once placed into tissue as said length of suture is moved with respect to and drawn through said plurality of barbed anchor articles, wherein each of said barbed anchor articles comprises (a) a central circular aperture having a circumference of a diameter sufficiently greater than a diameter of said suture to permit said barbed anchor articles to freely rotate about said suture, and (b) an array of pointed barbs radially spaced about said circumference, said array of pointed barbs comprising (i) a first pointed barb defining an insertion direction line vector, wherein said first pointed barb is distal of said central aperture and (ii) a second and third pointed barb extending respectively on either side of said insertion direction line vector and at an obtuse angle to said insertion direction line vector, wherein said second and third pointed barbs are proximal of said central aperture, whereby, once respective sets of said plurality of barbed anchor articles are placed into respective opposing tissue surfaces, said suture may be drawn unrestrictedly therethrough so as to approximate said opposing tissue surfaces; wherein each of said barbed anchor articles comprise at least 2 barbs on a first side thereof and a slot on a second side thereof, and wherein said barbed anchor articles are of a size in the range of from about ¹⁄₁₆ to ¼ inch.

7. A suture according to claim 6 wherein each of said barbed anchor articles has a perimeter and a geometric center, and said slot extending from said perimeter toward said geometric center thereof, said slot of sufficient width to accommodate the sliding engagement of said length of said suture passing therethrough, once said barbed anchor article is placed into tissue.

8. A suture according to claim 6 wherein said plurality of barbed anchor articles comprises a resorbable material.

9. A suture according to claim 1, wherein each of said barbed anchor articles additionally comprises a chamfer edge on either side of said first pointed barb.

10. A suture according to claim 6, wherein each of said barbed anchor articles additionally comprises a chamfer edge on either side of said first pointed barb.

* * * * *